(12) United States Patent
Livingston et al.

(10) Patent No.: US 10,513,090 B2
(45) Date of Patent: Dec. 24, 2019

(54) 2-DIMENSIONAL CARBON MATERIAL

(71) Applicant: IP2IPO INNOVATIONS LIMITED, London (GB)

(72) Inventors: Andrew Guy Livingston, London (GB); Santanu Karan, London (GB); Eduardo Saiz Gutierrez, London (GB); Victoria Garcia Rocha, London (GB); Zhiwei Jiang, London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 65 days.

(21) Appl. No.: 15/737,050

(22) PCT Filed: Jun. 17, 2016

(86) PCT No.: PCT/GB2016/051834
§ 371 (c)(1),
(2) Date: Dec. 15, 2017

(87) PCT Pub. No.: WO2016/203269
PCT Pub. Date: Dec. 22, 2016

(65) Prior Publication Data
US 2018/0170003 A1   Jun. 21, 2018

(30) Foreign Application Priority Data
Jun. 18, 2015 (GB) .................................. 1510761.8

(51) Int. Cl.
*C01B 32/00* (2017.01)
*B32B 9/00* (2006.01)
(Continued)

(52) U.S. Cl.
CPC .............. *B32B 9/007* (2013.01); *B32B 27/28* (2013.01); *C01B 32/182* (2017.08);
(Continued)

(58) Field of Classification Search
CPC ..... B32B 9/007; B32B 27/28; B32B 2313/04; C01B 32/184; C01B 32/182; C01B 32/23;
(Continued)

(56) References Cited

U.S. PATENT DOCUMENTS

2008/0149561 A1   6/2008   Chu et al.
2013/0167897 A1   7/2013   Choi et al.

FOREIGN PATENT DOCUMENTS

EP      2327662 A1      6/2011
WO      2009/129194 A2  10/2009

OTHER PUBLICATIONS

Prezioso, S., et al. "Large area extreme-UV lithography of graphene oxide via spatially resolved photoreduction." Langmuir 28.12 (2012): 5489-5495.*

(Continued)

*Primary Examiner* — Richard M Rump
(74) *Attorney, Agent, or Firm* — McCarter & English, LLP; Steven G. Davis; Wei Song

(57) ABSTRACT

2-dimensional carbon thin films are described, as well as their processes of preparation, and their specific uses. The 2-dimensional carbon thin films are fabricated by preparing an organic polymeric thin film precursor, which is then subjected to a carbonisation process to remove at least some of the non-carbon atoms. Using the disclosed process, 2-dimensional carbon thin films having improved dimensional characteristics can be reliably prepared, which presents clear advantages in applications which have until now been restricted to the use of 2-dimensional carbon thin films having less useful dimensions.

21 Claims, 38 Drawing Sheets

(51) Int. Cl.
  *C01B 32/23* (2017.01)
  *C01B 32/182* (2017.01)
  *C01B 32/184* (2017.01)
  *B32B 27/28* (2006.01)
  *B82Y 30/00* (2011.01)
  *B82Y 40/00* (2011.01)

(52) U.S. Cl.
  CPC .......... *C01B 32/184* (2017.08); *C01B 32/23* (2017.08); *B32B 2313/04* (2013.01); *B82Y 30/00* (2013.01); *B82Y 40/00* (2013.01); *C01B 2204/04* (2013.01); *C01B 2204/24* (2013.01); *C01B 2204/32* (2013.01)

(58) Field of Classification Search
  CPC .......... C01B 2204/32; C01B 2204/24; C01B 2204/04; B82Y 30/00; B82Y 40/00
  See application file for complete search history.

(56) References Cited

OTHER PUBLICATIONS

Bae et al., Roll-to-roll production of 30-inch graphene films for transparent electrodes. Nat Nanotechnol. Aug. 2010;5 (8):574-8.
Chen et al., Improving biogas separation and methane storage with multilayer graphene nanostructure via layer spacing optimization and lithium doping: a molecular simulation investigation. Environ Sci Technol. Sep. 18, 2012;46(18):10341-8.
Domingues et al., Transparent and conductive thin films of graphene/polyaniline nanocomposites prepared through interfacial polymerization. Chem Commun (Camb). Mar. 7, 2011;47(9):2592-4.
Li et al., Facile preparation of alpha-Fe2O3/carbon and polyhydroxy iron cation/polyaniline hollow particles. Colloid Polym Sci. 2013;291:1287-1291.
Mohan et al., A study on the relationship between preparation condition and properties/performance of polyamide TFC membrane by IR, DSC, TGA, and SEM techniques. Desalination and Water Treatment. 2013;51:586-596.
Namvar-Mahboub et al., Development of a novel thin film composite membrane by interfacial polymerization on polyetherimide/modified SiO2 support for organic solvent nanofiltration. Separation and Purification Technology. 2013;119:35-45.
Reina et al., Large area, few-layer graphene films on arbitrary substrates by chemical vapor deposition. Nano Lett. Jan. 2009;9(1):30-5.
Zhang et al., Preparation and gas separation performance of composite carbon molecular sieve membrane from the polyester precursor. Mo Kexue Yu Jinshu Bianjibu. 2013;33(2):57.
Combined Search and Examination Report for Application GB1510761.8, dated Dec. 17, 2015. 7 pages.
International Search Report and Written Opinion for Application No. PCT/GB2016/051834, dated Nov. 4, 2016. 20 pages.

* cited by examiner

2-DIMENSIONAL CARBON MATERIAL

CROSS-REFERENCE TO RELATED APPLICATIONS

This application is a U.S. national stage filing, under 35 U.S.C. § 371(c), of International Application No. PCT/GB2016/051834, filed on Jun. 17, 2016, which claims priority to United Kingdom Application No. 1510761.8, filed on Jun. 18, 2015. The entire contents of each of the aforementioned applications are incorporated herein by reference.

INTRODUCTION

The present invention relates to a continuous 2-dimensional carbon thin film, as well as to processes of making the thin film and uses of the thin film.

BACKGROUND OF THE INVENTION

The extensive commercial potential of carbon residue materials including graphene, graphene oxide, graphite and graphite oxide is well documented owing to their exceptional electrical, thermal, chemical and mechanical properties. These materials have found application in areas as diverse as composite materials, energy storage and conversion, sensors, drug delivery, field emission devices and nano-scale electronic components and their uses include liquid and gas filtration, gas storage, energy storage, electronics, coatings, and medical applications.

Graphene oxide can be produced from graphite oxide by chemical processes including Hummers method or the dispersion of graphite oxide into basic solution. Functionalization of graphene and graphene oxide flakes is widely studied.

Graphene-based materials have been studied for over four decades, including the transport properties in exfoliated graphene oxide layers, graphene grown on silicon carbide and copper substrates. A variety of studies involve the use of chemically modified graphene (CMG) to make new materials. Of the available strategies, exfoliation to form graphene oxide layers has been favoured in the mass production of graphene oxide, but faces the challenge of producing exfoliated graphene oxide with a controlled thickness, and the dimensions of the individual thin films or flakes is typically limited to few 10s to 100s of square microns in area dimension. Production of large area graphene via chemical vapour deposition has led to high quality graphene oxide but the flakes are still limited in area and production is challenging to scale up for thin films or flakes over a few millimetres$^2$ in area.

Graphene production methods include the micromechanical cleavage, epitaxial growth, and chemical synthesis involving oxidation-intercalation and exfoliation-reduction of graphite. The chemical synthesis route from graphite via reduction of graphene oxide has been reported to achieve a single or a few layers of graphene at large-scale.

Many applications of carbon residue materials require their production as continuous sheets or flakes which have a thickness of less than 20 nm and an area divided by thickness ration (A/T) greater than $10^{10}$ nanometres (nm), and their assembly into three-dimensional structures. As suggested above, it remains challenging to economically mass produce flakes or sheets of graphene-based materials of useful size and thickness.

The present invention was devised with the foregoing in mind.

SUMMARY OF THE INVENTION

According to a first aspect of the present invention there is provided a continuous 2-dimensional carbon thin film wherein the thin film has a thickness of less than 20 nm and an area divided by thickness ratio (A/T) of greater than $10^{10}$ nm.

According to a second aspect of the present invention there is provided a process for the preparation of the continuous 2-dimensional carbon thin film as defined herein, the process comprising the steps of:
a) preparing an organic polymeric thin film by an interfacial polymerisation process, said thin film having a thickness of less than 100 nm; and
b) subjecting the organic polymeric thin film of step a) to a carbonisation process.

According to a third aspect of the present invention there is provided a continuous 2-dimensional carbon thin film obtainable, obtained or directly obtained by a process defined herein, wherein the continuous 2-dimensional carbon thin film is as defined in the first aspect of the invention or has an area divided by thickness ratio (A/T) of greater than $10^8$ nm.

According to a fourth aspect of the present invention there is provided a use of a continuous 2-dimensional carbon thin film as defined herein for gas storage and separation, transparent conducting thin films as electrode materials, composite materials (e.g. food packaging, plastics and condoms) and as a separation membrane.

According to a further aspect of the present invention, there is provided a process for the preparation of the continuous 2-dimensional carbon thin film as defined herein, the process comprising the steps of:
a) providing an organic polymeric thin film that has been prepared by an interfacial polymerisation process, said thin film having a thickness of less than 100 nm; and
b) subjecting the organic polymeric thin film of step a) to a carbonisation process.

According to a further aspect of the present invention, there is provided a continuous 2-dimensional carbon thin film having a thickness of less than 20 nm, an area of greater than 0.0001 cm$^2$ and a sheet resistance of ≤21 kΩ/square (e.g. 0.6-21 kΩ/square).

According to a further aspect of the present invention, there is provided a continuous 2-dimensional carbonaceous nanofilm having a thickness of less than 20 nm, an area of greater than 0.0001 cm$^2$ and a sheet resistance of ≤21 kΩ/square (e.g. 0.6-21 kΩ/square), and having the following atomic composition: 85 to 98% carbon, 1 to 10% oxygen, and 0.5 to 6% nitrogen.

According to a further aspect of the present invention, there is provided a laminate comprising two or more continuous 2-dimensional carbon thin films or continuous 2-dimensional carbonaceous nanofilms defined herein, wherein the two or more continuous 2-dimensional carbon thin films or continuous 2-dimensional carbonaceous nanofilms are provided in an overlapping or partially overlapping arrangement.

According to a further aspect, the present invention provides a use of a continuous 2-dimensional carbon thin film, continuous 2-dimensional carbonaceous nanofilm or laminate as defined herein in an application selected from tissue engineering, bioimaging (e.g. contrast agents), the polymerase chain reaction, diagnostic devices, drug delivery, biomicrorobitcs, blood sensing, electronics (e.g. in transistors, semiconductors, conducting electrodes, transparent conducting electrodes, conducting electrode on flexible supports, frequency multipliers, optoelectronics, Hall effect sensors, organic electronics, spintronics, optical modulators, infrared light sensors and/or photodetectors), membranes for liquid separation, solar cells (e.g. as charge conductors, light collectors and electrodes), in fuel cells, thermoelectric devices, photo-electro catalysis devices, coatings, supercapacitors, batteries, hydrogen storage, in sensors with adsorbed molecules, wearable devices, magnetic sensors, contaminant removal from gas and liquid streams, water purification, desalination, gas separation membranes, gas storage, molecular adsorbent, plasmonics and metamaterials, as lubricants, in radio wave adsorption, in redox devices, as nanoantennas, in sound transducers, as waterproof coatings, as coolant additives, as reference materials, in thermal management, as structural materials in composites and as catalysts to speed up the rate of chemical reactions.

DETAILED DESCRIPTION OF THE INVENTION

2-Dimensional Carbon Thin Films

As described hereinbefore, the present invention provides a continuous 2-dimensional carbon thin film wherein the thin film has a thickness of less than 20 nm and an area divided by thickness ratio (A/T) of greater than $10^{10}$ nm.

The continuous 2-dimensional carbon thin films of the present invention offer a wealth of advantages over similar materials that are presently available. Perhaps more notably, the continuous 2-dimensional carbon thin films of the present invention have enhanced dimensional characteristics when compared with graphene and graphene-oxide type materials prepared according to currently available techniques. In particular, techniques such as micromechanical cleavage, epitaxial growth, chemical synthesis involving oxidation-intercalation and exfoliation have inherent limits in terms of the dimensions of the 2-dimensional carbon thin film or flakes they can produce, which typically have an area to thickness ration of less than $10^{10}$ nm. In contrast, by implementing the process defined herein, the 2-dimensional carbon thin films of the invention having a thickness of less than 20 nm and an area divided by thickness ratio (A/T) of greater than $10^{10}$ nm can be reliably prepared. The thin films exhibit surprisingly high surface area and volume properties, which makes them ideal candidates for gas storage and adsorption applications. Moreover, the composition and morphology of the thin films will offer advantages in the fields of electronics, separation/filtration technologies and medicine.

It will be understood that, unless otherwise specified, the term "continuous 2-dimensional carbon thin film" used herein refers to the product formable by subjecting an interfacially polymerised polymeric thin film to a carbonisation process defined herein which increases the fraction of carbon atoms within the polymeric thin film by chemically removing some or all non-carbon atoms.

Any of the features discussed hereinbelow in relation to the continuous 2-dimensional carbon thin films of the invention are also applicable to the continuous 2-dimensional carbonaceous nanofilms of the invention.

In an embodiment of the invention, the 2-dimensional carbon thin film has a thickness of less than 10 nm (e.g 1-10 nm). Suitably, the 2-dimensional carbon thin film has a thickness of less than 6 nm. More suitably, the 2-dimensional carbon thin film has a thickness of less than 4 nm (for example, less than 3 nm or less than 2.5 nm).

In another embodiment, at least a portion of the thin film has a structure corresponding to graphene, graphene oxide or reduced graphene oxide. The hexagonal lattice structure of graphene will be well appreciated by those skilled in the art. Portions of the 2-dimensional thin films may also comprise structures, or functional groups that are common to graphene oxide and reduced graphene oxide, (e.g. —COOH, —OH and epoxy).

In another embodiment, the elemental composition (atomic %) of the thin film is as follows:
  85 to 95% carbon, and
  2 to 13% oxygen.

In another embodiment, at least a portion of the thin film has a structure corresponding to graphene, graphene oxide or reduced graphene oxide, and the thin film additionally comprises one or more nitrogen-containing moieties (e.g. pyrrolic nitrogen atoms, pyridinic nitrogen atoms, protonated pyrrolic/pyridinic nitrogen atoms, or quaternary nitrogen atoms).

When the thin film comprises nitrogen-containing moieties, it will be understood that such moieties form an integral part of the thin film's structure, rather than being mere surface contamination.

In another embodiment, the elemental composition (atomic %) of the thin film is as follows:
  85 to 98% carbon,
  1 to 10% oxygen, and
  0.5 to 6% nitrogen.

In another embodiment, the elemental composition (atomic %) of the thin film is as follows:
  88 to 98% carbon,
  1 to 6% oxygen, and
  0.5 to 6% nitrogen.

In another embodiment, the elemental composition (atomic %) of the thin film is as follows:
  90 to 98% carbon,
  1 to 4% oxygen, and
  0.5 to 6% nitrogen.

In any of the elemental compositions recited above, ≥50% of the carbon atoms are aromatic $sp^2$ carbon atoms. Suitably, in any of the elemental compositions recited above, ≥55% of the carbon atoms are aromatic $sp^2$ carbon atoms. For example, in any of the elemental compositions recited above, 50-70% of the carbon atoms are aromatic $sp^2$ carbon atoms. In any of these compositions, 3-22% of the nitrogen atoms may be pyridinic nitrogen atoms and/or 3-20% of the nitrogen atoms may be pyrrolic nitrogen atoms and/or 35-65% of the nitrogen atoms are quaternary nitrogen atoms.

In another embodiment, the 2-dimensional carbon thin film comprises ≥50 atomic % of aromatic $sp^2$ carbon. Suitably, the 2-dimensional carbon thin film comprises ≥55 atomic % of aromatic $sp^2$ carbon. For example, the 2-dimensional carbon thin film may comprise 50-70 atomic % of aromatic $sp^2$ carbon. The thin film may additionally comprise 0.05-1.5 atomic % of pyridinic nitrogen atoms and/or 0.02-1.2 atomic % of pyrrolic nitrogen atoms and/or 0.5-2.5 atomic % of quaternary nitrogen atoms.

In another embodiment, at least a portion of the 2-dimensional carbon thin film has a structure corresponding to graphene, the thin film additionally comprising one or more atoms/moieties selected from —OH, C=O, —COOH, pyrrolic nitrogen atoms, pyridinic nitrogen atoms, protonated pyrrolic/pyridinic nitrogen atoms, and quaternary nitrogen atoms.

In another embodiment, the 2-dimensional carbon thin film has a water contact angle value of 55-95°. Suitably, the 2-dimensional carbon thin film has a water contact angle value of 55-90. More suitably, the 2-dimensional carbon thin film has a water contact angle value of 55-85°. More suitably, the 2-dimensional carbon thin film has a water contact angle value of 57-82°. Most suitably, the 2-dimensional carbon thin film has a water contact angle value of 65-75°.

In another embodiment, the 2-dimensional carbon thin film is a smooth film, or a crumpled film. It will be understood that the term "crumpled" refers to the form of the film, which may contain a plurality or discernible ridges, trenches, grooves, corrugations of protrusions. More particularly, crumpled carbon films will be understood to be those having a root mean square roughness greater than 20 nm and median peak-to-valley value greater than 30 nm measured via atomic force microscopy. Smooth films will be understood to be those having a root mean square roughness below 1 nm (for example below 0.5 nm).

In another embodiment, the 2-dimensional carbon thin film has a Raman spectrum according to that shown in FIG. 8.

In another embodiment, the 2-dimensional carbon thin film has a BET surface area≥300 $m^2g^{-1}$. Suitably, the 2-dimensional carbon thin film has a BET surface area≥400 $m^2g^{-1}$. More suitably, the 2-dimensional carbon thin film has a BET surface area≥450 $m^2g^{-1}$. Most suitably, the 2-dimensional carbon thin film has a BET surface area≥500 $m^2g^{-1}$.

In another embodiment, the 2-dimensional carbon thin film has a BET surface area of 300-700 $m^2g^{-1}$. Suitably, the 2-dimensional carbon thin film has a BET surface area of 300-550 $m^2g^{-1}$. More suitably, the 2-dimensional carbon thin film has a BET surface area of 350-550 $m^2g^{-1}$.

In another embodiment, the 2-dimensional carbon thin film has pore volume of ≥0.15 $cm^3/g$ (e.g. 0.15-0.35 $cm^3/g$). Suitably, the 2-dimensional carbon thin film has pore volume of ≥0.2 $cm^3/g$. More suitably, the 2-dimensional carbon thin film has pore volume of ≥0.22 $cm^3/g$. Most suitably, the 2-dimensional carbon thin film has pore volume of ≥0.25 $cm^3/g$.

In another embodiment, the 2-dimensional carbon thin film has an average pore width of 0.3-0.7 nm. Suitably, the 2-dimensional carbon thin film has an average pore width of 0.45-0.6 nm.

In another embodiment, the 2-dimensional carbon thin film is conductive. Conductive carbon thin films represent an attractive prospect to the field of electronics.

In another embodiment, the 2-dimensional carbon thin film is transparent. Suitably, the 2-dimensional carbon thin film has a light transmittance at a wavelength of 550 nm of ≥40% at a film thickness of 3 nm. More suitably, the 2-dimensional carbon thin film has a light transmittance at a wavelength of 550 nm of ≥50% at a film thickness of 3 nm. Even more suitably, the 2-dimensional carbon thin film has a light transmittance at a wavelength of 550 nm of ≥55% at a film thickness of 3 nm. Even more suitably, the 2-dimensional carbon thin film has a light transmittance at a wavelength of 550 nm of ≥60% at a film thickness of 3 nm. Even more suitably, the 2-dimensional carbon thin film has a light transmittance at a wavelength of 550 nm of ≥65% at a film thickness of 3 nm. Even more suitably, the 2-dimensional carbon thin film has a light transmittance at a wavelength of 550 nm of ≥70% at a film thickness of 3 nm. Yet more suitably, the 2-dimensional carbon thin film has a light transmittance at a wavelength of 550 nm of ≥75% at a film thickness of 3 nm. Yet more suitably, the 2-dimensional carbon thin film has a light transmittance at a wavelength of 550 nm of ≥80% at a film thickness of 3 nm. Most suitably, the 2-dimensional carbon thin film has a light transmittance at a wavelength of 550 nm of ≥82% at a film thickness of 3 nm.

In another embodiment, the continuous 2-dimensional carbon thin film has a sheet resistance of ≤21 kΩ/square (kΩ/□) (e.g. 0.6-21 kΩ/square or 0.8-21 kΩ/square). Suitably, the continuous 2-dimensional carbon thin film has a sheet resistance of ≤15 kΩ/square. More suitably, the continuous 2-dimensional carbon thin film has a sheet resistance of ≤10 kΩ/square. Even more suitably, the continuous 2-dimensional carbon thin film has a sheet resistance of ≤8 kΩ/square. Yet more suitably, the continuous 2-dimensional carbon thin film has a sheet resistance of ≤6 kΩ/square. Yet more suitably, the continuous 2-dimensional carbon thin film has a sheet resistance of ≤4 kΩ/square. Most suitably, the continuous 2-dimensional carbon thin film has a sheet resistance of ≤2.5 kΩ/square.

In another embodiment, the continuous 2-dimensional carbon thin film has a transmittance of 80-90% at 550 nm and 2.5-5 nm thickness and a sheet resistance of ≤10 kΩ/square (e.g. 0.6-21 kΩ/square or 0.8-10 kΩ/square). Suitably, the continuous 2-dimensional carbon thin film has a transmittance of 80-90% at 550 nm and 2.5-5 nm thickness and a sheet resistance of ≤7.5 kΩ/square (e.g. 0.8-7.5 kΩ/square). More suitably, the continuous 2-dimensional carbon thin film has a transmittance of 80-90% at 550 nm and 2.5-5 nm thickness and a sheet resistance of ≤5 kΩ/square (e.g. 0.8-5 kΩ/square). Even more suitably, the continuous 2-dimensional carbon thin film has a transmittance of 80-90% at 550 nm and 2.5-5 nm thickness and a sheet resistance of ≤3 kΩ/square (e.g. 0.8-3 kΩ/square).

In a particularly suitable embodiment, the continuous 2-dimensional carbon thin film has a transmittance of ≥90% at 550 nm and 2.5-5 nm thickness and a sheet resistance of ≤10 kΩ/square (e.g. 0.8-10 kΩ/square). Suitably, the continuous 2-dimensional carbon thin film has a transmittance of ≥90% at 550 nm and 2.5-5 nm thickness and a sheet resistance of ≤5 kΩ/square. More suitably, the continuous 2-dimensional carbon thin film has a transmittance of ≥90% at 550 nm and 2.5-5 nm thickness and a sheet resistance of ≤3 kΩ/square.

The continuous 2-dimensional carbon thin films may have an area greater than 0.0001 $cm^2$. Suitably, the continuous 2-dimensional carbon thin films may have an area greater than 0.001 $cm^2$. More suitably, the continuous 2-dimensional carbon thin films may have an area greater than 0.01 $cm^2$. Yet more suitably, continuous 2-dimensional carbon thin films may have an area greater than 0.1 $cm^2$. Yet more suitably, the continuous 2-dimensional carbon thin films may have an area greater than 1 $cm^2$.

Suitably, the continuous 2-dimensional carbon thin films may have an area greater than 10 $cm^2$. More suitably, the continuous 2-dimensional carbon thin films may have an area greater than 20 $cm^2$. Even more suitably, the continuous 2-dimensional carbon thin films may have an area greater than 25 $cm^2$. Yet more suitably, the continuous 2-dimensional carbon thin films may have an area greater than 30 $cm^2$. Yet more suitably, the continuous 2-dimensional carbon thin films may have an area greater than 35 $cm^2$. Most suitably, the continuous 2-dimensional carbon thin films may have an area greater than 40 $cm^2$ (e.g. 40-100 $cm^2$ or 40-60 $cm^2$).

The continuous 2-dimensional carbon thin films are substantially defect free. For example, the continuous 2-dimensional carbon thin films may exhibit a sheet resistance of ≤850 S/square (e.g. 600-800 Ω/square) for a 7.6 cm×2.5 cm sample and measured via two probe technique across a 2 cm probe distance. In an embodiment, the continuous 2-dimensional carbon thin films are such that the sheet resistance of film remains <800 Ω/square across a 2.5 cm probe distance. Suitably, the continuous 2-dimensional carbon thin films are such that the sheet resistance of film remains <800 Ω/square across a 3.4 cm probe distance. More suitably, the continuous 2-dimensional carbon thin films are such that the sheet resistance of film remains <820 Ω/square across a 4.6 cm probe distance.

As described hereinbefore, the present invention also provides a continuous 2-dimensional carbon thin film obtained, directly obtained or obtainable by a process defined herein, wherein the continuous 2-dimensional carbon thin film is as defined in the first aspect of the invention, or has an area divided by thickness ratio (A/T) of greater than $10^8$ nm.

Preparation of 2-Dimensional Carbon Thin Films

As described hereinbefore, the present invention also provides a process for the preparation of the continuous 2-dimensional carbon thin film as defined herein, the process comprising the steps of:
a) providing an organic polymeric thin film that has been prepared by an interfacial polymerisation process, said thin film having a thickness of less than 100 nm; and
b) subjecting the organic polymeric thin film of step a) to a carbonisation process.

The present invention also provides a process for the preparation of the continuous 2-dimensional carbon thin film as defined herein, the process comprising the steps of:
a) preparing an organic polymeric thin film by an interfacial polymerisation process, said thin film having a thickness of less than 100 nm; and
b) subjecting the organic polymeric thin film of step a) to a carbonisation process.

The inventors have surprisingly found that continuous 2-dimensional carbon thin films having improved dimensional characteristics can be reliably fabricated by preparing a polymeric precursor thin film by interfacial polymerisation and then carbonising the polymeric thin film to remove some or all non-carbon atoms originally present within the thin film. When compared with prior art techniques used for the preparation of 2-dimensional carbon thin films, the process of the invention affords a markedly higher degree of control over the dimensions of the resulting carbon thin film. Specifically, the use of a polymeric precursor thin film prepared by interfacial polymerisation allows the thickness and area of the resulting carbon thin film to be tuned according to the intended application. Hence, when compared with chemical vapour deposition techniques requiring a metal substrate/catalyst (e.g. nickel or copper), the present invention provides a facile means of obtaining large size 2-dimensional carbon thin films having advantageous electronic and optical properties, without the need of a metal catalyst. Moreover, unlike CVD-prepared graphene, the large films of the invention of readily separable from any substrate used in carbonisation step b), without any attendant loss in the integrity and/or morphology of the film.

As will be familiar to persons of skill in the art, interfacial polymerisation is a type of step growth polymerization of two reactants occurring at the interface between two immiscible liquid phases (typically aqueous and organic), each containing one of the reactants. At least one reactant has low solubility in the other liquid phase. This ensures a controlled introduction of one reactant into an excess of reactant in the other phase. The reaction rate is typically high, so that reactants diffuse to the interface and combine almost stoichiometrically to form high molecular weight network polymers.

Persons of skill in the art will be equally familiar with carbonisation processes (e.g. pyrolysis). Carbonisation refers to the conversion of an organic material, including an organic polymeric material, into a carbon residue in which the fraction of carbon is substantially higher than in the starting organic material. The carbonisation process chemically removes some or all non-carbon atoms while also changing the bonding of the carbon atoms within the residue. Carbonisation processes typically include heating the organic material under high temperature in the presence of hydrogen or under vacuum.

The organic polymeric thin film may be pre-prepared by an interfacial polymerisation process described herein. Alternatively, step a) may comprise the active step of preparing an organic polymeric thin film by an interfacial polymerisation process.

In an embodiment of the invention, in step a), the organic polymeric thin film is formed by interfacial polymerisation on a supporting substrate. A variety of supporting substrates will be familiar to those of skill in the art, including polymers, ceramics, fibrous mats, and woven meshes. Exemplary polymers that may be used as supporting substrates include polyimides, polysulfones, polyether sulphones, polyvinylidene fluorides, polyacrylonitrile, PTFE, nylon, cellulose acetate, cellulose nitrate, polycarbonate and/or copolymers or cross-linked derivatives thereof. Exemplary ceramic supports include porous silicas and porous aluminas. Exemplary fibrous mats include carbon nanofiber networks and assemblies of carbon nanotubes.

In another embodiment, when step a) comprises the use of a supporting substrate, the organic polymeric thin film is separated from the supporting substrate prior to performing carbonisation step b). The polymeric thin film may be separated from the supporting substrate by any available technique, including peeling, floating using a liquid or gas, or dissolving the supporting substrate in a solvent or acid that leaves the polymeric thin film intact.

In a particular embodiment, in step a), the organic polymeric thin film is interfacially polymerised on a $Cd(OH)_2$ nanostrand fabricated on a supporting substrate. The nanostrand may be sacrificial, in the sense that it is degraded following the formation of the polymeric thin film. Suitably, the organic polymeric thin film is separated from the supporting substrate (e.g. $Cd(OH)_2$) by contacting the supported organic polymeric thin film with a medium (e.g. an acid, or a particular solvent) in which the supporting substrate is degradable (e.g. dissolvable) and in which the organic polymeric thin film remains substantially intact.

The organic polymeric thin film formed in step a) may be prepared by interfacial polymerisation at the interface of two immiscible liquids. In such embodiments, it may not be necessary to use a supporting substrate. Optionally, during interfacial polymerisation, the two immiscible liquids be agitated (e.g. shaken), thereby increasing the area of interface at which the reaction proceeds. Interfacial polymerisation conducted with agitation may provide a plurality of organic polymeric thin films, the dimensions of which may be such that the plurality of thin films can be considered as a powder.

Once prepared, the organic polymeric thin film formed in step a) may be freeze dried.

In an embodiment, in step b) the organic polymeric thin film is placed on a carbonisation support prior to being carbonised. Any suitable carbonisation support may be used. Exemplary supports include silicon, copper and quartz. Following carbonisation, the 2-dimensional carbon thin film may be separated from the carbonisation substrate by any available technique, including peeling, floating using a liquid or gas, or dissolving the carbonisation substrate in a solvent or acid that leaves the 2-dimensional carbon thin film intact.

The carbonisation step b) may comprise heating the organic polymeric thin film of step a) to a temperature greater than 300° C. in the absence of oxygen.

Suitably, the carbonisation step b) may comprise heating the organic polymeric thin film of step a) to a temperature greater than 500° C. in the absence of oxygen.

In a particularly suitable embodiment, the carbonisation step b) may comprise heating the organic polymeric thin film of step a) to a temperature of 500-1500° C. in the absence of oxygen. When high temperatures are used, a ceramic support may be necessary. Suitably, the carbonisation step b) may comprise heating the organic polymeric thin film of step a) to a temperature of 500-1200° C. in the absence of oxygen. More suitably, the carbonisation step b) may comprise heating the organic polymeric thin film of step a) to a temperature of 550-1150° C. in the absence of oxygen. For example, carbonisation step b) may comprise heating the organic polymeric thin film of step a) to a temperature of 850-1150° C. in the absence of oxygen.

Alternatively, the carbonisation step b) comprises heating the organic polymeric thin film of step a) to a temperature greater than 900° C. in the absence of oxygen.

Alternatively, the carbonisation step b) comprises heating the organic polymeric thin film of step a) to a temperature greater than 1500° C. in the absence of oxygen. Heating to temperatures greater than 1500° C. may, for example, be used when the polymeric thin film is provided as a powder.

Carbonisation step b) may comprise heating the organic polymeric thin film of step a) to any temperature defined herein in the absence of oxygen for a period of 10 minutes to 6 hours. Suitably, carbonisation step b) may comprise heating the organic polymeric thin film of step a) to any temperature defined herein in the absence of oxygen for a period of 10 minutes to 5 hours. More suitably, carbonisation step b) may comprise heating the organic polymeric thin film of step a) to any temperature defined herein in the absence of oxygen for a period of 10 minutes to 3 hours. Even more suitably, carbonisation step b) may comprise heating the organic polymeric thin film of step a) to any temperature defined herein in the absence of oxygen for a period of 30 minutes to 2 hours.

In a particularly suitable embodiment, carbonisation step b) comprises heating the organic polymeric thin film of step a) to a temperature of 500-1500° C. in the absence of oxygen at a rate of 2-8° C./minute, and then holding the temperature at 500-1500° C. for 0.2-6 hours (e.g. 0.5-1.5 hours).

In an embodiment, the carbonisation step be may be conducted under vacuum. Alternatively, the carbonisation step be may comprise heating the organic polymeric thin film of step a) in a reducing atmosphere. Suitably, the reducing atmosphere comprises greater than 5 vol % hydrogen.

In an embodiment, the carbonisation step is conducted in an atmosphere of argon or in an atmosphere of argon/hydrogen.

In a particular embodiment, the carbonisation step is conducted initially under vacuum, followed by a subsequent carbonisation step in a reducing atmosphere. Alternatively, the carbonisation step is conducted initially in a reducing atmosphere, followed by a subsequent carbonisation step under vacuum.

Alternatively, or additionally, the carbonisation process may be performed by subjecting the organic polymeric thin film to microwave radiation. In such embodiments, the organic polymeric thin film may be supported on quartz (e.g. placed within a quartz crucible).

In another embodiment, the product of carbonisation step b) is contacted with a reducing agent. Any suitable reducing agent may be used. Suitably the reducing agent is selected from hydrazine, chlorine, fluorine, bromine, iodine, hydrogen chloride, hydrogen bromide and hydrogen iodide.

In another embodiment, the carbonisation step defined herein may be followed by one or more subsequent carbonisation steps to further carbonise the material. For example, the process may comprise a first carbonisation step selected from any of the processes defined hereinbefore and one or more subsequent carbonisation steps (for example a step of contacting the product of the first carbonisation step with a reducing agent as defined hereinabove).

The organic polymeric thin film of step a) may comprise any polymer that can be suitably prepared by interfacial polymerisation. In an embodiment, the organic polymeric thin film comprises one or more polymers selected from polyamides, polyurea, polypyrrolidines, polyesters, polyurethanes, polyketones, polysiloxanes, poly(amide imide), poly (ether amide) and poly(urea amide).

Suitably, the organic polymeric thin film prepared in step a) is a network polymer. Network polymers will be readily understood by those of skill in the art as being those polymers which possess a covalently cross-linked 3-dimensional polymeric network (as being distinct from "non-network polymer" (or a "linear" polymer) in which the polymers do not have a covalently cross-linked 3-dimensional structure).

In a particular embodiment, the organic polymeric thin film comprises a plurality of 6-membered aryl or heteroaryl moieties (e.g. the monomers of the polymeric thin film comprise one or more 6-membered aryl or heteroaryl moieties).

In a particular embodiment, the organic polymeric thin film is formed in step a) by interfacial polymerisation of silicon-containing monomers.

The organic polymeric thin film of step a) may be a polymer having intrinsic microporosity (PIM). PIMs will be understood by those of skill in the art to be those polymers having a continuous network of interconnected intermolecular voids (suitably of less than or equal to 2 nm in size), which forms as a direct consequence of the shape and rigidity (or concavity) of at least a proportion of the component monomers of the network polymer. Consequently, when the organic polymeric thin film of step a) is a PIM, at least one of the reagents used to prepare it possesses concavity. An example of a moiety having concavity which may be used in the preparation of a PIM is shown below:

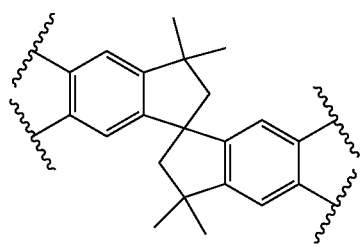 [SMILES: *c1cc2c(cc1*)C1(CC2(C)C)CC(C)(C)c2cc(*)c(*)cc21]

Suitable PIMs for use as part of the present invention are discussed in WO2013/057492.

In a particular embodiment, the organic polymeric thin film formed in step a) is a polyamide. The polyamide may be prepared by interfacially polymerising of at least one amine-containing reagent with at least one carboxy-containing reagent, thereby providing a network of amido-linked moieties.

Any suitable concentrations of the at least one amine-containing reagent and the at least one carboxy-containing reagent may be used. In an embodiment, the at least one amine-containing reagent is provided as a first solution containing 0.01-16.0 wt % of the at least one amine-containing reagent in a first solvent, and the at least one carboxy-containing reagent is provided as a second solution containing 0.0005-8.0 wt % of the at least one carboxy-containing reagent in a second solvent. Any suitable first and second solvent may be used. Suitably, the first solvent is water, and the second solvent is organic (e.g. hexane).

It will be understood that any suitable amine-containing reagent and carboxy-containing reagent may be used. Suitably, the amine-containing reagent and carboxy-containing reagent are not mono-functional (i.e. they contain more than one amine or carboxy functionality each).

Suitably, the at least one amine-containing reagent contains at least one 6-membered aryl or heteroaryl moiety, and/or the at least one carboxy-containing reagent contains at least one 6-membered aryl or heteroaryl moiety. Accordingly, in an embodiment, the at least one amine-containing reagent is an aryl amine or heteroaryl amine and the at least one carboxy-containing reagent is an aryl or heteroaryl carboxy-containing compound (e.g. an aryl or heteroaryl acyl halide).

In another embodiment, the amine-containing reagent may contain primary, secondary or tertiary amine groups, or a mixture of each.

In a particular embodiment, the at least one amine-containing reagent is selected from m-phenylenediamine (MPD), p-phenylenediamine (PPD), piperazine (PIP) or 4-(aminomethyl)piperidine (AMP) and/or the at least one carboxy-containing reagent is an acyl chloride (e.g. 1,3,5-benzenetricarbonyl chloride or trimesoyl chloride (TMC)).

In an embodiment, the first solution contains 0.1-10.0 wt % of the least one amine-containing reagent. Suitably, the first solution contains 0.1-5.0 wt % of the least one amine-containing reagent. More suitably, the first solution contains 0.3-4.5 wt % of the least one amine-containing reagent. Even more suitably, the first solution contains 0.1-0.4 wt % of the least one amine-containing reagent.

In another embodiment, the second solution contains 0.001-0.6 wt % of the at least one carboxy-containing reagent. Suitably, the second solution contains 0.001-3.0 wt % of the at least one carboxy-containing reagent. More suitably, the second solution contains 0.001-0.5 wt % of the at least one carboxy-containing reagent. Even more suitably, the second solution contains 0.0025-0.5 wt % wt % of the at least one carboxy-containing reagent. Yet even more suitably, the second solution contains 0.0025-0.02 wt % of the at least one carboxy-containing reagent. Most suitably, the second solution contains 0.0025-0.01 wt % of the at least one carboxy-containing reagent.

Particular concentrations of the at least one amine-containing reagent and the at least one carboxy-containing reagent are outlined in the following numbered paragraphs:

1) 0.01-16.0 wt % of the least one amine-containing reagent and 0.0005-6.0 wt % of the at least one carboxy-containing reagent.
2) 0.01-16.0 wt % of the least one amine-containing reagent and 0.0005-3.0 wt % of the at least one carboxy-containing reagent.
3) 0.01-16.0 wt % of the least one amine-containing reagent and 0.0005-0.8 wt % of the at least one carboxy-containing reagent.
4) 0.01-10.0 wt % of the least one amine-containing reagent and 0.0005-0.5 wt % of the at least one carboxy-containing reagent.
5) 0.01-10.0 wt % of the least one amine-containing reagent and 0.002-0.5 wt % of the at least one carboxy-containing reagent.
6) 0.01-5.0 wt % of the least one amine-containing reagent and 0.002-0.5 wt % of the at least one carboxy-containing reagent.
7) 0.01-5.0 wt % of the least one amine-containing reagent and 0.0025-0.5 wt % of the at least one carboxy-containing reagent.
8) 0.01-4.5 wt % of the least one amine-containing reagent and 0.0025-0.3 wt % of the at least one carboxy-containing reagent.
9) 0.04-4.5 wt % of the least one amine-containing reagent and 0.0025-0.3 wt % of the at least one carboxy-containing reagent.
10) 0.04-4.5 wt % of the least one amine-containing reagent and 0.0025-0.2 wt % of the at least one carboxy-containing reagent.
11) 0.04-4.0 wt % of the least one amine-containing reagent and 0.0025-0.1 wt % of the at least one carboxy-containing reagent.
12) 0.04-4.0 wt % of the least one amine-containing reagent and 0.0025-0.05 wt % of the at least one carboxy-containing reagent.
13) 0.04-4.0 wt % of the least one amine-containing reagent and 0.0025-0.01 wt % of the at least one carboxy-containing reagent.
14) 0.04-1.0 wt % of the least one amine-containing reagent and 0.0025-0.01 wt % of the at least one carboxy-containing reagent.

In a particularly suitable embodiment, the first solution contains 0.02-0.3 wt % of the least one amine-containing reagent (e.g. MPD) and the second solution contains 0.02-0.3 wt % wt % of the at least one carboxy-containing reagent (e.g. TMC). Suitably, the first solution contains 0.03-0.2 wt % of the least one amine-containing reagent (e.g. MPD) and the second solution contains 0.03-0.2 wt % of the at least one carboxy-containing reagent (e.g. TMC). More suitably, the first solution contains 0.03-0.1 wt % of the least one amine-containing reagent (e.g. MPD) and the second solution contains 0.03-0.1 wt % of the at least one carboxy-containing reagent (e.g. TMC). Most suitably, the first solution contains 0.03-0.08 wt % of the least one amine-containing reagent (e.g. MPD) and the second solution contains 0.03-0.08 wt % of the at least one carboxy-containing reagent (e.g. TMC).

Where the concentration of the amine-containing reagent is greater than 1 wt %, and the ratio of amine-containing reagent to carboxy-containing reagent is less than 200 or preferably less than 50, the organic polymeric thin film may have crumpled morphology. This morphology may be preserved during the subsequent carbonisation step.

Alternatively, where the concentration of the amine-containing reagent is greater than 3 wt %, and the ratio of amine-containing reagent to carboxy-containing reagent is less than 20, and the amine-containing reagent and carboxy-containing reagent are reacted for 0.5-2 minutes (e.g. 1 min) at the interface between an aqueous saturated nanostrand layer and a hexane phase, the organic polymeric thin film may have crumpled morphology. This morphology may be preserved during the subsequent carbonisation step In an embodiment, the organic polymeric thin film formed in step a) has a thickness of less than 100 nm. Suitably, the organic polymeric thin film formed in step a) has a thickness of less than 50 nm. More suitably, the organic polymeric thin film formed in step a) has a thickness of less than 40 nm. Even more suitably, the organic polymeric thin film formed in step a) has a thickness of less than 30 nm. Yet even more suitably, the organic polymeric thin film formed in step a) has a thickness of less than 25 nm. Still even more suitably, the organic polymeric thin film formed in step a) has a thickness of less than 20 nm. Still even more suitably, the organic polymeric thin film formed in step a) has a thickness of less than 15 nm. Most suitably, the organic polymeric thin film formed in step a) has a thickness of less than 10 nm In another embodiment, following the preparation of the organic polymeric thin film in step a), the organic polymeric thin film is treated with an activating solvent. The use of activating solvents to improve the flux of thin film composite membranes formed by interfacial polymerisation, by contacting the thin film composite membrane with an activating solvent after the interfacial polymerisation reaction, is known in the literature (Jimenez-Solomon M, Bhole Y, and Livingston AG "High Flux Membranes for Organic Solvent Nanofiltration (OSN): Interfacial Polymerisation with Solvent Activation" *J. Mem. Sci.* 423 (2012) pp 371-382). The use of such activating solvents may confer advantages upon the resulting 2-dimensional carbon thin film. Suitably, the activating solvent is a polar aprotic solvent. More suitably, the activating solvent is selected form DMF, DMSO, DMAc, THF and methyl THF. Even more suitably, the activating solvent is selected form DMF, DMSO or DMAc.

In another embodiment, following the preparation of the organic polymeric thin film in step a), the organic polymeric thin film is treated with a compound that induces the formation of charge transfer complexes within aromatic rings that may be present within the organic polymeric thin film. Any suitable compound for inducing the formation of charge transfer complexes may be used. Suitably, the formation of charge transfer complexes is induced by contacting the organic polymeric thin film with iodine vapour under vacuum.

Following carbonisation step b), the 2-dimensional carbon thin film may be transferred onto a porous support material (e.g. cross-linked polyimide). This may be achieved by, for example, conducting carbonisation step b) on a sacrificial carbonisation support, which can be dissolved following carbonisation step b), thereby allowing the 2-dimensional carbon thin film to be then transferred onto a porous support material. The porous support material may be an ultrafiltration membrane. Owing to the structure and morphology of the carbon thin films, such assemblies may find utility in separation applications.

Applications of the 2-Dimensional Carbon Thin Films

As described hereinbefore, the present invention also provides a use of a continuous 2-dimensional carbon thin film as defined herein for gas storage and gas separation or as a separation membrane (e.g. liquid separation).

The 2-dimensional carbon thin films of the invention possess a number of surprising properties that make them ideal candidates for certain applications. As evidenced herein, the 2-dimensional carbon thin films have a high surface area and micropore area. Accordingly, the 2-dimensional carbon thin films are able to adsorb large quantities of gas (e.g. $N_2$) at relatively low pressures. Such properties make the 2-dimensional carbon thin films an attractive prospect for a wealth of gas storage and gas separation applications. More specifically, the storage properties of the 2-dimensional carbon thin films may render them useful in medical applications, including drug delivery (wherein the stored species may not be in the gaseous state) and imaging.

Aside from their storage properties, the specific morphology of the 2-dimensional thin films makes them interesting candidates within the field of separation science. The use of an organic polymeric thin film precursor of predetermined structure confers a high degree of control on the morphology (e.g. porosity) of the resulting 2-dimensional carbon thin film, thereby allowing the preparation of filtration membranes have tunable separation characteristics.

Additionally, owing to their excellent separation properties, strength and controlled morphology the 2-dimensional thin films of the present invention may be used in composite materials and plastics. Accordingly, the 2-dimensional thin films of the present invention make excellent candidates for use in thin film composite materials designed for use in, for example, food packaging and condoms.

Noting the electronic industry's growing interest in graphene-type materials, the conductive and transparent nature of 2-dimensional carbon thin films renders them an attractive prospect. Hence, in another aspect, the present invention provides a use of a continuous 2-dimensional carbon thin film as defined herein in an electronic device.

According to a further aspect, the present invention provides a use of a continuous 2-dimensional carbon thin film, continuous 2-dimensional carbonaceous nanofilm or laminate as defined herein in an application selected from tissue engineering, bioimaging (e.g. contrast agents), the polymerase chain reaction, diagnostic devices, drug delivery, biomicrorobitcs, blood sensing, electronics (e.g. in transistors, semiconductors, conducting electrodes, transparent conducting electrodes, conducting electrode on flexible supports, frequency multipliers, optoelectronics, Hall effect sensors, organic electronics, spintronics, optical modulators, infrared light sensors and/or photodetectors), membranes for liquid separation, solar cells (e.g. as charge conductors, light collectors and electrodes), in fuel cells, thermoelectric devices, photo-electro catalysis devices, coatings, supercapacitors, batteries, hydrogen storage, in sensors with adsorbed molecules, wearable devices, magnetic sensors, contaminant removal from gas and liquid streams, water purification, desalination, gas separation membranes, gas storage, molecular adsorbent, plasmonics and metamaterials, as lubricants, in radio wave adsorption, in redox devices, as nanoantennas, in sound transducers, as waterproof coatings, as coolant additives, as reference materials, in thermal management, as structural materials in composites and as catalysts to speed up the rate of chemical reactions.

According to a further aspect of the present invention, there is provided a laminate comprising two or more continuous 2-dimensional carbon thin films or continuous 2-dimensional carbonaceous nanofilms defined herein, wherein the two or more continuous 2-dimensional carbon thin films or continuous 2-dimensional carbonaceous nanofilms are provided in an overlapping or partially overlapping arrangement.

The laminates of the invention contain a plurality of films stacked in an overlapping or partially overlapping arrangement. The overlapping or partially overlapping arrangement may be uniformed or randomised. The laminates make excellent candidates for use in separation membranes, electronic devices and biomedical devices.

EXAMPLES

Examples of the invention will now be described by reference to the accompanying figures, in which:

FIG. 1 is a schematic presentation of the fabrication process of a free-standing polymer thin film via the interfacial polymerization process.

FIG. 2 is an atomic force microscopic image of a polymer thin film fabricated from 0.1 wt % m-phenylenediamine and 0.005 wt % 1,3,5-benzenetricarbonyl chloride. A thickness of approximately 8.4 nm was measured.

FIG. 3 shows a smooth polymer thin film fabricated from 0.1 wt % m-phenylenediamine and 0.005 wt % 1,3,5-benzenetricarbonyl chloride and transferred to a wire lasso; although the film is only ca. 8 nm thick, it forms an integral surface across the whole 1.5 cm diameter of the lasso.

FIG. 4 shows a) the scanning electron microscopic images of crumpled polymer thin film on silicon wafer and b) the resulting 2-dimensional carbon thin film material after the polymer thin film was carbonised by hydrogen carbonisation (argon:hydrogen=9:1) for 1 hour at 900° C. under a hydrogen atmosphere (right). The polymer thin film was a polyamide thin film made from 3 wt % m-phenylenediamine in an aqueous phase and 0.15 wt % 1,3,5-benzenetricarbonyl chloride in a hexane phase, reacted for 1 min at the interface between the aqueous saturated nanostrand layer and the hexane phase. The resulting polyamide thin films were transferred onto silicon wafers for carbonisation.

FIG. 5 shows a) the surface morphology of the 2-dimensional carbon thin film material prepared from a 0.1 wt % water solution of m-phenylenediamine and 0.005 wt % 1,3,5-benzenetricarbonyl chloride in hexane and reacted for 10 min b) the atomic force microscopic height image of 2-dimensional carbon thin film material resulting from carbonising a polyamide thin film about 8 nm thick and c) the height profile of the section of a smooth 2-dimensional carbon thin film material on silicon wafer (in FIG. 5b) showing 3 nm thickness of the 2-dimensional carbon thin film.

FIG. 6 shows a Raman spectra of 2-dimensional carbon thin film material fabricated from smooth and crumpled polymer thin films which were transferred to silicon wafers and carbonised under hydrogen atmosphere (argon:hydrogen=9:1) for 1 h at 900° C. All Raman spectra were collected at 514 nm laser line excitation. The polymer thin films were fabricated by interfacial polymerisation between TMC in hexane either m-phenylenediamine (MPD) or 4-(aminomethyl) piperidine (AMP) in the aqueous phase.

Figure 13:
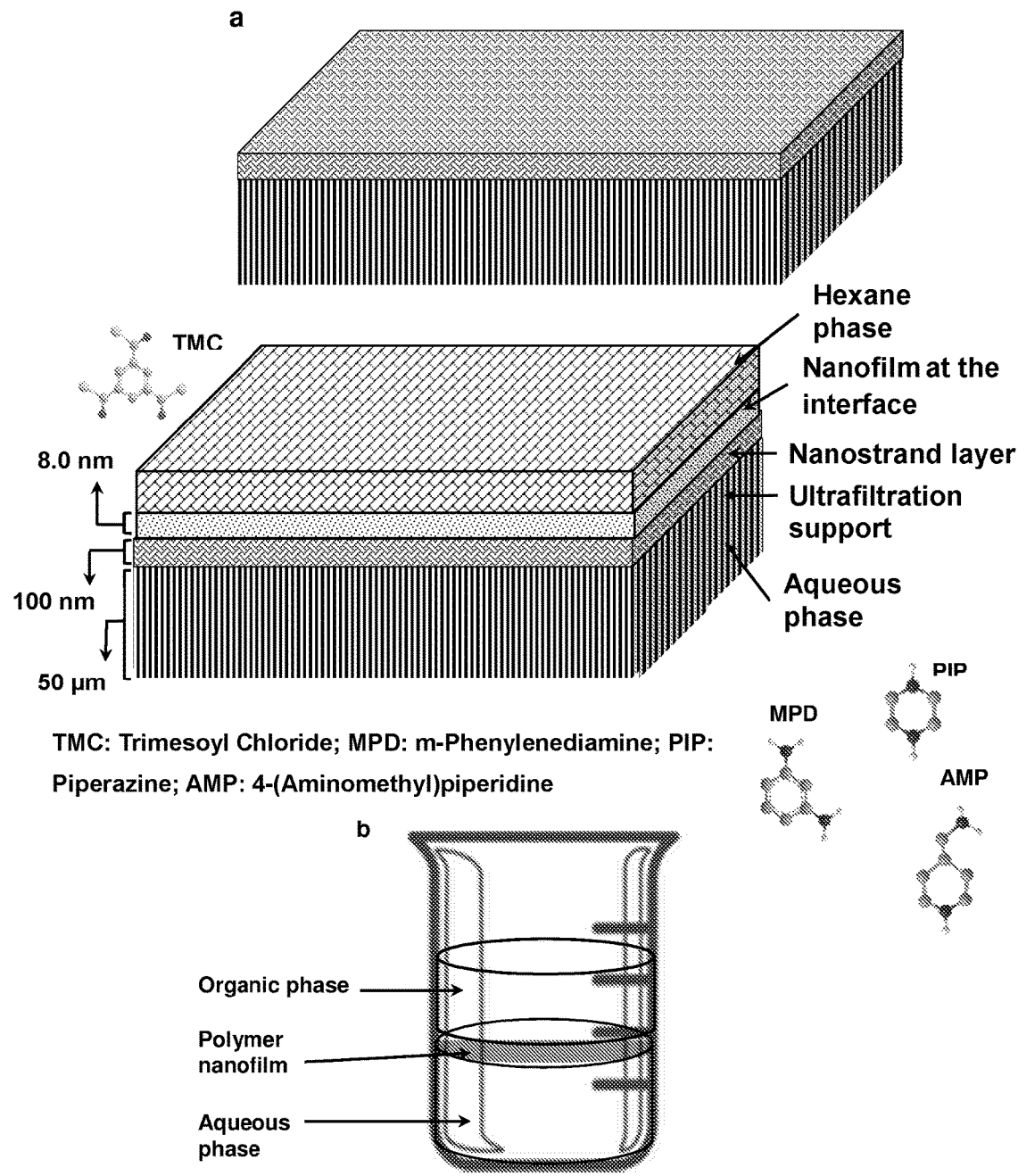
FIG. 13 (a) is a schematic illustrating that the nanostrand layer is saturated with an aqueous solution of diamine and contacted with a hexane layer containing trimesoyl chloride, enabling the formation of polyamide nanofilms. (b) Interfacial polymerisation at the bulk interface in a beaker.
Figure 14:
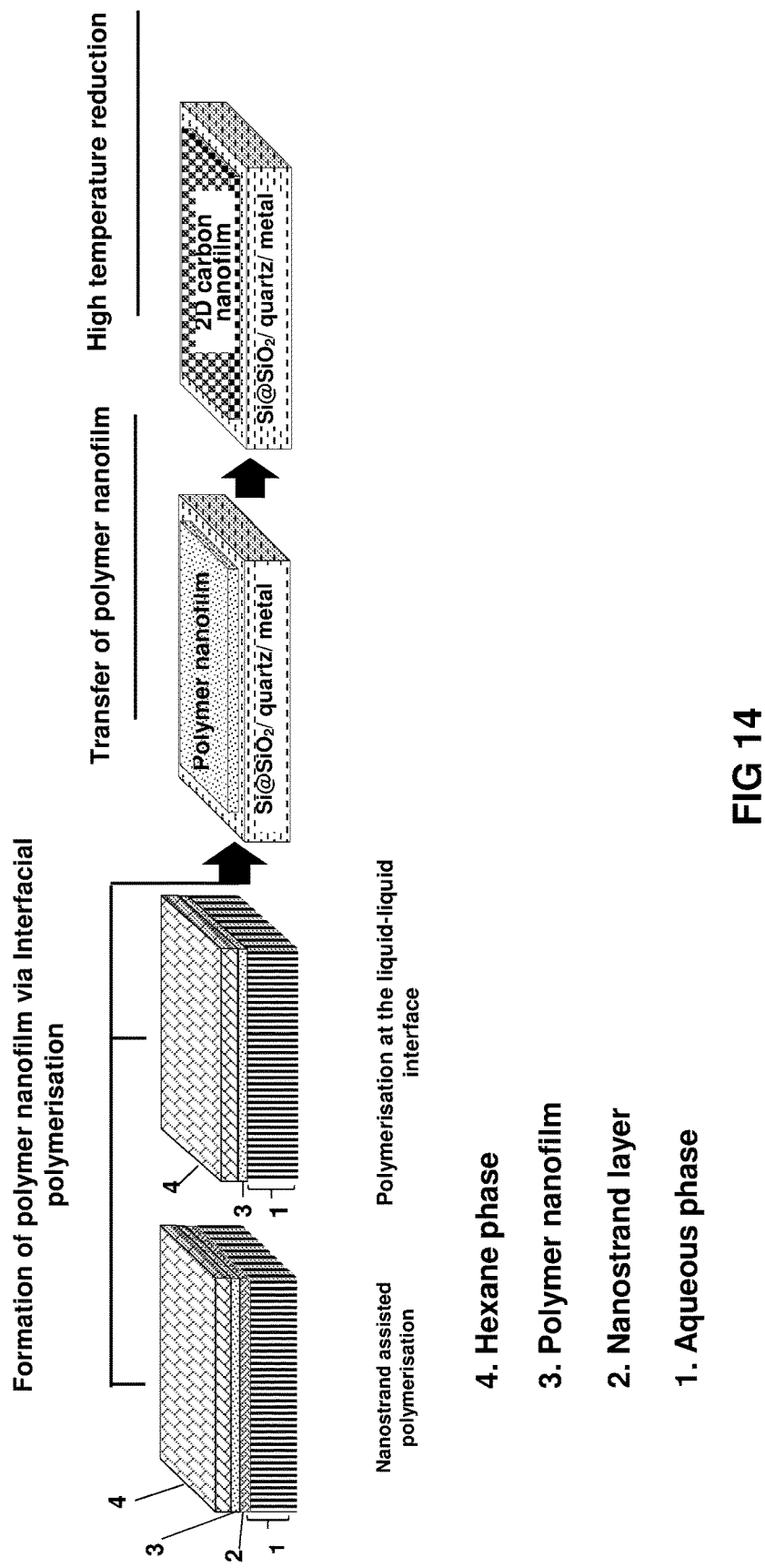

FIG. 14 shows a schematic presentation of the formation of free-standing polymer nanofilm via controlled interfacial polymerisation on a sacrificial $Cd(OH)_2$ nanostrand layer or at the interface of two immiscible bulk liquids enabling the formation of polymer nanofilms (see FIG. 13). 2D carbon nanofilm was fabricated by transferring free-standing polymer nanofilm onto a substrate ($Si@SiO_2$, quartz, Cu, etc) followed by carbonisation at high temperature under diluted $H_2$ atmosphere.

Figure 15:
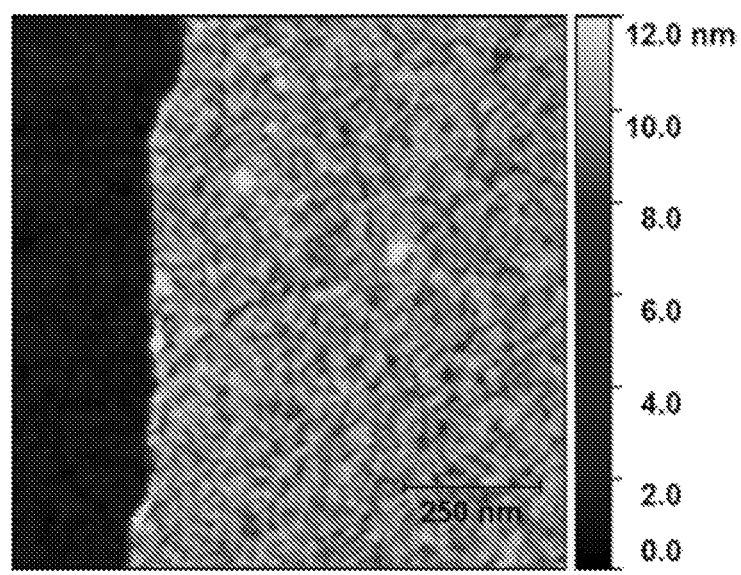
Figure 15:
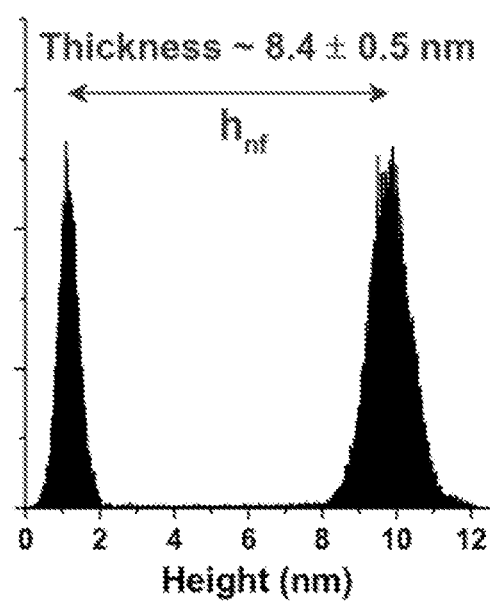

FIG. 15(a) shows AFM surface and (b), height profile of the polyamide nanofilm ($PNF_{MPD\ 0.1-22-0.005-10\ m}$) on $Si@SiO_2$ wafer. Polyamide nanofilm was fabricated on the nanostrand surface by reacting mphenylenediamine (MPD) and trimesoyl chloride (TMC)

Figure 16:
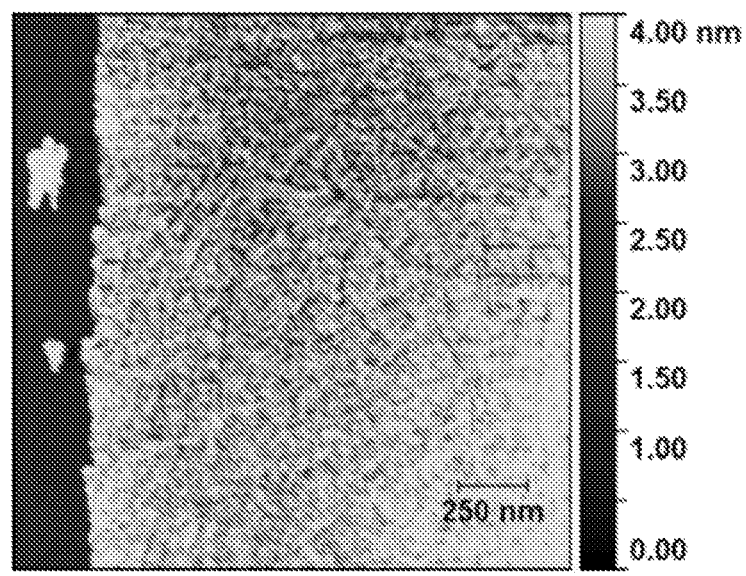
Figure 16:
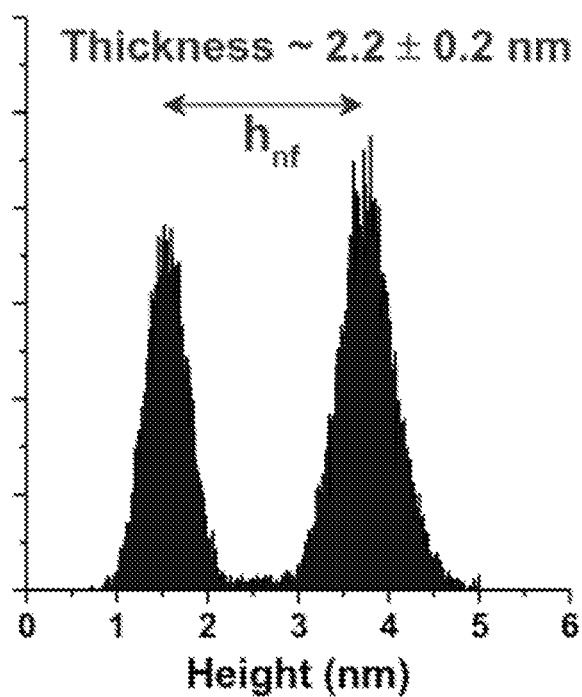

FIG. 16(a) AFM surface and (b), height profile of the 2D carbon nanofilm on $Si@SiO_2$ wafer fabricated by reducing the polymer nanofilm, presented in FIG. 15(a), under diluted $H_2$ atmosphere at 900° C. ($2DC_{MPD\ 0.122-0.005-10\ m}900°\ C._{\cdot R1-H2+Ar-1\ h}$).

Figure 17:
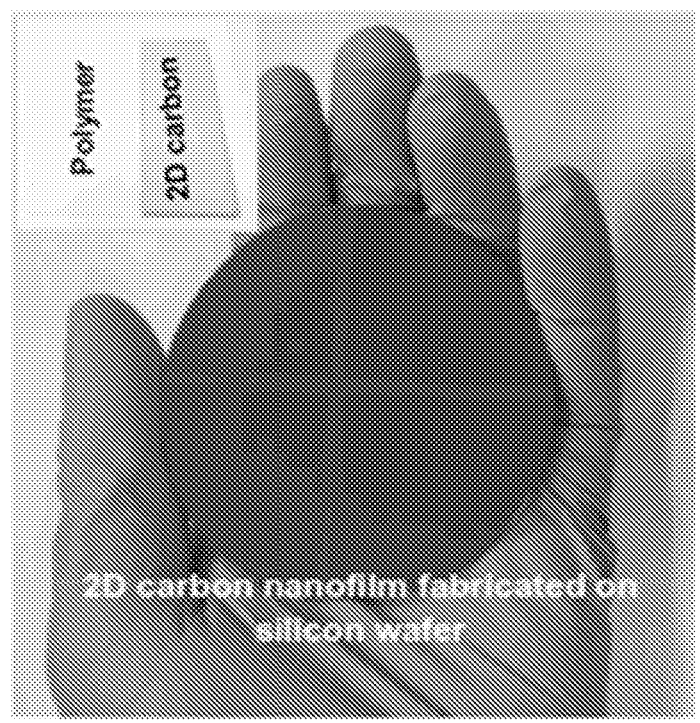

FIG. 17 shows a photograph of a 2D carbon nanofilm ($2DC_{MPD\ 0.05-22-0.005-10\ m}1100°\ C._{\cdot R1-H2+Ar-1\ h}$) onto a 76 mm diameter $Si@SiO_2$ wafer. Inset shows the photograph of the 2D carbon nanofilm on quartz microscope slide and compared with a substrate covered with the polymer nanofilm.

Figure 18:
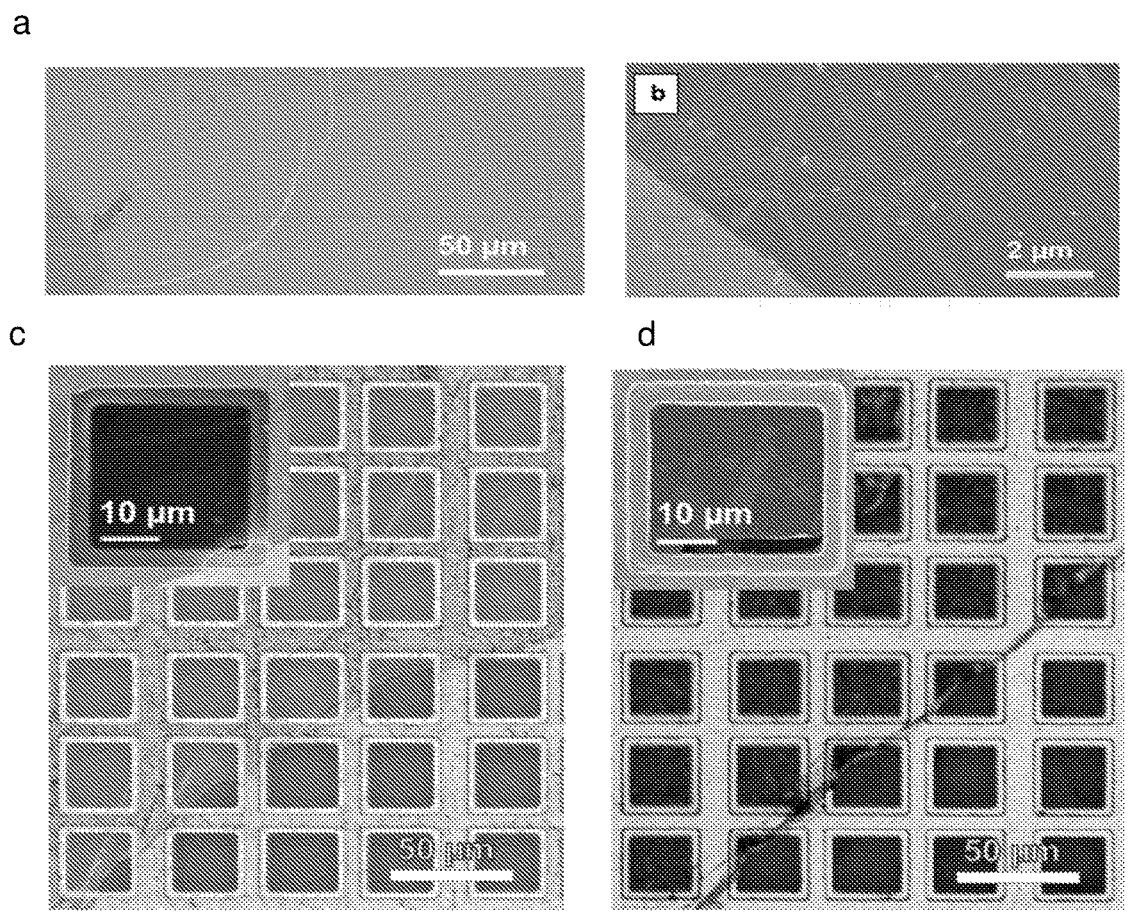

FIG. 18(a) shows an optical microscopic image of a 2D carbon nanofilm on quartz substrate ($2DC_{MPD\ 0.1-22-0.1-1\ m}900°\ C._{\cdot R1-H2+Ar-1\ h}$). Arrow indicates the region where the polymer layer was peeled off before carbonisation process. (b) SEM image of a carbon nanofilm ($2DC_{MPD\ 0.1-22-0.1-1\ m}900°\ C._{\cdot R1-H2+Ar-1\ h}$) fabricated on a copper TEM grid, showing the transparency of carbon nanofilm under electron beam. (i), (j) Optical microscope images of free-standing polymer nanofilm ($2DC_{MPD\ 0.1-22-0.1-1\ m}$) fabricated at the interface of two immiscible liquid and transferred onto a copper mesh and obtained 2D carbon nanofilm ($2DC_{MPD\ 0.1-22-00.1-1\ m}900°\ C._{\cdot R1-H2+Ar-1\ h}$).

Figure 19:
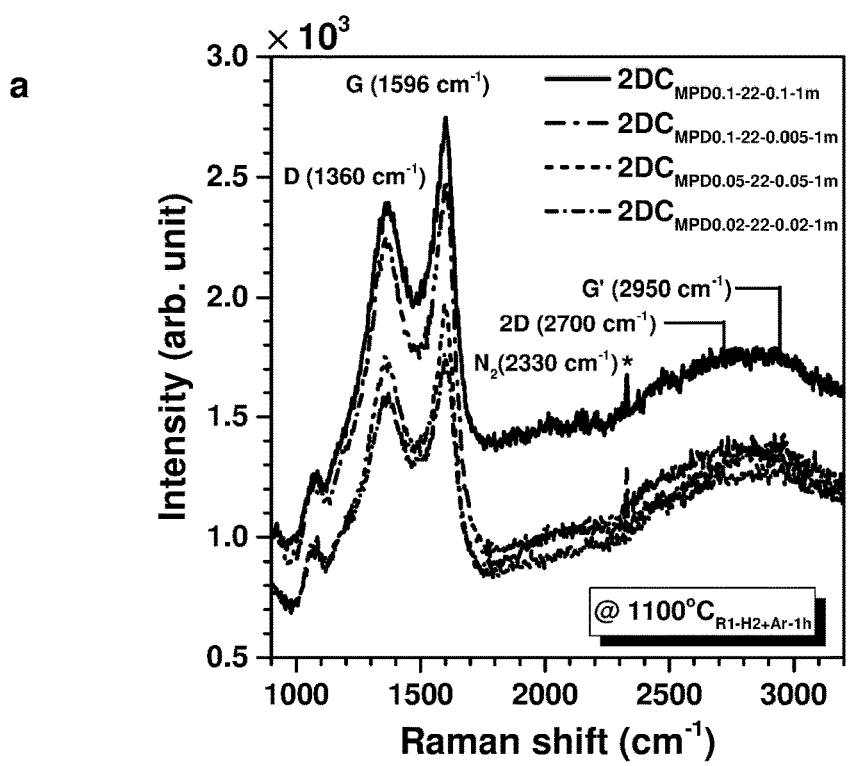
Figure 19:
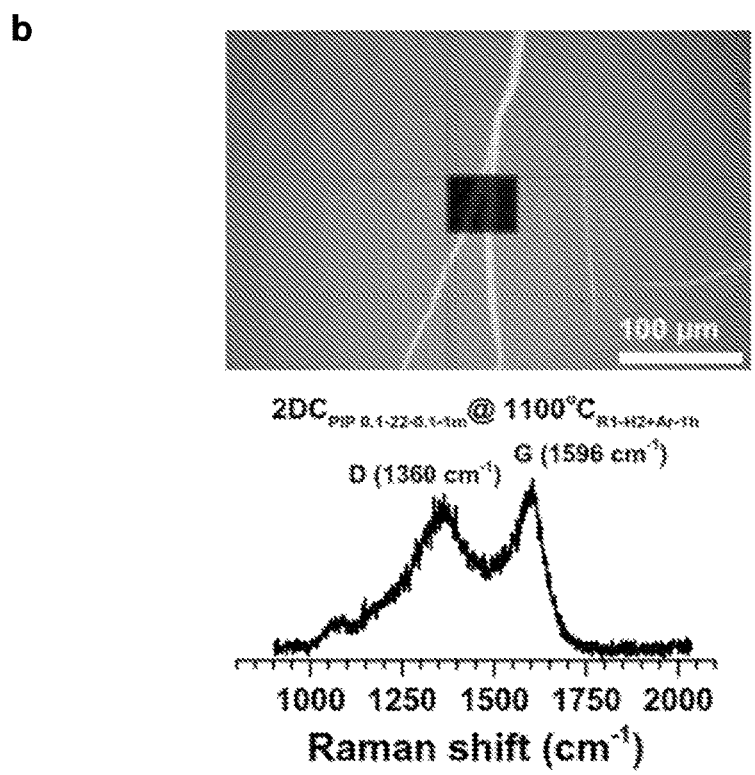

FIG. 19(a) shows Raman spectra of carbon nanofilms fabricated on quartz substrate showing the characteristic D, G, 2D and G' peaks of nano-graphitic carbon. (b) Raman map for 1596 cm$^{-1}$ in the selected region (top) and the Raman spectra (bottom) for carbon nanofilm fabricated from PIP.

Figure 20:
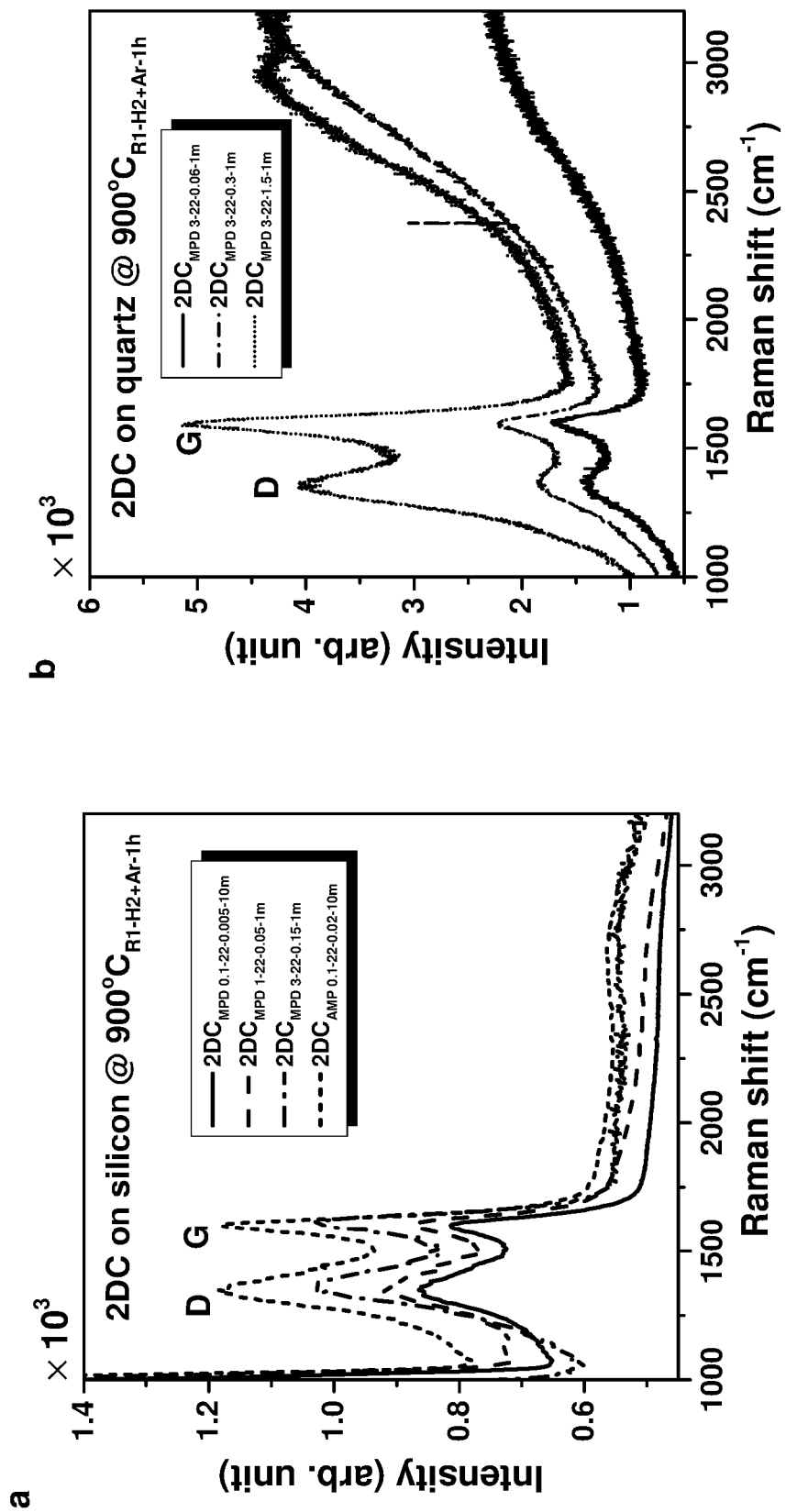
Figure 20:
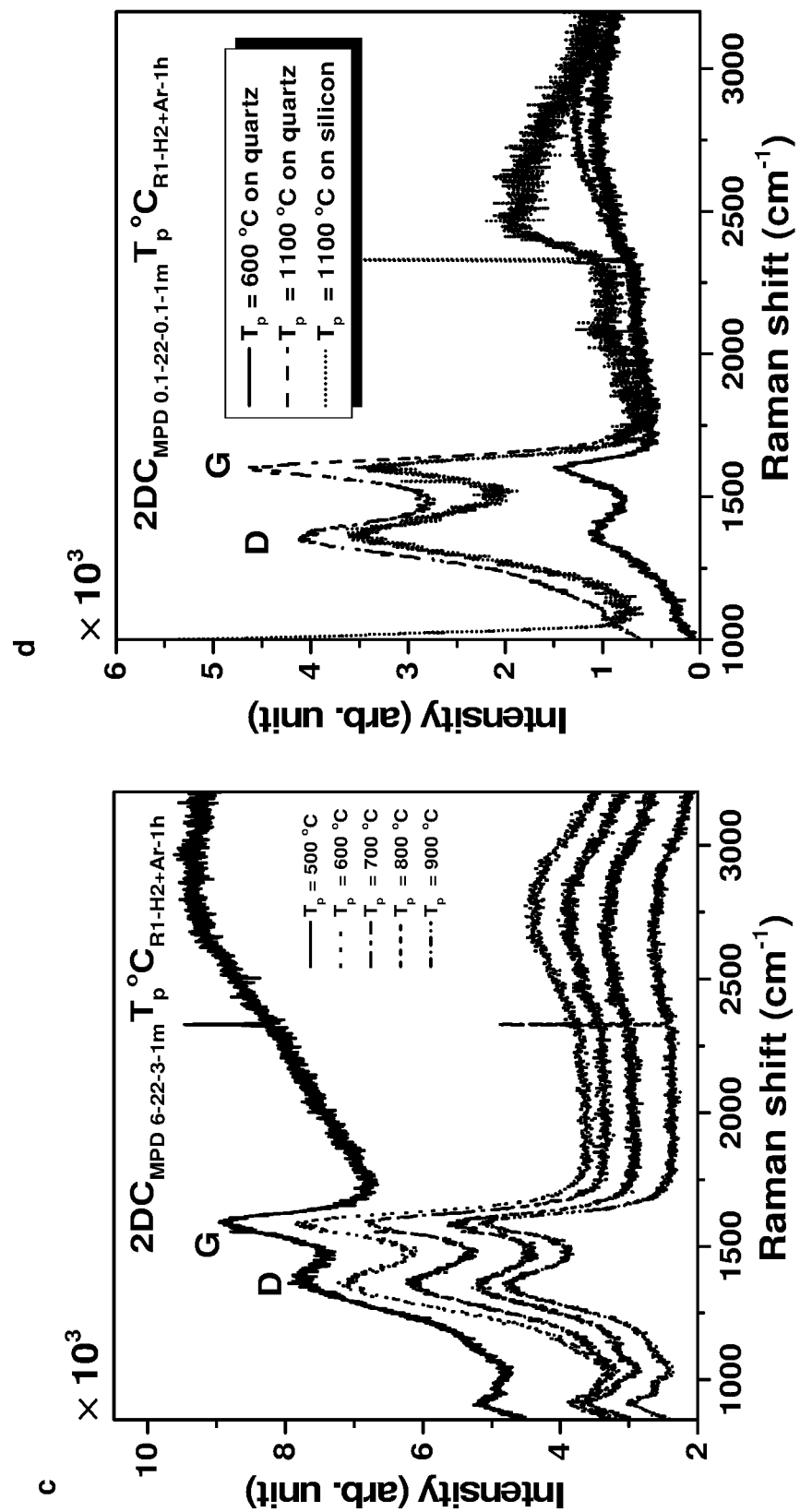
Figure 20:
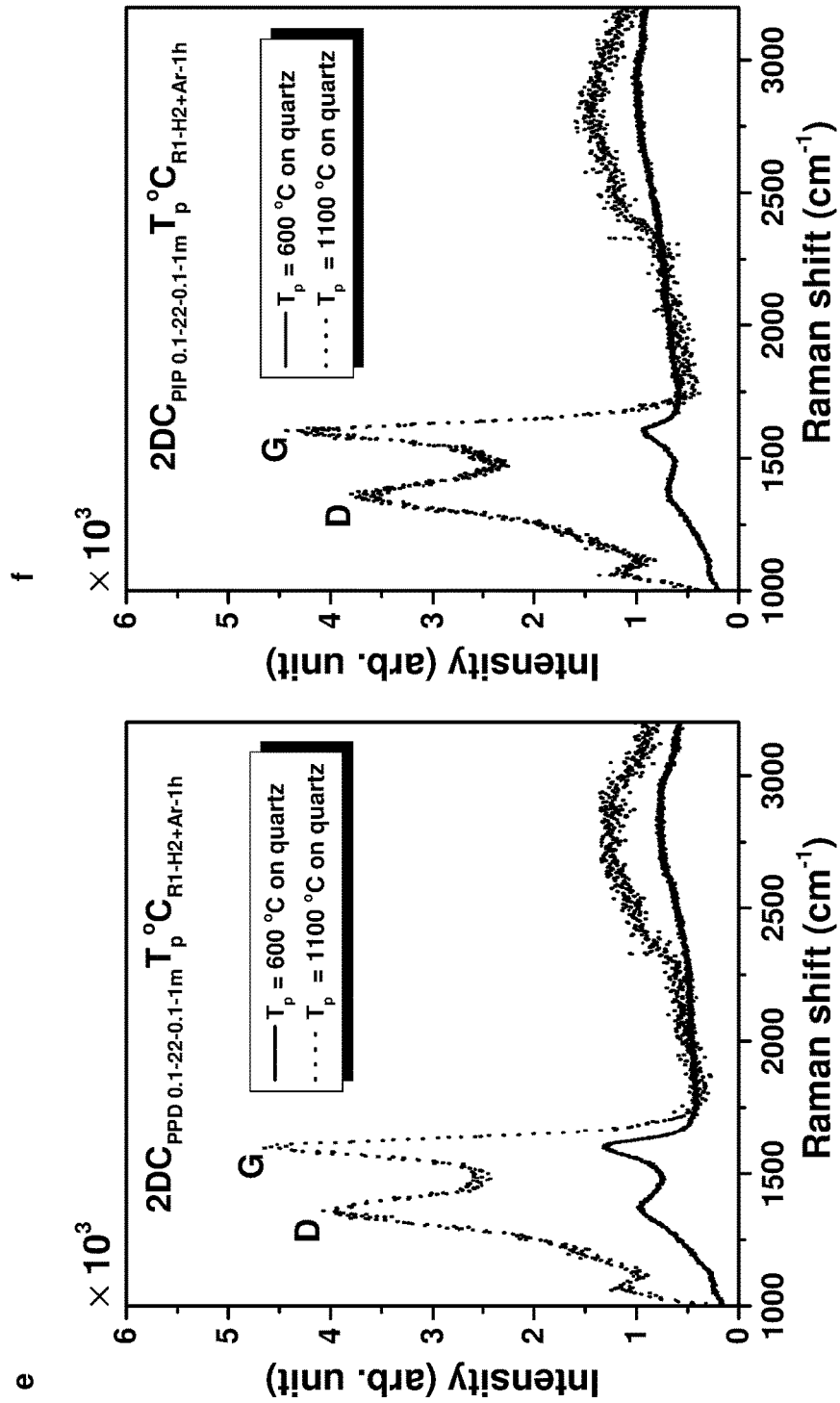

FIG. 20 shows Raman spectra of 2D carbon nanofilms on different support. (a and b) Nanofilms were prepared on cadmium hydroxide nanostrand surface and freestanding nanofilms were transferred on different substrates. (c) Nanofilms are in powder form. (d-f) Floating nanofilms were prepared at the bulk liquid-liquid interface.

Figure 21:
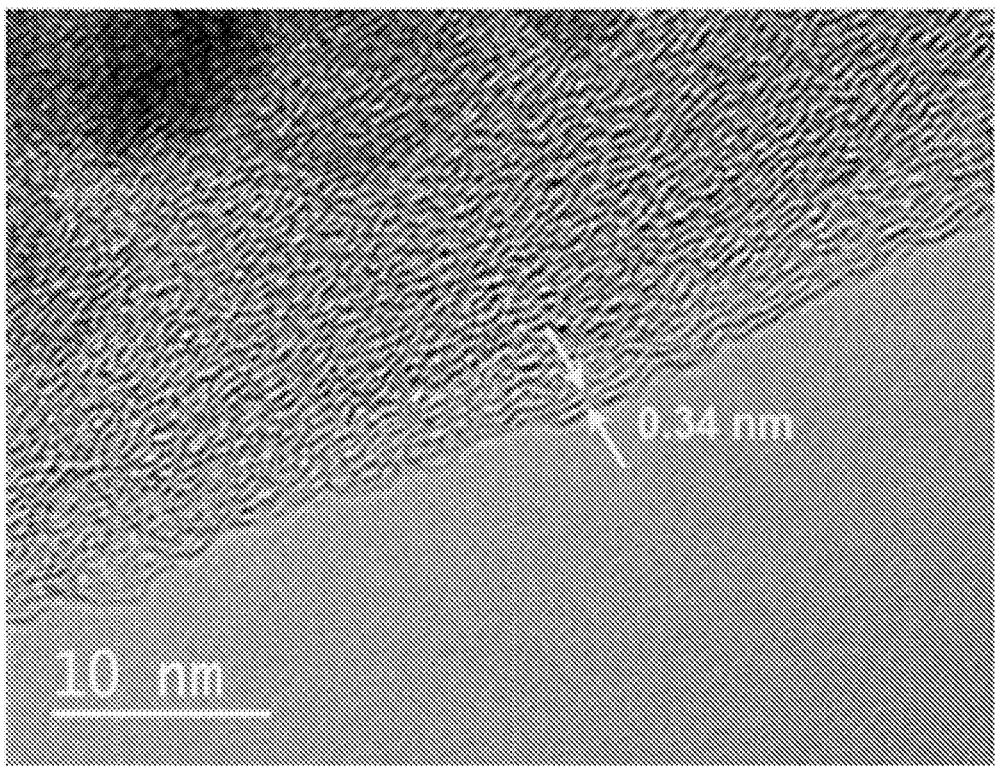

FIG. 21 shows HRTEM image of a free-standing carbon nanofilm fabricated at the bulk liquid interface and transferred on Ni grid ($2DC_{MPD\ 0.1\text{-}22\text{-}0.1\text{-}1\ m}1100°\ C_{\cdot R1\text{-}H2+Ar\text{-}1\ h}$). An inter-planer spacing of 0.34 nm for $sp^2$ carbons is marked on the image.

Figure 22:
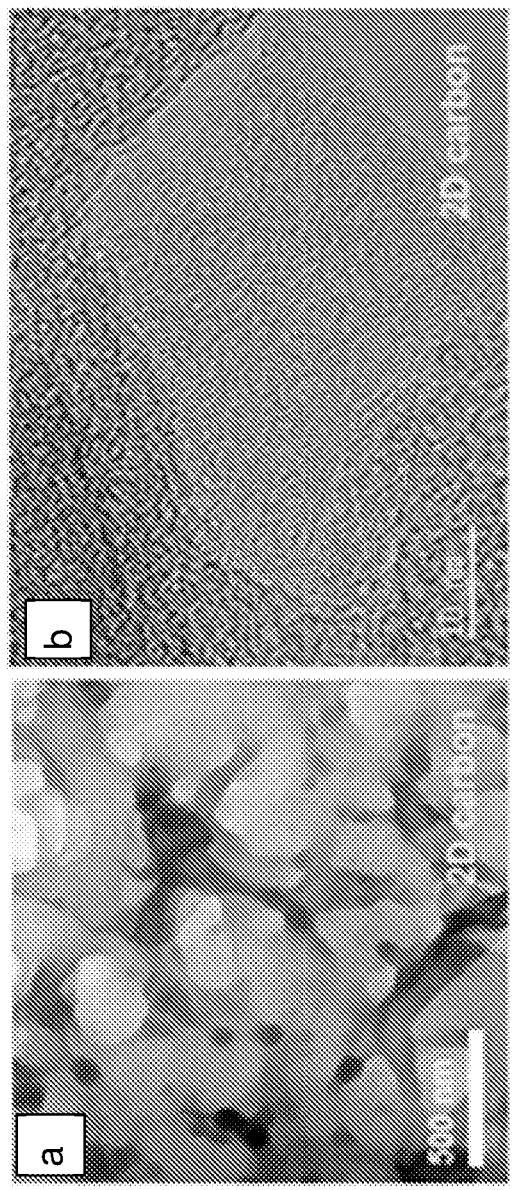

FIG. 22 (a), (b) TEM and HRTEM images of crumpled carbon nanofilm ($2DC_{MPD\ 6\text{-}22\text{-}3\text{-}1\ m}1100°\ C_{\cdot R1\text{-}H2+Ar\text{-}1\ h}$). Polymer nanofilm was fabricated at the bulk liquid interface and collected as powder.

Figure 23:
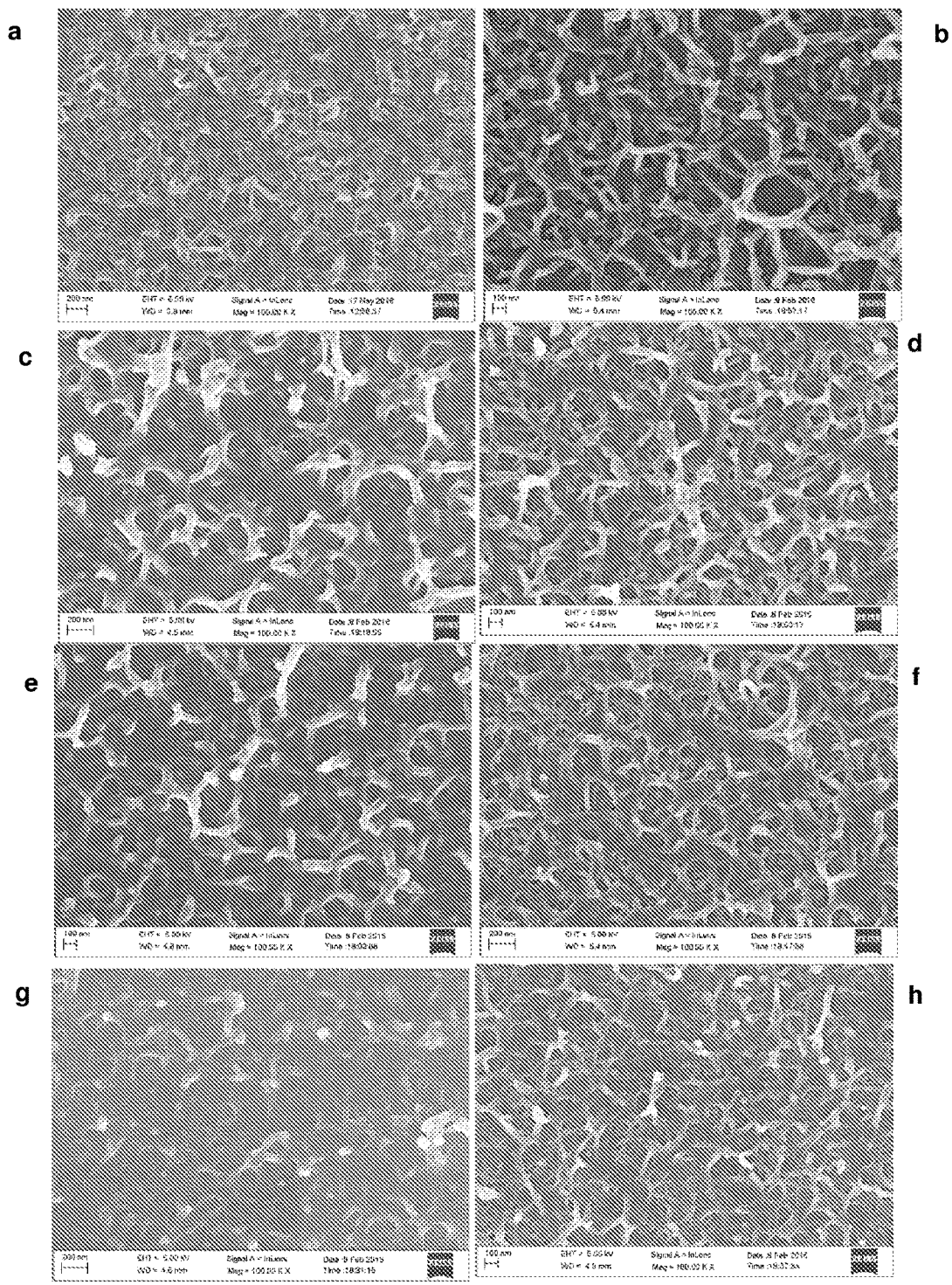

FIG. 23 shows SEM images of polymer nanofilm ($PNF_{MPD\ 6\text{-}22\text{-}3\text{-}1\ m}$) prepared from m-phenylenediamine and derived 2D carbon nanofilms carbonised at different temperatures. (a, c, e and g) Morphology of the nanofilms on silicon wafer, (b, d, f, h) Morphology of the nanofilms on porous alumina (smartPor; 20 nm top pore diameter).

Figure 24:
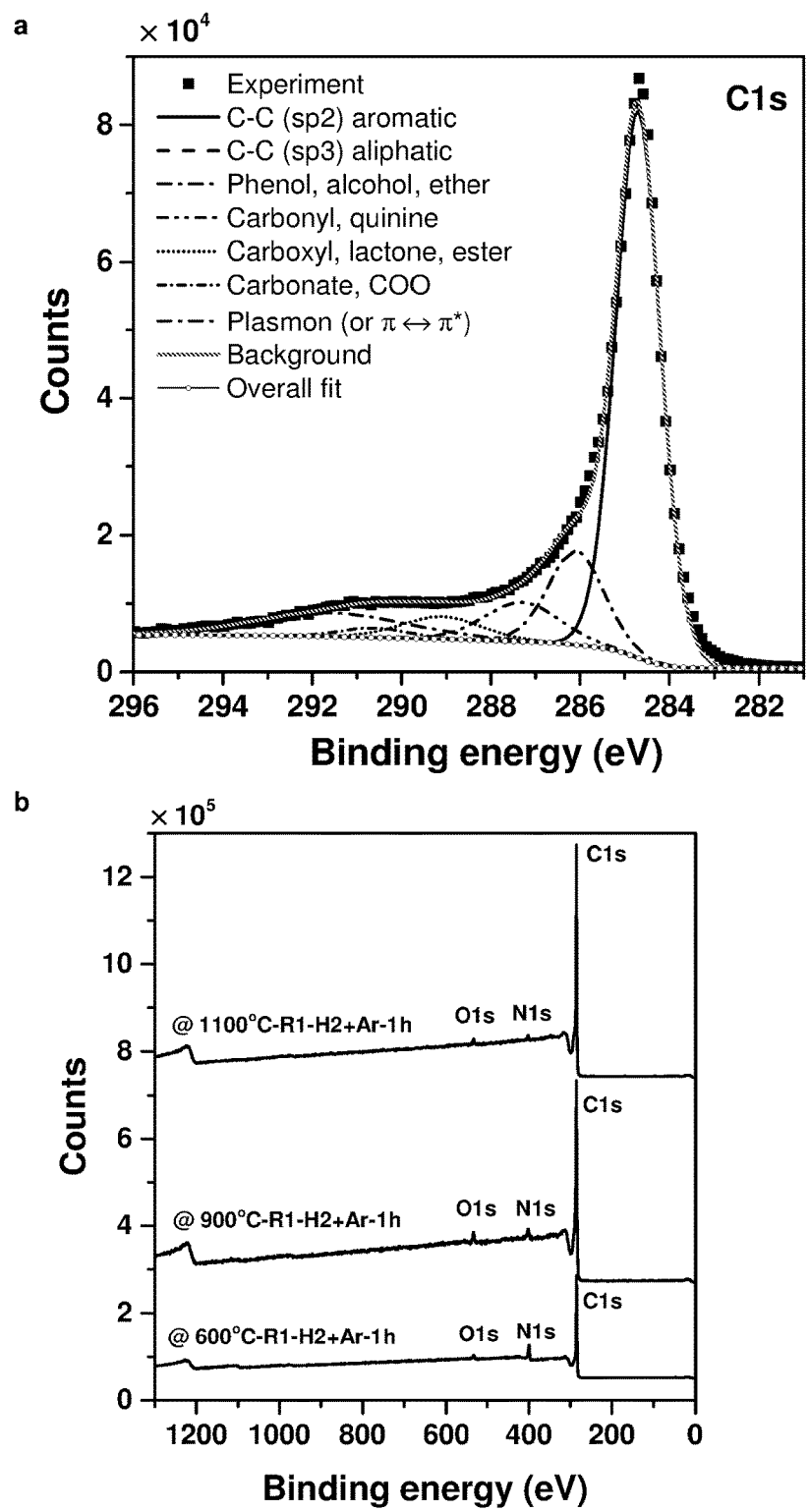

FIG. 24 (a) XPS survey spectra for the nanofilms made at different carbonisationcarbonisation temperature and (b) narrow scan spectra of carbon nanofilm powder prepared from the carbonisation of polymer nanofilm powder collected by shaking the interface ($2DC_{MPD\ 6\text{-}22\text{-}3\text{-}1\ m}1100°\ C_{\cdot R1\text{-}H2+Ar\text{-}1\ h}$) and collected as precipitates.

Figure 25:
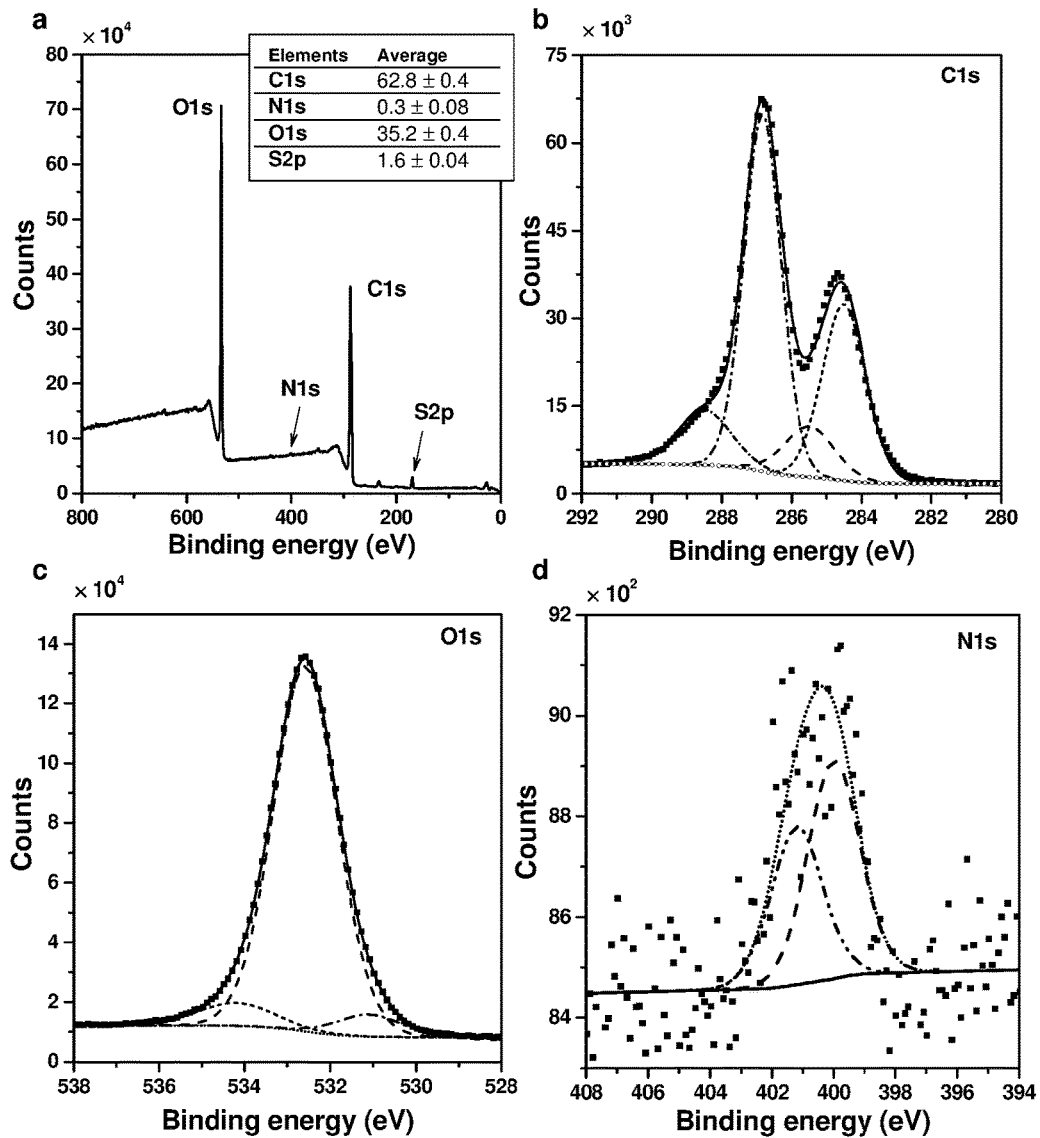

FIG. 25 shows X-ray photoelectron spectra of GO flakes for Sigma Aldrich-GO 763713. (a) Survey spectrum and narrow scan spectra for (b) C1s, (c) O1s and (d) N1s, respectively. Note that the N1s peak in the survey spectrum in (a) was barely detected, but a very small amount (0.3 at. wt %) was calculated from the narrow scan spectrum.

Figure 26:
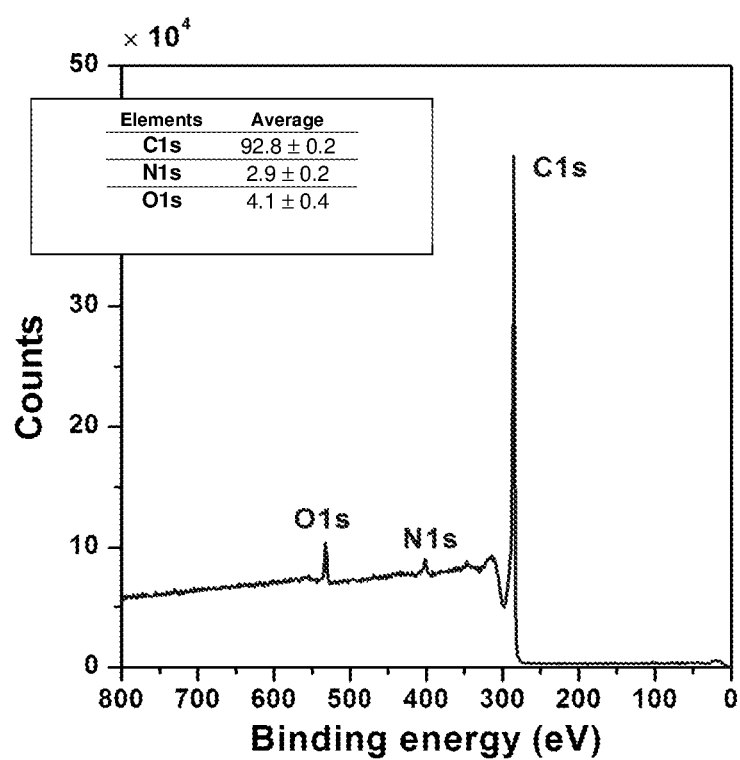

FIG. 26 shows X-ray photoelectron spectra of 2D carbon nanofilm powder. Carbon nanofilm powder was prepared from the carbonisation of polymer nanofilm powder collected by shaking the interface ($2DC_{PIP\ 6\text{-}22\text{-}3\text{-}1\ m}900°\ C_{\cdot R1\text{-}H2+Ar\text{-}1\ h}$) and collected as precipitates.

Figure 27:
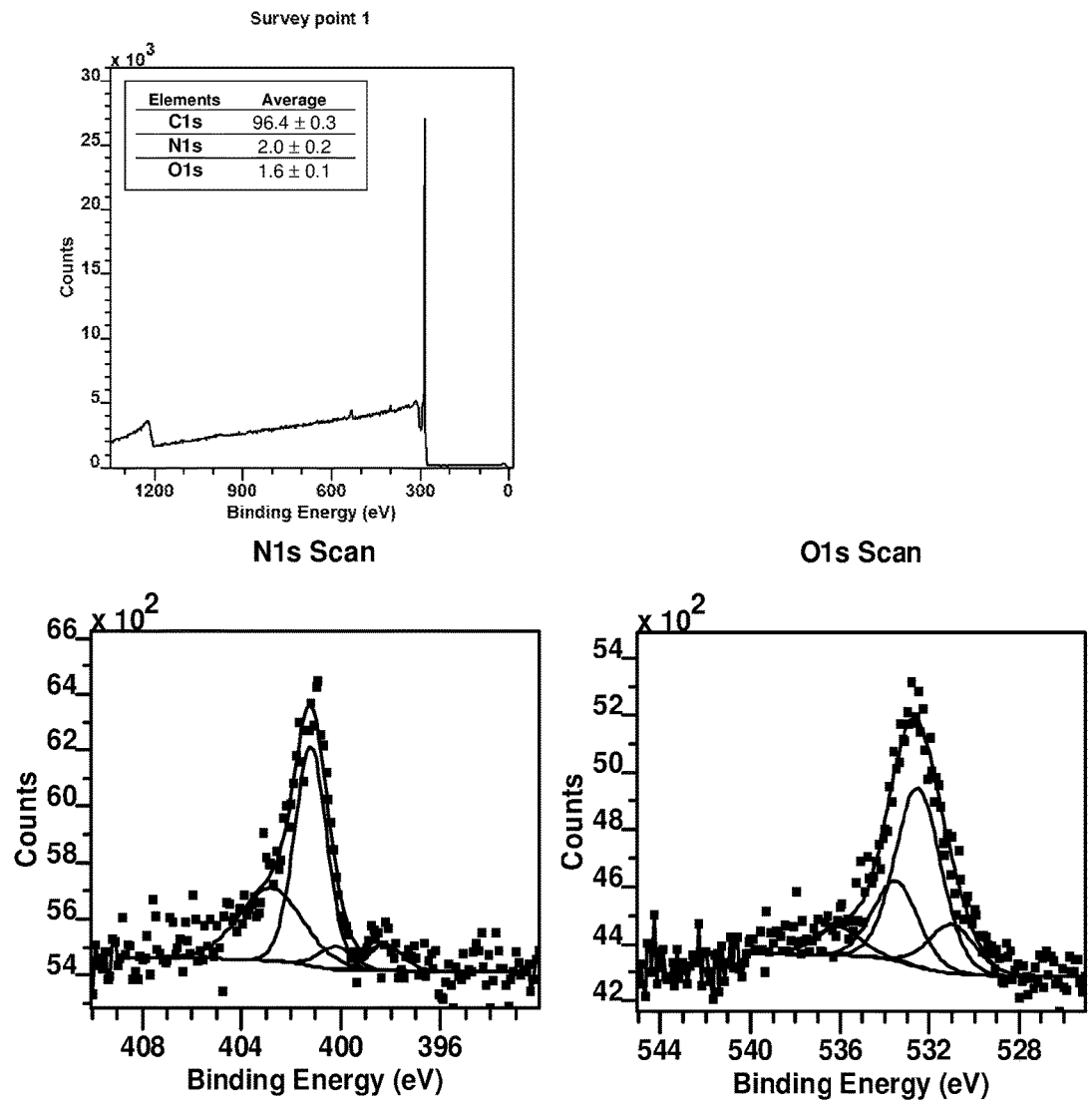

FIG. 27 shows X-ray photoelectron spectra of 2D carbon nanofilm powder. (a) Survey spectrum and narrow scan spectra for (b) O1s and (c) N1s, respectively. Carbon nanofilm powder was prepared from the carbonisation of polymer nanofilm powder collected by shaking the interface ($2DC_{MPD\ 6\text{-}22\text{-}3\text{-}1\ m}1100°\ C_{\cdot R1\text{-}H2+Ar\text{-}1\ h}$) and collected as precipitates.

Figure 28:
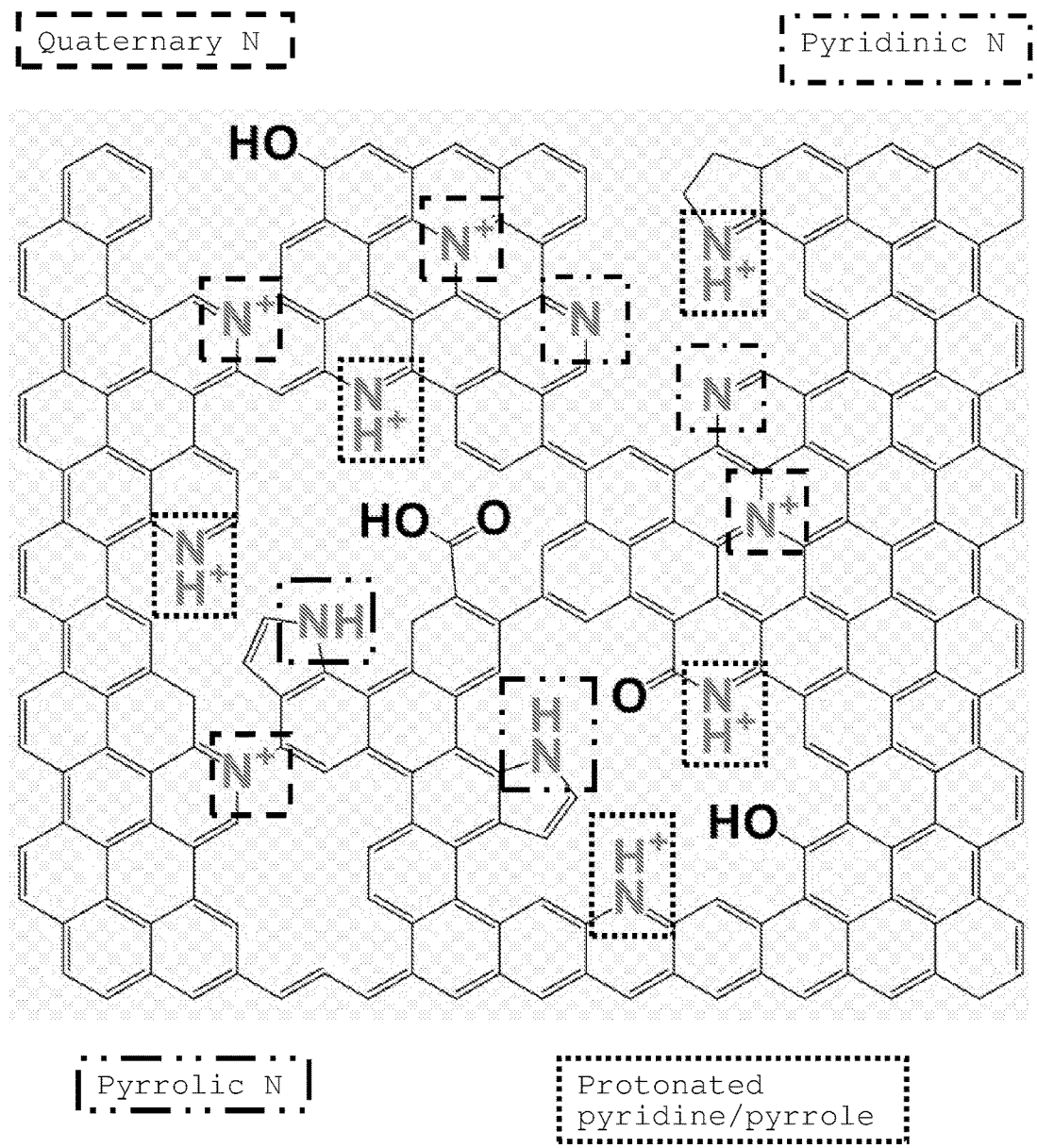

FIG. 28 shows the possible chemical structure of the membrane inferred from the XPS narrow scan analysis of C1s, O1s and N1s.

Figure 29:
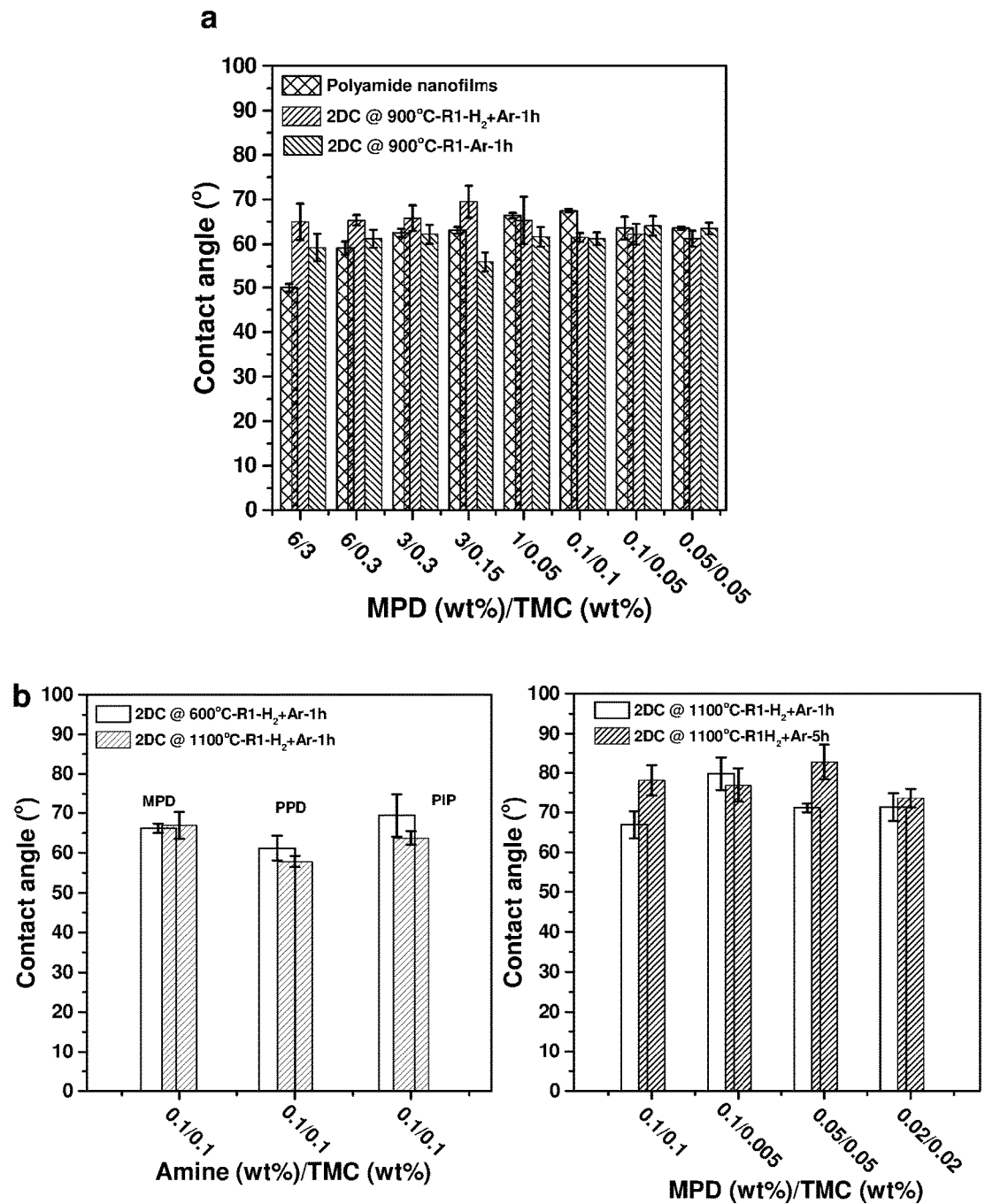

FIG. 29 shows contact angle measured for the polymer nanofilms and carbonised 2D carbon nanofilms fabricated on quartz substrate. Nanofilms were carbonised at different temperature (600-1100° C.) under diluted $H_2$ and/or pure Ar atmosphere.

Figure 30:
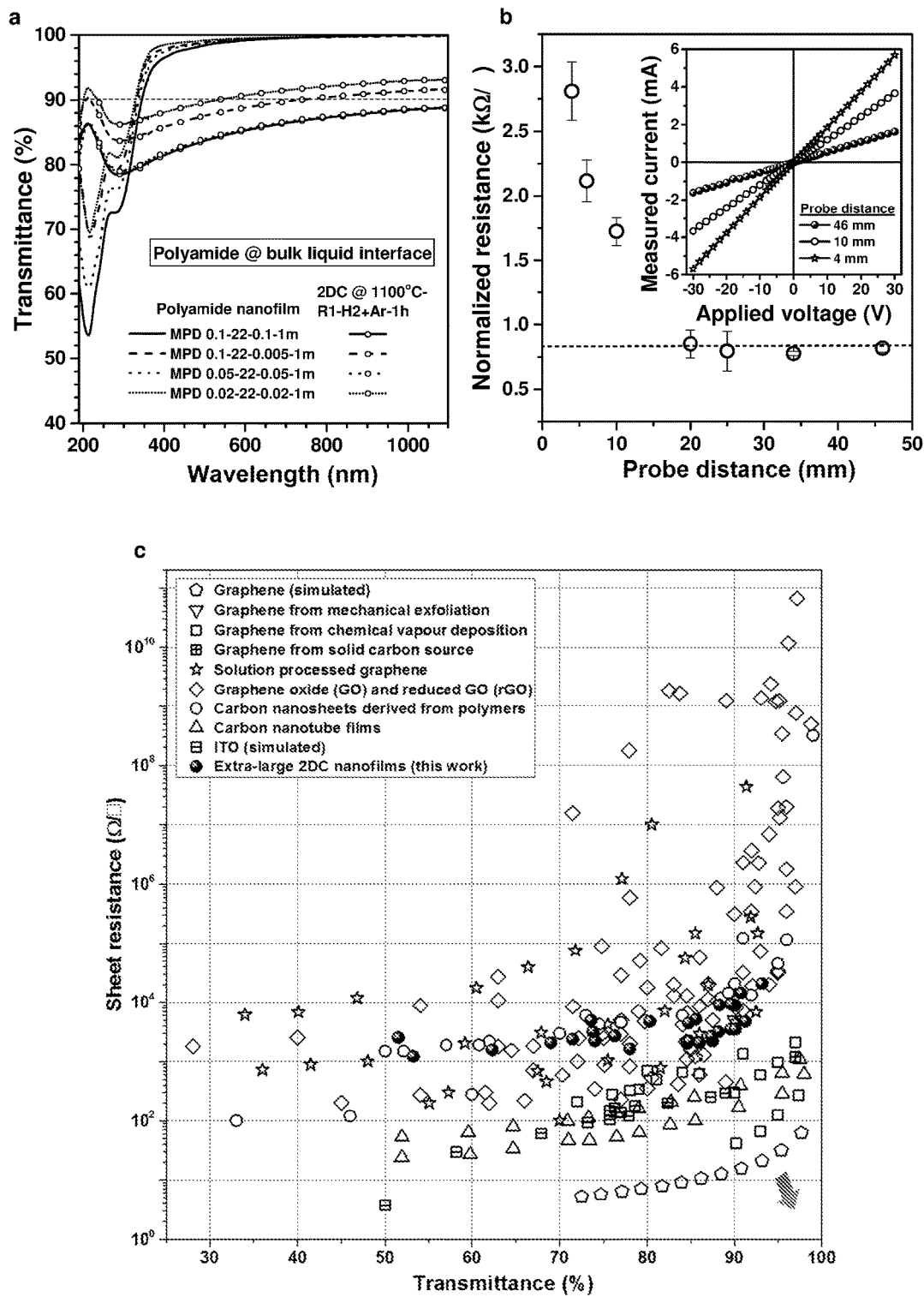

FIG. 30 shows optical and electrical properties of 2D carbon nanofilm as conducting electrode. (a) Optical transmittance spectra of polyamide nanofilms and 2D carbon nanofilms derived from the carbonisation of polyamide nanofilms. (b) Plot of normalized resistance measured with two-probe contact with probe distance. Square Au point contact of dimension 2 mm×2 mm were sputtered deposited on the 2D carbon nanofilm ($2DC_{MPD\ 0.05\text{-}22\text{-}0.05\text{-}1\ m}1100°\ C_{\cdot R1\text{-}H2+Ar\text{-}1\ h}$) fabricated on quartz substrate. I-V characteristics at the inset show the Ohmic contact between 2D carbon nanofilm and Au probe/electrode. (c) Trade-off curve of transmittance vs sheet resistance for 2D carbon nanofilms measured with four-probe technique [see Table 5].

Figure 31:
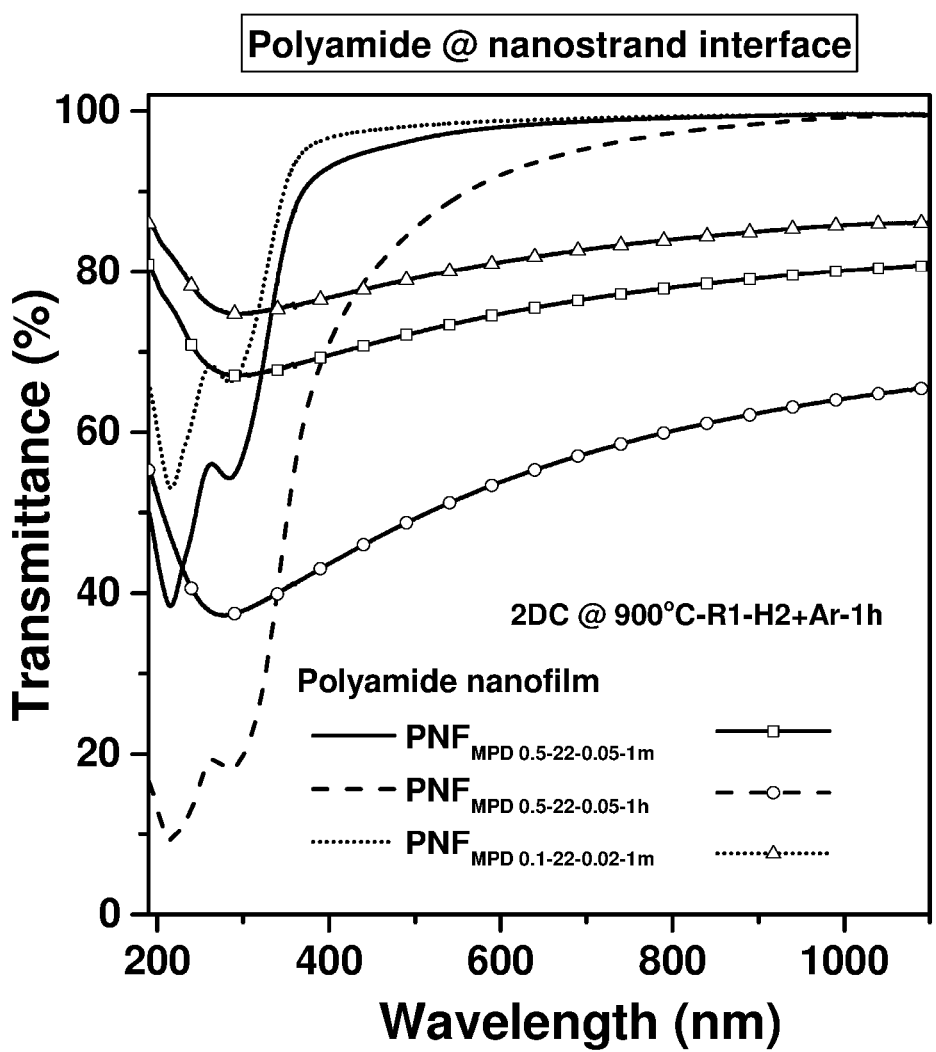
Figure 32:
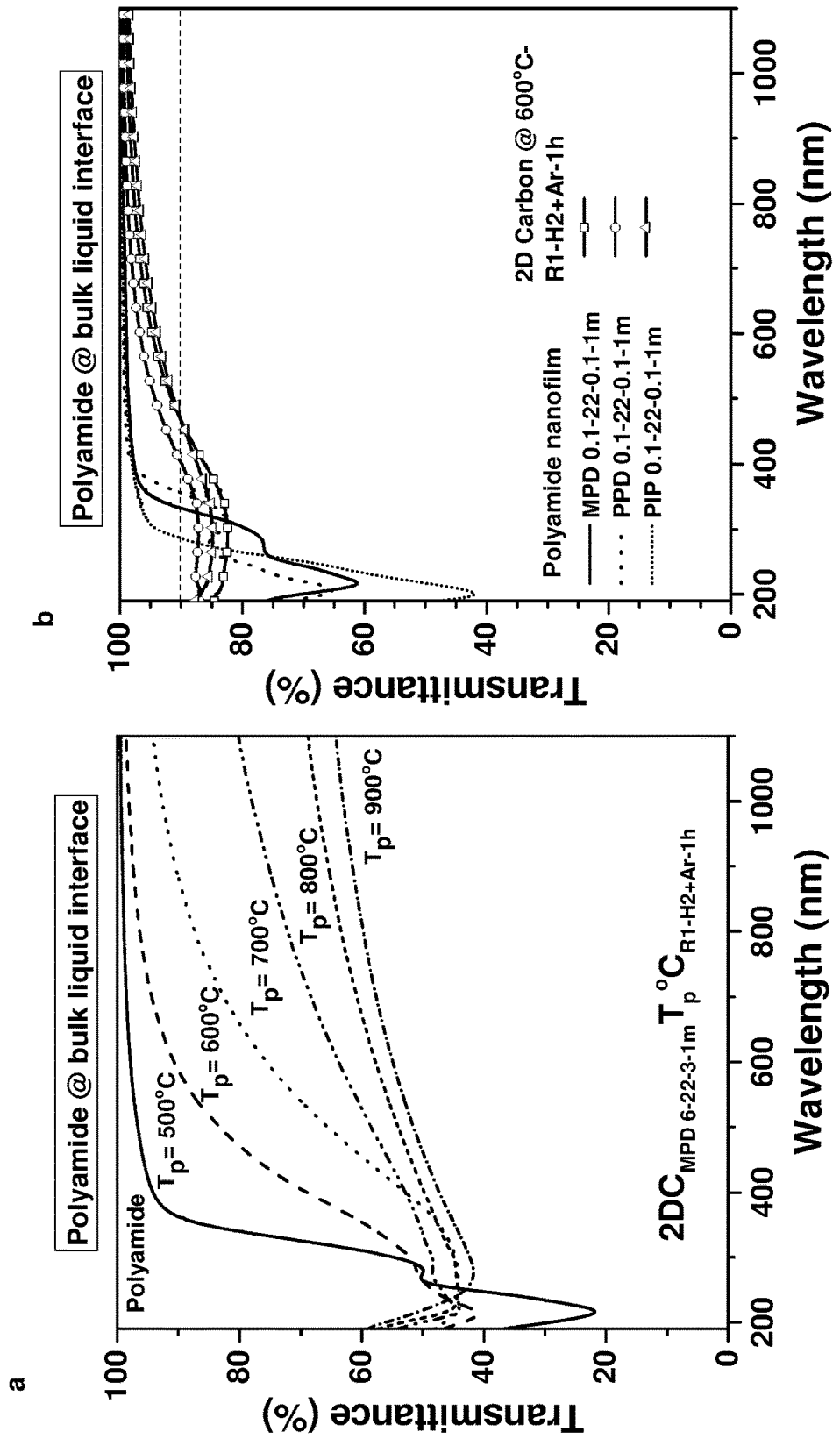
Figure 32:
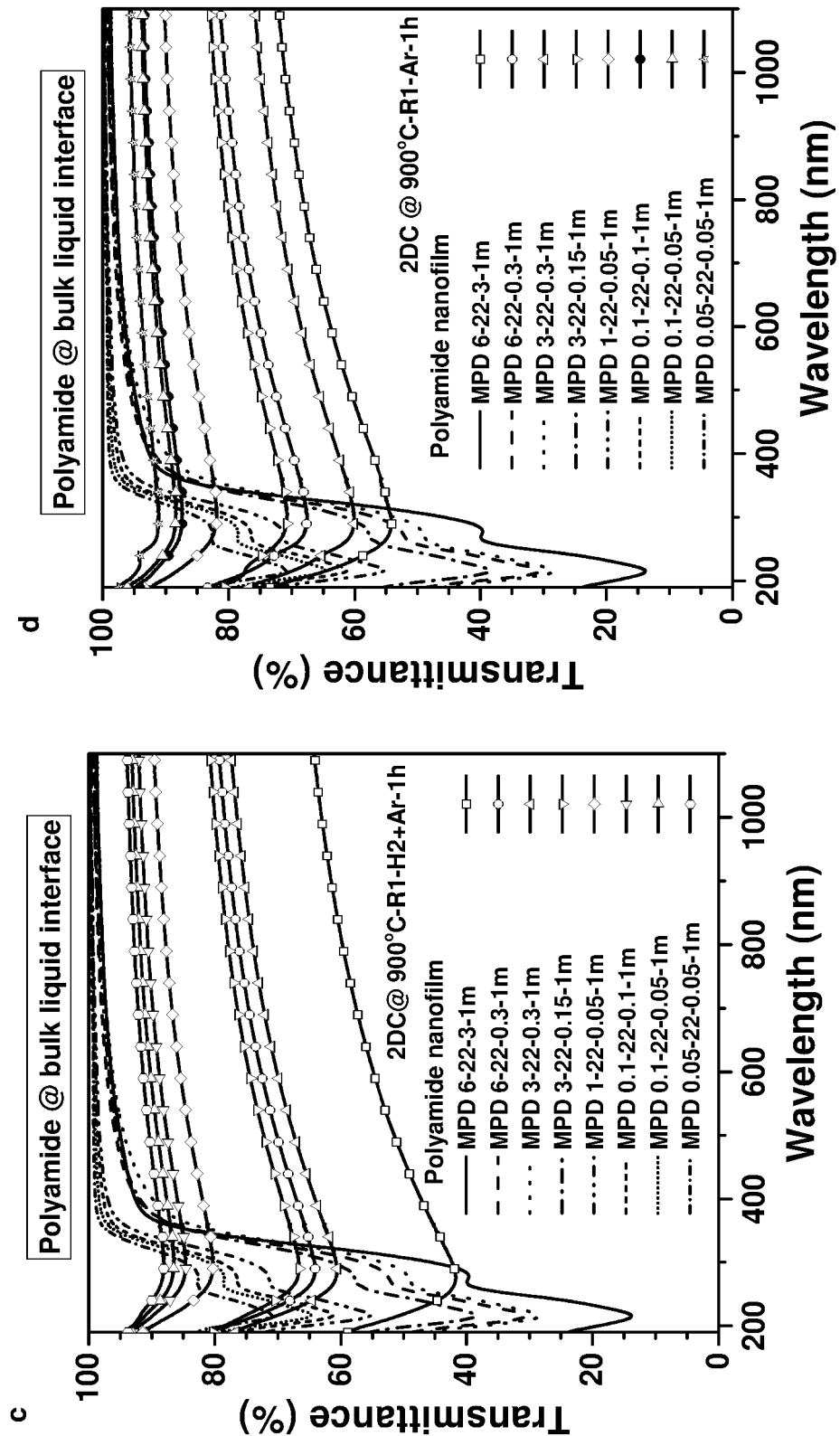
Figure 32:
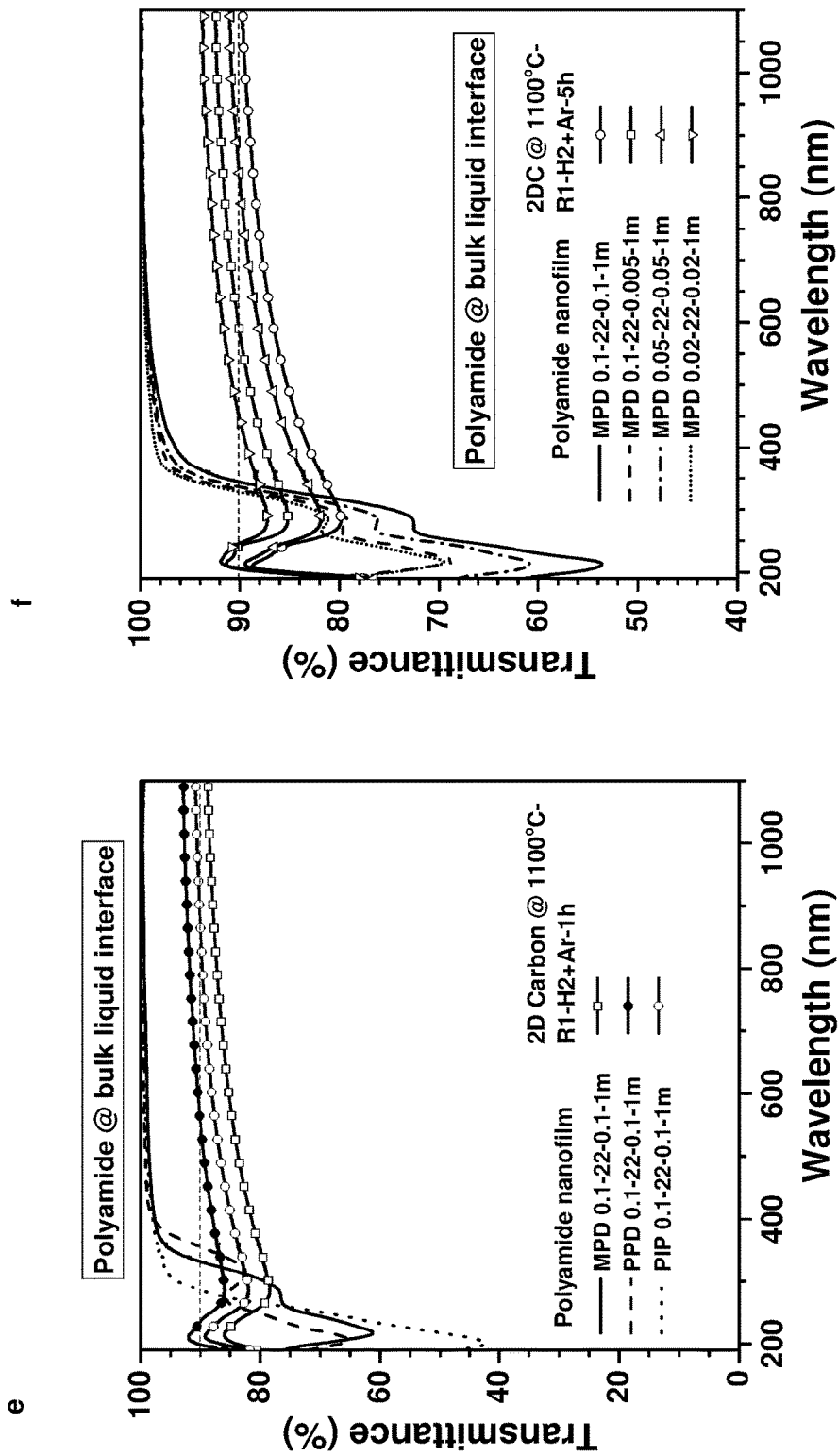

FIG. 31 shows UV-vis transmittance spectra of the polymer nanofilms and 2D carbon nanofilms. Free-standing polymer nanofilm was transferred onto a quartz substrate and carbonised at 900° C. under diluted $H_2$ and pure Ar atmosphere FIG. 32 shows UV-vis transmittance spectra of the polymer nanofilms and 2D carbon nanofilms. Free-standing polymer nanofilm was transferred onto a quartz substrate and carbonised under diluted hydrogen.

Figure 33:
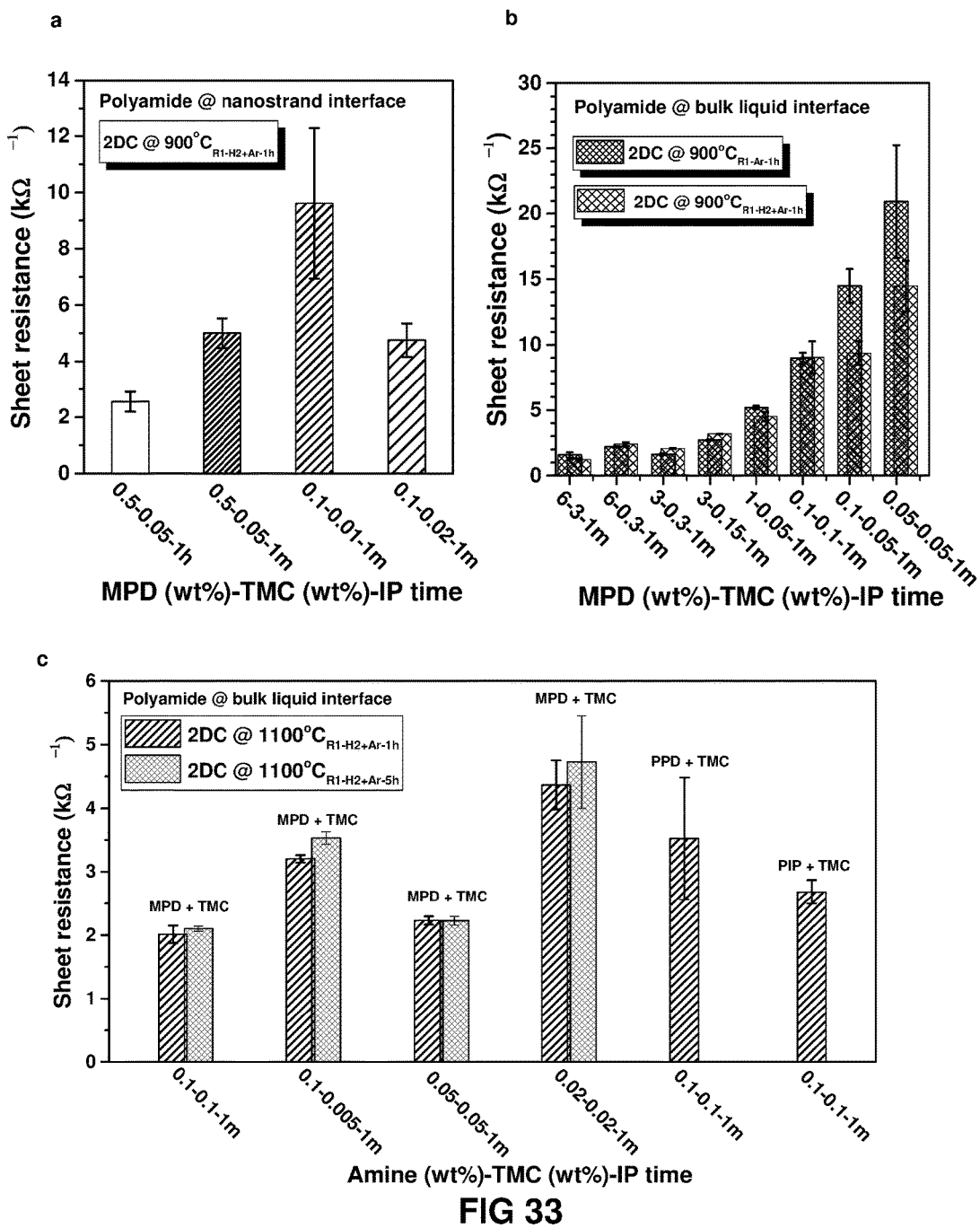

FIG. 33 shows sheet resistance of carbon nanofilms fabricated on quartz substrate.

Figure 34:
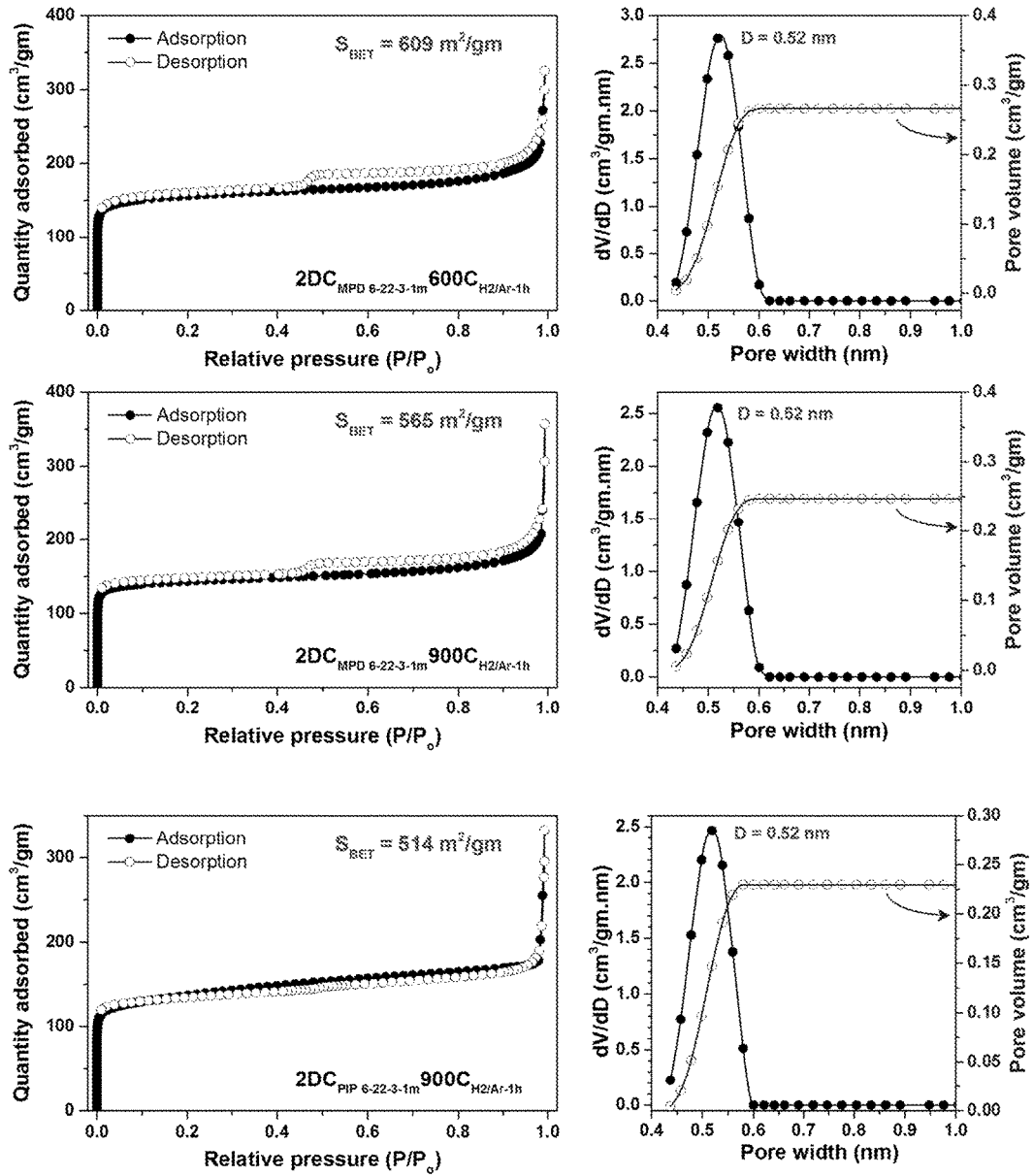

FIG. 34 shows nitrogen adsorption and desorption isotherm (left) and pore size distribution calculated using 2D-NLDFT method (right) for two types of carbon nanofilm powders prepared from MPD-TMC and PIP-TMC and carbonised under Ar+$H_2$ (9:1) flow at 900° C. for 1 h.

METHODS AND MATERIALS

Chemicals and Materials

Polyimide (PI) polymer (P84) was purchased from HP Polymer GmbH (Austria). All solvents used in this study were HPLC grade. Methanol, ethanol, 1-propanol, 1-butanol, acetonitrile, acetone, tetrahydrofuran (THF), ethyl methyl ketone (MEK), N,N-dimethylformamide (DMF), heptane, toluene and hexane were purchased from VWR International Ltd. Trimesoyl chloride (TMC) 98%, m-phenylenediamine (MPD) flakes≥99%, p-phenylenediamine (PPD)≥99%, piperazine (PIP) ReagentPlus® 99%, 4-(Aminomethyl) piperidine (AMP) 96% and 1,6-hexanediamine (HDA) 99.5% were purchased from Sigma Aldrich, UK. MPD was purified under vacuum sublimation (~1×$10^{-2}$ mbar) at 75° C. fitted with a cold water trap and used fresh each time. Cadmium chloride hydrate, Puratronic®, 99.998% (metals basis) was purchased from Alfa Aesar, UK. 2-aminoethanol (≥98%) was received from Sigma-Aldrich, UK. Asymmetric alumina support membranes of diameter 50 mm with pore size between 18-150 nm were supplied from Smart Membrane GmBH, Germany and Synkera Technologies, Inc. USA.

Characterisation Methods

Carbonisation Process to Form 2D Carbon Nanofilm

Pre-treatment: Purging alumina tube with Ar @ 2 L/min for 1 hr followed by the carrier gas @ 2 L/min for 1 hr (gas velocity in the sample zone is 45 cm·min$^{-1}$)

Ramp 1 (R1): Room temperature (RT) to $T_p°$ C. @ 5° C./min and soak at $T_p$ for 0.4-5 hr Ramp 2 (R2): 1) RT to 125° C. @ 5° C./min and soak for 15 min 2) 125° C. to 325° C. @ 5° C./min and soak for 5 min
3) 325° C. to 425° C. @ 2° C./min and soak for 5 min
4) 425° C. to 550° C. @ 1° C./min and soak for 5 min
5) 550° C. to 600° C. @ 0.5° C./min and soak for 2 h Ramp 3 (R3): 1) RT to 125° C. @ 5° C./min and soak for 15 min 2) 125° C. to 375° C. @ 5° C./min and soak for 5 min
3) 375° C. to 525° C. @ 1° C./min and soak for 5 min
4) 525° C. to 600° C. @ 0.5° C./min and soak for 2 h Cooling: 1) $T_p°$ C. to 700° C. @ 5° C./min (when $T_p$>700° C.)

2) 700° C. to 300° C. @ natural cooling
3) 300° C. to RT @ natural cooling (swap carrier gas with Ar).

Scanning Electron Microscopy (SEM)

Thin films were analyzed by high resolution scanning electron microscope (SEM), LEO 1525, Karl Zeiss with an accelerating voltage of 5 kV. A 5 nm thick (measured with attached QCM thickness monitor) coating of chromium was sputtered (Q150T turbo-pumped sputter coater, Quorum Technologies Ltd.) under an Ar atmosphere (2×10−2 mbar) to achieve a minimum conductivity for reliable SEM information.

Atomic Force Microscopy (AFM) Study

Multimode 4 and 8 (Bruker, Calif., USA) atomic force microscope (AFM) equipped with E-type or J-type pizzo scanner was used to measure the thickness and surface roughness of the thin films. Samples were attached onto a magnetic sample disk using double sided adhesive tape. The images were captured under tapping mode or peak tapping mode using PointProbe® Plus silicon-SPM probes (PPP-NCH, Nanosensors™, Switzerland) with typical tip radius of less than 7 nm. Cantilever resonance frequency was in the range of 204-497 kHz with a nominal spring constant of 42 N m-1. A sampling resolution of at least 512 points per line and a speed of 0.2-1 Hz were used. Bruker 'NanoScope Analysis beta' or 'Gwyddion 2.38 SPM data visualization and analysis software' was used to process the AFM images. Surface roughness is presented as average roughness (Ra), root-mean-square roughness (Rrms), and peak-to-valley height (Rh), respectively. Surface morphology, roughness parameters and the thickness was estimated from the AFM scans of thin films on different substrates. To measure the thickness from AFM, free-standing thin films were transferred to silicon wafers and dried at room temperature. A scratch was made to expose the wafer surface and allow measurement of the height from the silicon wafer surface to the upper thin film surface. The thickness of the thin film was estimated from the height difference between the silicon and the thin film using a one dimensional statistical function.

Polymer thin film material fabricated on silicon wafers was studied using atomic force microscopy (AFM).

2-dimensional carbon thin film material fabricated on silicon wafers was studied using atomic force microscopy (AFM).

Raman Spectroscopy Study

Figure 6:
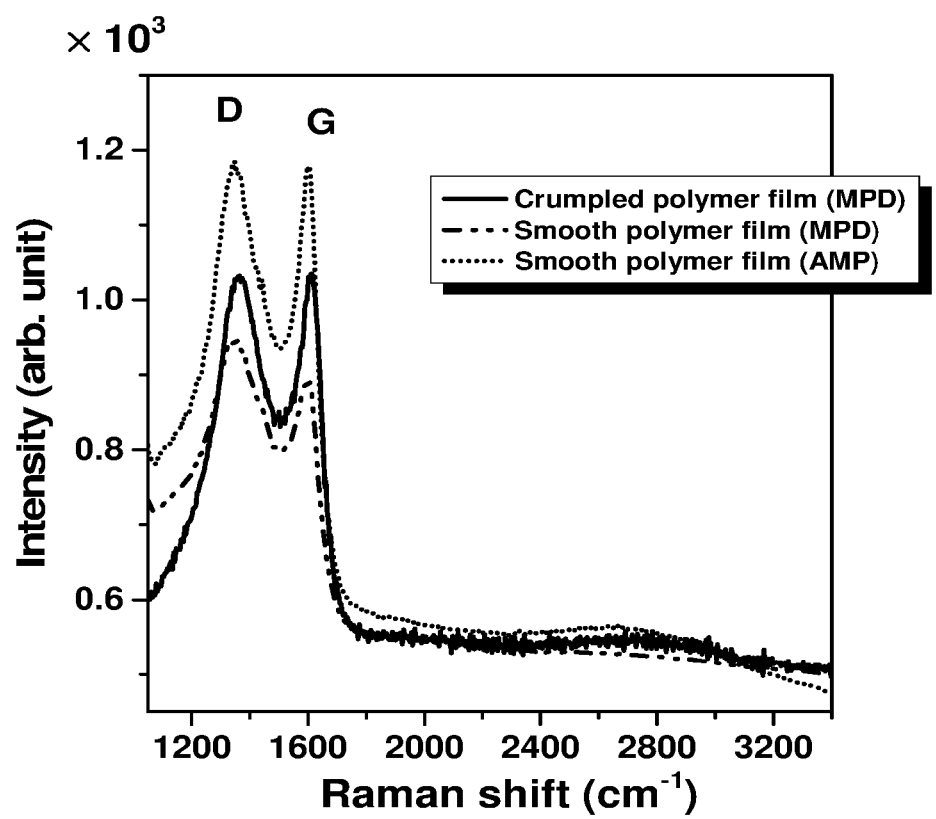

Raman measurements were carried out with a spectrometer (Renishaw RM2000 CCD) using a 514 nm laser excitation, laser power of 0.5 mW and 10 s integration time. The laser was focused onto the sample using a 50 times short working distance objective. Chemical structures of 2-dimensional carbon thin film material prepared from different monomers and with different surface morphologies on silicon wafer were studied using Raman spectra. The letters 'D' and 'G', as presented in the graph of FIG. 6, stand for two characteristic Raman active modes for many carbon allotropes and the ratio D/G is a measure of the density of defects present in the 2-dimensional carbon thin films.

X-Ray Photoelectron Spectroscopy (XPS)

Polymer thin films were floated on an acidic water surface to render them free-standing and transferred onto a PLATYPUS™ gold coated silicon wafer, washed in water and dried. The survey spectra and core level XPS spectra were recorded from at least two different spots of size 400 µm. Samples supported on carbon pads on stubs were introduced into the instrument via a turbo molecular pumped entry lock. The entry lock was pumped for about 15 minutes before the sample was introduced into the analysis chamber. XPS was performed in an ion pumped VG Microtech CLAM 4 MCD analyzer system. 200 Watt unmonochromated Mg X-ray excitation was used. The analyzer was operated at constant pass energy of 200 eV for wide scans and 20 eV for narrow scans setting the C1s peak at BE 285 eV to overcome any sample charging. Data was obtained using the SPECTRA version 8 operating system. Data processing was performed using CasaXps. Peak areas were measured after satellite subtraction and background subtraction either with a linear background or following the methods of Shirley. (D. A. Shirley, High-resolution X-ray photoemission spectrum of the valence bands of gold. *Phys. Rev. B* 5, 4709, 1972).

Polymer thin film material fabricated on gold coated silicon wafers was studied using XPS.

2-dimensional carbon thin film material fabricated on silicon wafers was studied using XPS.

Contact Angle Measurement

Contact angle with water was measured with a standard ramé-hart contact angle measurement system with "DROPimage Advanced" analysis software. At least three separate drops on each sample were analyzed and the average values are presented with standard deviation.

UV-Vis Transmission Measurement

The UV-vis transmittance of the polyamide nanofilms and the derived carbon nanofilms was measured through transmission mode with quartz as substrate. Polymer nanofilm was made either at the nanostrand interface or at the bulk liquid interface and was transferred on to a quartz substrate. Polymer nanofilm was carbonised under diluted gas environment and at different temperature conditions to form 2D carbon with different chemical composition. A high transmittance of more than 90% at 515 nm wavelength was obtained for the carbon nanofilm made from a very low concentration (0.05 wt %) MPD and TMC reacted at the bulk interface and carbonised under $Ar/H_2$ at 900° C. for 1 h. The transmittance spectra for different polyamide nanofilms and 2D carbon nanofilms are shown in FIGS. 30-32.

Sheet Resistance Measurement

The sheet resistance is a measure of the resistivity per unit thickness of 2D thin film materials and is a special case of resistivity for a uniform sheet thickness. The 2D carbon nanofilm was fabricated on quartz substrate and the sheet resistance was measured with four-point-probe method. The measured sheet resistance was within few tens of KΩ/. The best combination of transmittance and sheet resistance was ~90% transmittance at 550 nm wavelength and less than 2 KΩ/ of sheet resistance. The values of sheet resistance for different carbon nanofilms are presented in FIG. 30.

Spectroscopic Ellipsometry

Spectroscopic ellipsometry was carried out on a Woollam M-2000 DI (J. A. Woollam Co. Inc., NE, USA) with three incidence angles of 65°, 70° and 75° to the surface normal in order to measure thickness of the thin films. Free-standing thin films were transferred to UV/ozone cleaned silicon wafers and dried under room temperature. Measurements were taken at multiple points to confirm the uniformity of the thickness of the thin films and the average values are presented. Ellipsometric data were fitted to a three-layer model using CompleteEASE™ data analysis software (J. A. Woollam Co. Inc., NE, USA).

Polymer thin film material fabricated on silicon wafers was studied using ellipsometry.

2-dimensional carbon thin film material fabricated on silicon wafers was studied using ellipsometry.

Example 1

Preparation of Polymer Thin Film on Nanostrand Layer
Preparation of Free-Standing Polymer Thin Film on Silicon Wafer, Porous Support or Copper Foil A variety of sub-10 nm polyamide thin films were fabricated from differing concentrations of amine and acyl chloride on nanostrand layers formed on an ultrafiltration support membranes through controlled interfacial polymerization. A standard procedure for the polyamide thin film fabrication is detailed below.

Aqueous amine solution was passed through the nanostrand layer under suction to impregnate the amine within the porous channel of the nanostrand layer. Immediately, the hexane solution of trimesoyl chloride was added on the top of the nanostrand layer to create the interface and the polymerization was allowed to continue for 1-10 min. Polyamide thin film was transferred onto a silicon wafer or copper foil by dissolving the nanostrand layer and floating the polymer thin film on a water surface.

Figure 1:
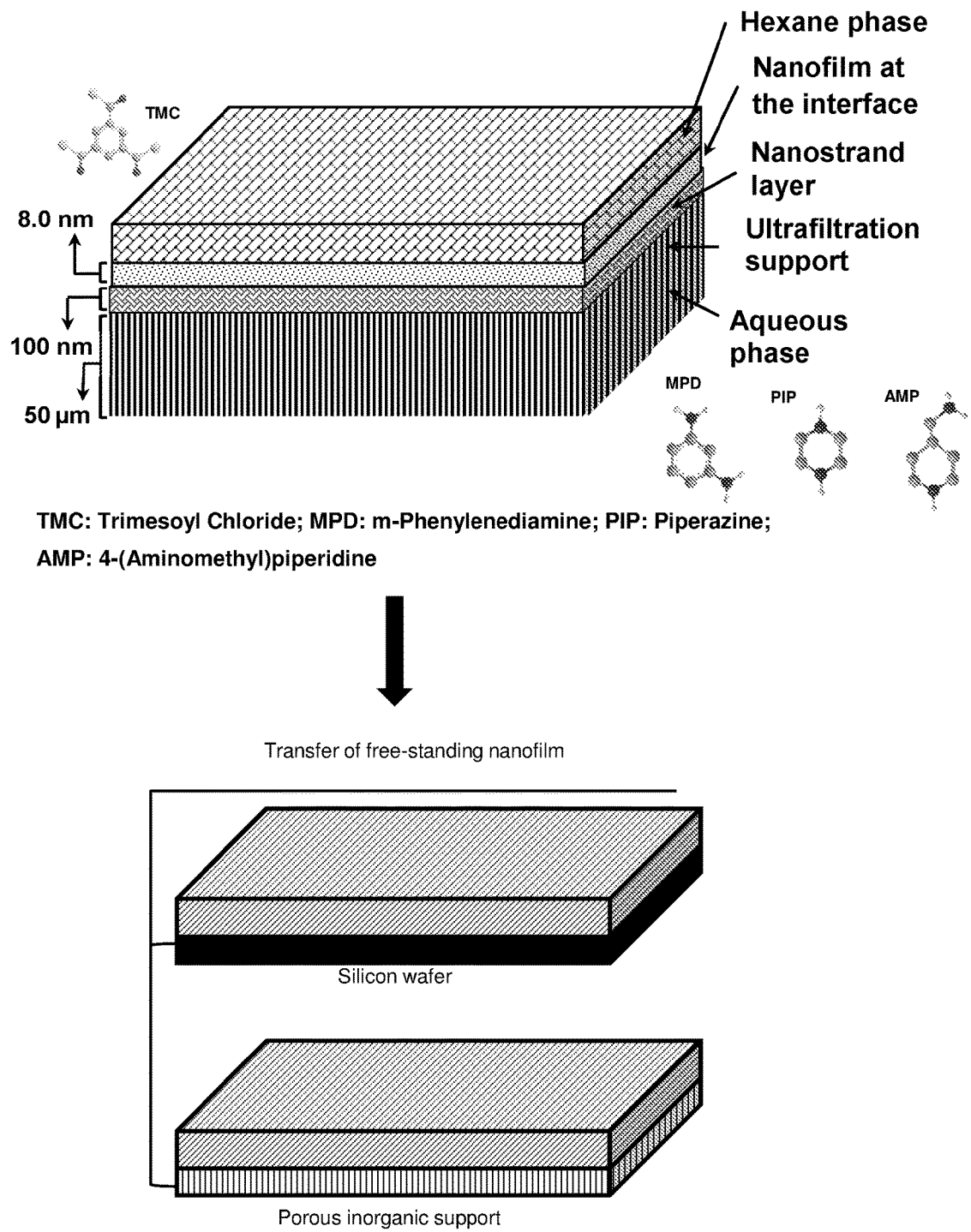

FIG. 1 depicts the schematic of the formation of polyamide thin films from different amine monomers, e.g. MPD, AMP and PIP and the transfer of the resulting polyamide thin film onto different supports.

The morphology of the polyamide was controlled by varying the concentration of amine-TMC concentration. Crumpled polyamide was formed using 3 wt % MPD and 0.15 wt % TMC and the free-standing thin film was transferred onto a different substrate.

Properties of polymer thin films fabricated under different interfacial reaction conditions and with both aromatic and semi-aromatic diamines are listed in Table 1.

Figure 4:
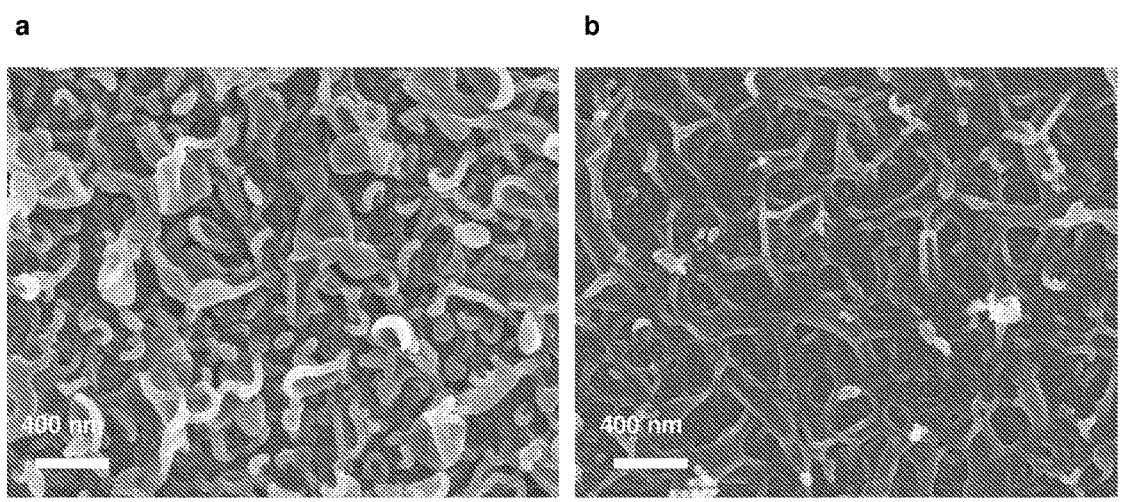

Amine concentration was found to be key in controlling surface morphology, with increasing amine concentration the thin film appears crumpled (FIG. 4a).

TABLE 1

Composition and surface properties of free-standing polymer thin films fabricated by interfacial polymerization (IP). ND refers to data not determined. ACT refers to "activated" thin films, wherein the polymeric thin films were dipped in dimethylformamide for 4 h before being dipped in methanol for 15 min to wash them. Flip refers to the reverse side of the thin film.

| Free-standing polymer thin films (amine-wt %-IP time) | IP reaction conditions | | | Overall | |
|---|---|---|---|---|---|
| | Aqueous amine phase [wt. %] | TMC in hexane phase [wt. %] | IP time (min) | thickness from SEM/AFM (nm) | RMS roughness $R_{rms}$ (nm) |
| MPD-0.05%-10 min | MPD [0.05] | 0.0025 | 10 | 8.4 ± 0.4 | 0.63 ± 0.03 |
| MPD-0.1%-1 min | MPD [0.1] | 0.005 | 1 | 7.5 ± 0.4 | 0.52 ± 0.04 |
| MPD-0.1%-1 min-ACT | MPD [0.1] | 0.005 | 1 | 7.8 ± 0.2 | 0.69 ± 0.05 |
| MPD-0.1%-10 min | MPD [0.1] | 0.005 | 10 | 8.4 ± 0.5 | 0.60 ± 0.05 |
| MPD-0.1%-10 min-ACT | MPD [0.1] | 0.005 | 10 | 8.0 ± 0.3 | 0.51 ± 0.05 |
| MPD-3%-1 min | MPD [3.0] | 0.15 | 1 | 94 ± 7 | 78.0 ± 1.9 |
| MPD-3%-1 min-ACT | MPD [3.0] | 0.15 | 1 | 95 ± 10 | 64.8 ± 1.7 |
| MPD-3%-1 min-Flip | MPD [3.0] | 0.15 | 1 | ND | 11.2 ± 0.7 |
| MPD-4%-1 min | MPD [4.0] | 0.2 | 1 | 63 ± 5 | 56.2 ± 2.8 |
| MPD-4%-1 min-ACT | MPD [4.0] | 0.2 | 1 | 52 ± 8 | 42.6 ± 3.7 |
| MPD-10%-1 min | MPD [10.0] | 0.5 | 1 | 64 ± 3 | 23.9 ± 3.0 |
| MPD-10%-1 min-ACT | MPD [10.0] | 0.5 | 1 | 47 ± 6 | 24.5 ± 2.7 |
| PIP-0.1%-10 min | PIP [0.1] | 0.02 | 10 | 33.2 ± 1.1 | 4.66 ± 0.25 |
| PIP-0.1%-10 min-ACT | PIP [0.1] | 0.02 | 10 | ND | ND |
| AMP-0.1%-10 min | AMP [0.1] | 0.02 | 10 | 14.5 ± 0.5 | 2.31 ± 0.88 |
| AMP-0.1%-10 min-ACT | AMP [0.1] | 0.02 | 10 | ND | ND |

Table 1 shows that the thickness of the smooth polymer thin films fabricated from MPD was approximately constant after 1 min, whereas their mass measured with a quartz crystal microbalance (QCM) increased three-fold with prolonged reaction time (1-10 min).

TABLE 2

Further composition and surface properties of free-standing polymer thin films fabricated by interfacial polymerization (IP). ND refers to data not determined. ACT refers to "activated" thin films, wherein the polymeric thin films were dipped in dimethylformamide for 4 h before being dipped in methanol for 15 min to wash them. Flip refers to the reverse side of the thin film. Degree of network cross-linking is calculated as, $$\left[DNC = \frac{X}{X+Y} \times 100\%\right]$$

where $\left[\frac{O}{N} = \frac{3X+4Y}{3X+2Y}\right]$.

| Free-standing polymer thin films (amine-wt %-IP time) | Atomic composition from XPS (%) | | | | Degree of network crosslinking (DNC) (%) | Contact angle (°) |
|---|---|---|---|---|---|---|
| | C | O | N | COOH | | |
| MPD-0.05%-10 min | ND | ND | ND | ND | ND | 58.2 ± 1.6 |
| MPD-0.1%-1 min | 73.3 | 14.3 | 12.4 | 3.0 | 78.6 | 56.8 ± 3.2 |
| MPD-0.1%-1 min-ACT | 73.5 | 14.5 | 12.0 | 2.9 | 71.7 | 56.6 ± 2.4 |
| MPD-0.1%-10 min | 73.7 | 14.3 | 12.0 | 3.7 | 73.8 | 58.7 ± 1.5 |
| MPD-0.1%-10 min-ACT | 74.0 | 14.6 | 11.4 | 3.3 | 63.1 | 59.1 ± 1.9 |
| MPD-3%-1 min | 73.6 | 13.8 | 12.6 | 3.2 | 86.4 | 51.2 ± 1.9 |
| MPD-3%-1 min-ACT | 73.0 | 14.7 | 12.3 | 3.2 | 73.3 | 49.3 ± 2.4 |
| MPD-3%-1 min-Flip | 72.5 | 14.7 | 12.8 | 3.2 | 79.3 | ND |

TABLE 2-continued

Further composition and surface properties of free-standing polymer thin films fabricated by interfacial polymerization (IP). ND refers to data not determined. ACT refers to "activated" thin films, wherein the polymeric thin films were dipped in dimethylformamide for 4 h before being dipped in methanol for 15 min to wash them. Flip refers to the reverse side of the thin film. Degree of network cross-linking is calculated as, $$\left[ DNC = \frac{X}{X+Y} \times 100\% \right]$$

where $\left[ \frac{O}{N} = \frac{3X+4Y}{3X+2Y} \right]$.

| Free-standing polymer thin films (amine-wt %-IP time) | Atomic composition from XPS (%) | | | | Degree of network crosslinking (DNC) (%) | Contact angle (°) |
|---|---|---|---|---|---|---|
| | C | O | N | COOH | | |
| MPD-4%-1 min | 73.3 | 14.7 | 12.0 | 3.4 | 69.7 | 53.6 ± 2.9 |
| MPD-4%-1 min-ACT | 73.2 | 14.5 | 12.3 | 3.4 | 75.4 | 53.1 ± 1.8 |
| MPD-10%-1 min | 74.5 | 12.8 | 12.7 | 1.8 | 98.8 | 60.6 ± 4.0 |
| MPD-10%-1 min-ACT | 74.7 | 12.9 | 12.4 | 2.2 | 94.1 | 57.6 ± 2.4 |
| PIP-0.1%-10 min | 73.2 | 14.2 | 12.6 | 2.0 | 82.1 | 44.1 ± 1.1 |
| PIP-0.1%-10 min-ACT | 72.7 | 14.6 | 12.7 | 2.1 | 79.1 | 41.9 ± 1.5 |
| AMP-0.1%-10 min | 75.5 | 13.1 | 11.4 | 1.7 | 79.2 | 55.7 ± 1.4 |
| AMP-0.1%-10 min-ACT | 75.0 | 13.2 | 11.5 | 1.6 | 79.3 | 56.2 ± 1.7 |

Table 2 shows the carbon, oxygen and nitrogen content in the thin films estimated by X-ray photoelectron spectroscopy (XPS). The extent of chemical cross-linking (DNC) was calculated from the relative values of N and O measured from XPS.

The thicknesses for smooth thin films fabricated from MPD were estimated by Ar sputtering in XPS and spectroscopic ellipsometry, confirming a sub-10 nm thickness.

The contact angles for all polyamide thin films were in the range 50-60°, which suggests similar polarity (surface energy) of the surfaces of all the thin films formed.

Atomic Force Microscopy (AFM) Study

To measure the thickness from AFM, free-standing thin films were transferred to silicon wafers and dried at room temperature. A scratch was made to expose the wafer surface and allow measurement of the height from the silicon wafer surface to the upper thin film surface. The thickness of the thin film was estimated from the height difference between the silicon and the thin film using a one dimensional statistical function.

Figure 2:
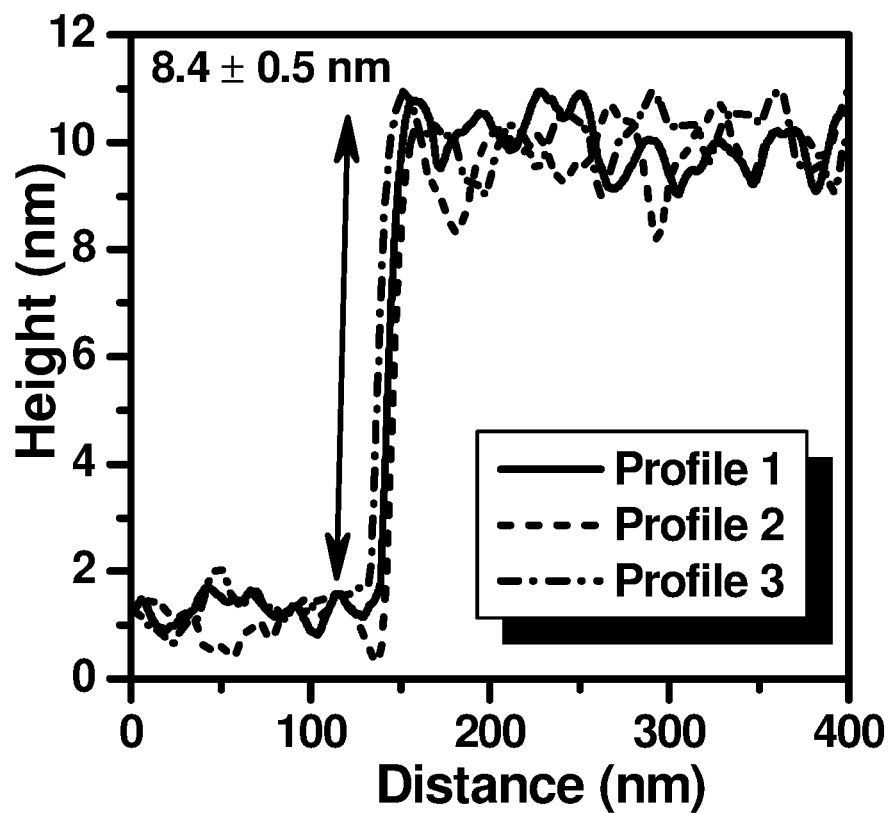

FIG. 2 shows the AFM image measured for the polyamide thin film fabricated from 0.1 wt % MPD and 0.005 wt % TMC and reacted for 10 min. A thickness of approximately 8.4 nm was measured.

Figure 3:
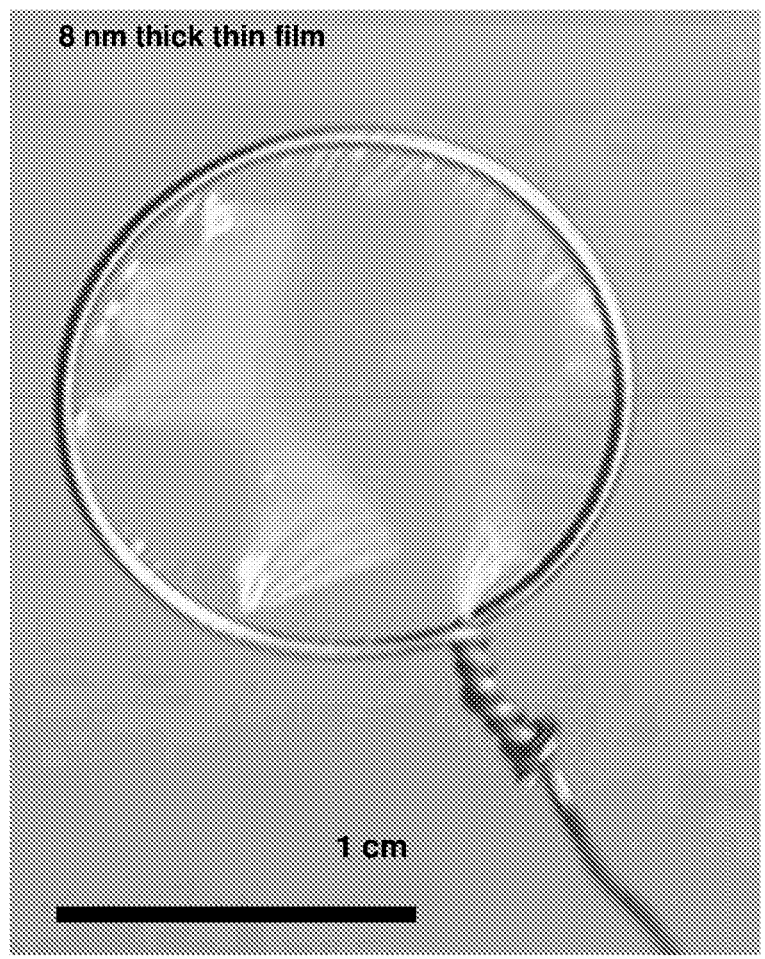

FIG. 3 shows a smooth polymer thin film (fabricated from 0.1 wt % MPD and 0.005 wt % TMC and reacted for 10 min) transferred to a wire lasso; although the thin film is only ca. 8 nm thick, it forms an integral surface across the whole 1.5 cm diameter of the lasso.

Scanning Electron Microscopy (SEM) Study

A crumpled structure of polymer thin films was observed when prepared from high concentration MPD-TMC (MPD: 3 wt % and TMC: 0.15 wt %, reacted for 1 min). The SEM image of free-standing crumpled polyamide thin film transferred onto a silicon wafer is shown in FIG. 4a.

Carbonisation of Polyamide Thin Film

Polyamide thin film on silicon wafer was converted to 2-dimensional carbon thin film material via high temperature carbonisation under hydrogen (argon:hydrogen=9:1) for 1 h at 900° C. Polyamide thin films were placed inside a ceramic crucible in an electrical furnace and the temperature was increased at 5° C. per min under the said gas atmosphere. After the carbonisation process, the furnace was allowed to cool down to room temperature under nitrogen atmosphere.

Atomic Force Microscopy (AFM) Study

Figure 5:
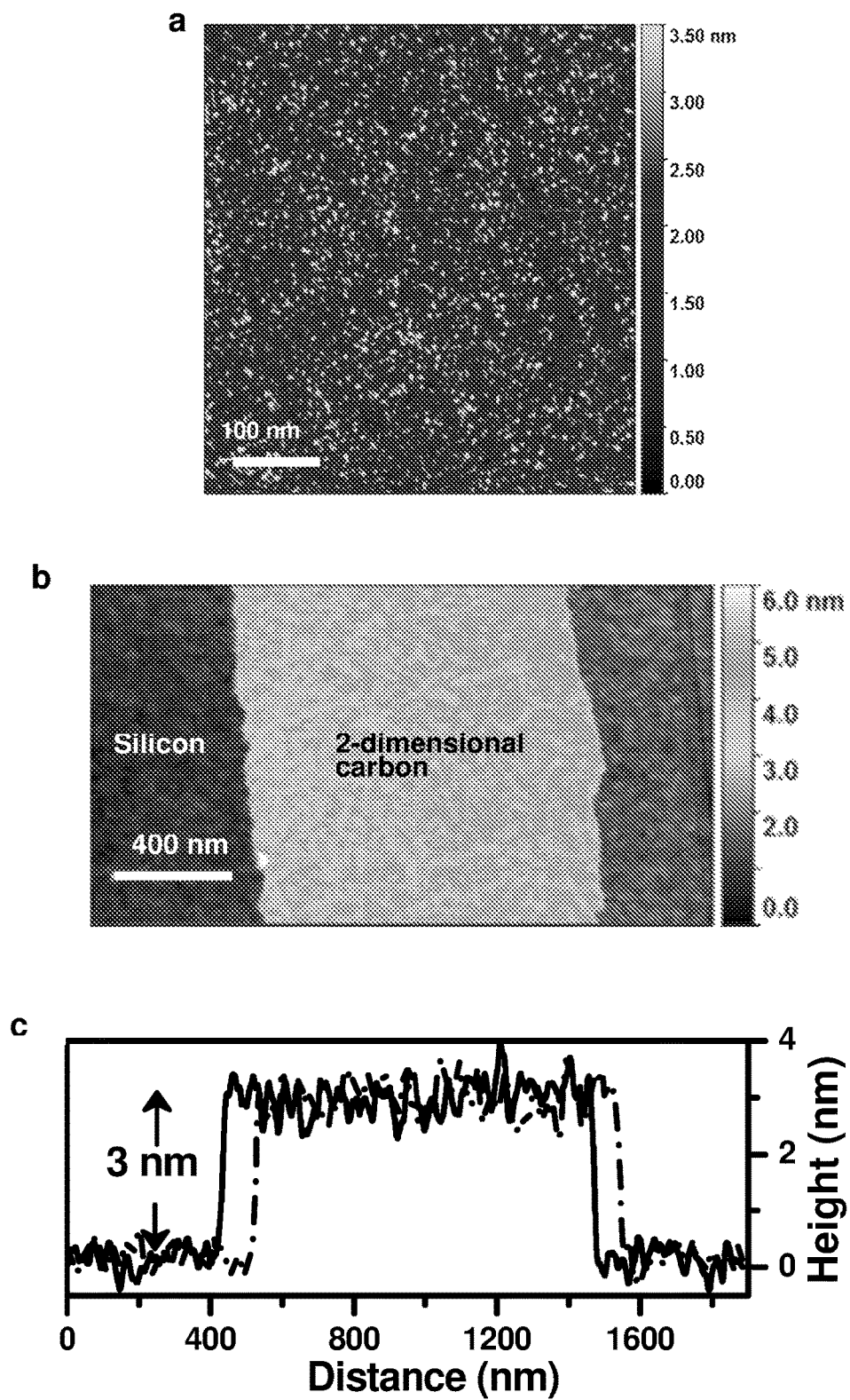

2-Dimensional carbon thin film material fabricated on silicon wafers was studied using atomic force microscopy (AFM). For a 2-dimensional carbon thin film material prepared from polyamide thin film (MPD: 0.1 wt % and TMC: 0.005 wt %, reacted for 10 min) the surface morphology and cross-sectional image with height profile is shown in FIG. 5. Very smooth surface of the 2-dimensional carbon thin film material with sub-nm rms roughness and a thickness of about 3 nm was measured with AFM.

FIG. 5 shows a) the surface morphology of the 2-dimensional carbon thin film material prepared from a 0.1 wt % water solution of m-phenylenediamine (MPD) and 0.005 wt % trimesoyl chloride (TMC) in hexane and reacted for 10 min, b) the height profile of a section of a smooth 2-dimensional carbon thin film material on silicon wafer, and c) the atomic force microscopic image of 2-dimensional carbon thin film material resulting from carbonising a polyamide thin film about 8 nm thick.

The measured thicknesses of the carbon thin film material were in the range of 1-3 nm. The average area of the flakes of carbon thin film material was bigger than 20,000,000× 20,000,000 nm².

Scanning Electron Microscopy (SEM) Study

The 2-dimensional carbon thin film material generated after carbonisation of the crumpled polyamide thin film (MPD: 3 wt % and TMC: 0.15 wt %, reacted for 1 min) at 900° C. for 1 h is also shown in FIG. 4b. Interestingly, the surface features of the polyamide was almost retained after carbonisation, although the features were flattened.

Raman Spectroscopy Study

Raman measurements were carried out with a spectrometer (Renishaw RM2000 CCD) using a 514 nm laser excitation, laser power of 0.5 mW and 10 s integration time. The laser was focused onto the sample using a 50 times short working distance objective. Chemical structures of 2-dimensional carbon thin film material prepared from different monomers and with different surface morphologies on silicon wafer were studied using Raman spectra. The letters 'D' and 'G', as presented in the graph of FIG. 6, stand for two characteristic Raman active modes for many carbon allotropes and the ratio D/G is a measure of the density of defects present in the 2-dimensional carbon thin films. The structure observed from the Raman spectra confirms the graphitisation of the carbon structure when carbonised at high temperature under hydrogen.

Example 2

Preparation of Polymer Thin Film at the Interface of Two Immiscible Liquids
Transfer of the Polymer Thin Film on Silicon Wafer and Copper Foil Polyamide thin film was prepared in a beaker by carefully pouring TMC-hexane solution on the surface of aqueous MPD solution. A relatively flat thin film of thickness about 15 nm with local protuberance structures was formed when reacting with 3 wt % MPD and 0.15 wt % TMC at room temperature. The polymer thin film was then picked up on a silicon wafer or on copper foil.
Carbonisation of Polyamide Thin Film Polymer thin films on silicon wafer or copper foil were converted to 2-dimensional carbon thin film material via high temperature carbonisation under hydrogen (argon:hydrogen=9:1) for 1 h at 900° C. Polymer thin films were placed inside a ceramic crucible in an electrical furnace and the temperature was increased at 5° C. per min under the said gas atmosphere. After the carbonisation process, the furnace was allowed to cool down to room temperature under nitrogen atmosphere.

Example 3

Figure 7:
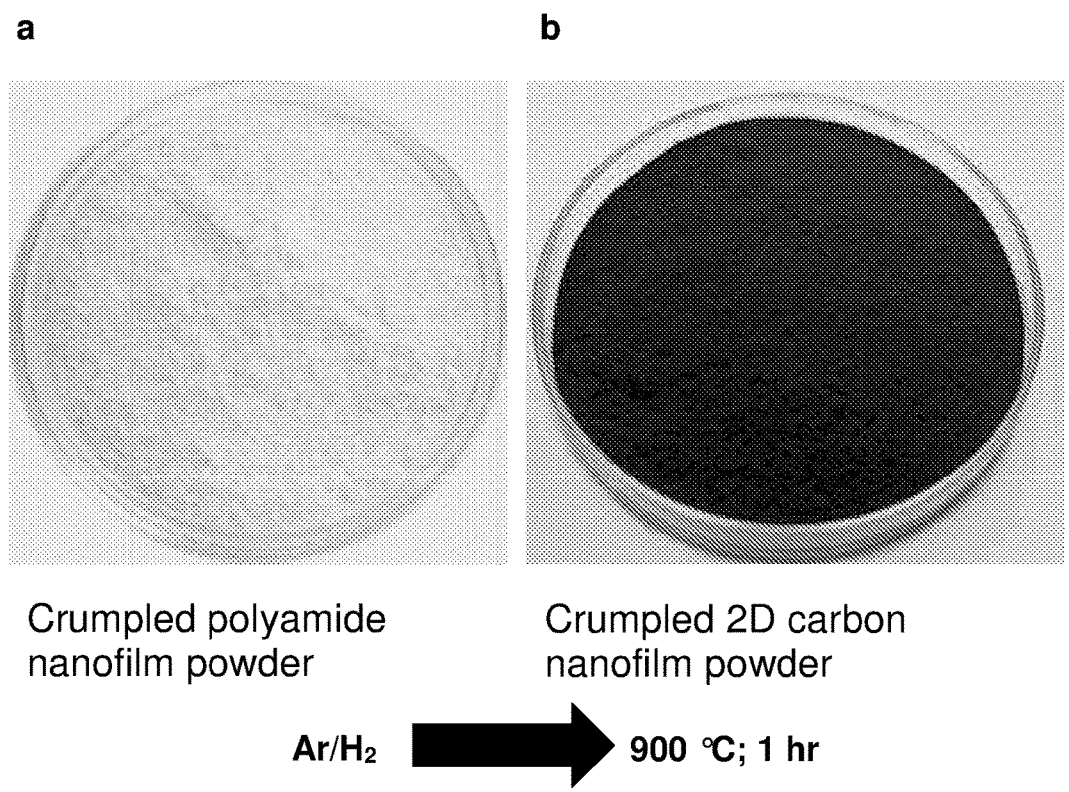
FIG. 7 shows a) the crumpled polyamide thin film powder prepared from interfacial polymerisation at a liquid interface in a liquid-liquid (aqueous-hexane) system followed by drying and b) the crumpled surface texture 2-dimensional carbon thin film material powder prepared by carbonising the polyamide thin film powder under a hydrogen atmosphere (argon:hydrogen=9:1) for 1 h at 900° C.

Production of Polyamide Thin Film Powder at the Interface of Two Immiscible Liquids The polymer thin film powder was prepared by slowly adding TMC-hexane solution on top of the aqueous MPD solution and rigorously shaking the solution for at least 1 min. The vigorous shaking promoted formation of a large amount of polymer thin film swollen in the solvent. The excess MPD was removed by washing the polymer in water several times. Excess TMC was then removed by washing with excess amount of acetone several times. Highly swelled polymer thin film was then dried either by freeze-drying or in a vacuum oven at 50° C. overnight after hand squeezing the swelled polymer. The photograph of a petri-dish containing polymer thin film powder is shown in FIG. 7. Table 3 represents a list of polyamide thin film powders prepared at liquid interfaces under different experimental conditions. The temperature of the MPD solution was increased to increase the rate of reaction at the interface and to form different crumpling of the thin film.

TABLE 3

Preparation condition of thin films at the interface

| Polymer thin film as powder and derived carbon powder | Polymerization condition | | |
|---|---|---|---|
| | Aqueous amine | | |
| | MPD (wt %) | Temperature (° C.) | TMC (wt %) |
| BL-PA-01-Carbon | 6.0 | 22 | 0.6 |
| BL-PA-02-Carbon | | 22 | 3.0 |
| BL-PA-03-Carbon | | 50 | |
| BL-PA-04 | | 22 | 6.0 |
| BL-PA-05 | | 50 | |
| BL-PA-06 | | 22 | 3.0 |
| BL-PA-07 | | 50 | |
| BL-PA-08 | | 22 | 0.6 |
| BL-PA-09 | | 50 | |

Conversion of Polymer Thin Film Powder to 2-Dimensional Carbon Thin Film Powder Under High Temperature Carbonisation Polymer thin film powder was converted to 2-dimensional carbon thin film residue powder via high temperature carbonisation under hydrogen (argon:hydrogen=9:1) for 1 h at 900° C. Polymer thin film powder was placed inside a ceramic crucible in an electrical furnace and the temperature was increased at 5° C. per min under the said gas atmosphere. After the carbonisation process, the furnace was allowed to cool down to room temperature under nitrogen atmosphere. The photograph of a petri-dish containing 2-dimensional carbon thin film material powder is shown in FIG. 7.

Figure 8:
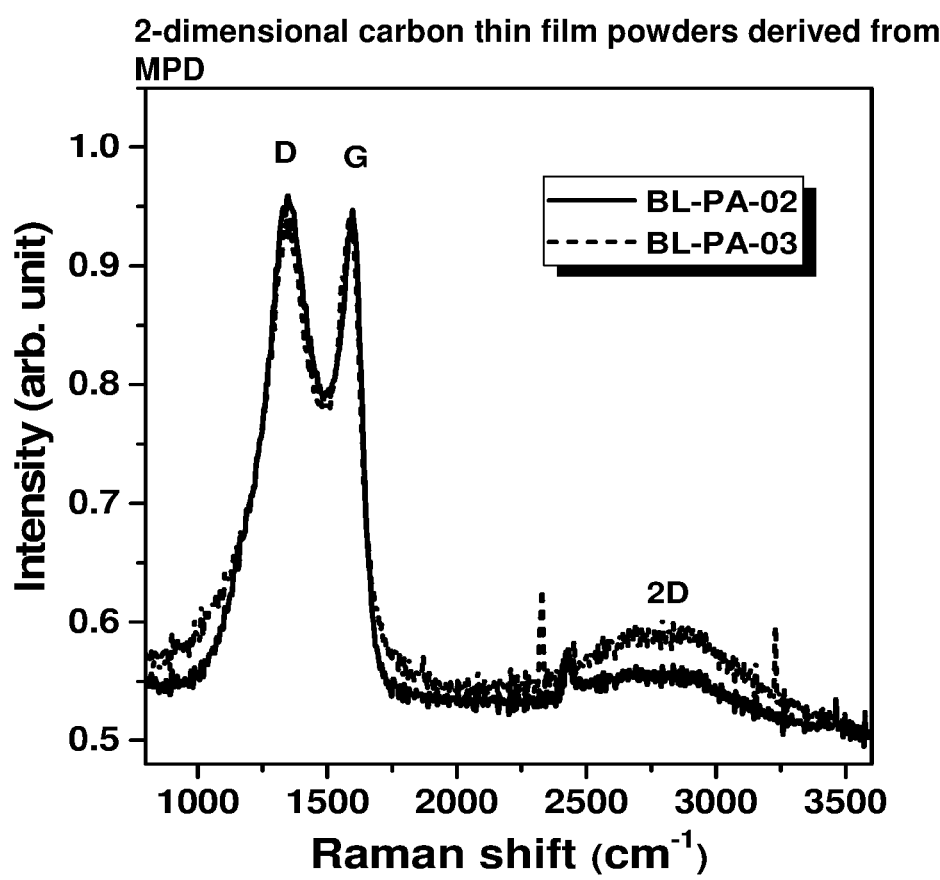
FIG. 8 is the Raman spectra of crumpled 2-dimensional carbon thin film material powder, derived from polyamide thin film powder. All Raman spectra were collected at 514 nm laser line excitation.

The Raman spectra of the crumpled 2-dimensional carbon thin film material prepared from the carbonisation of the crumpled polyamide (MPD: 6 wt % and TMC: 3 wt %, reacted for 1 min) thin film powder formed at the interface is shown in FIG. 8. The temperature of MPD solution doesn't make a significant difference to the Raman result and confirms the identical chemical structure of 2-dimensional carbon thin film materials.
Transmission Electron Microscopy (TEM)

Transmission electron microscopy (TEM) was carried out using JEOL JEM-2010 or JEM-2000 FX II operated at 200 kV. Gatan ES500W Erlangshen™ (model 782) and Multi-Scan MSC 600HP (Model 794) CCD cameras were used for wide range TEM and high resolution TEM (HRTEM) imaging, respectively. A piece of the free-standing polymer thin film was transferred to a copper grid and dried at room temperature and employed for TEM characterization.

Figure 9:
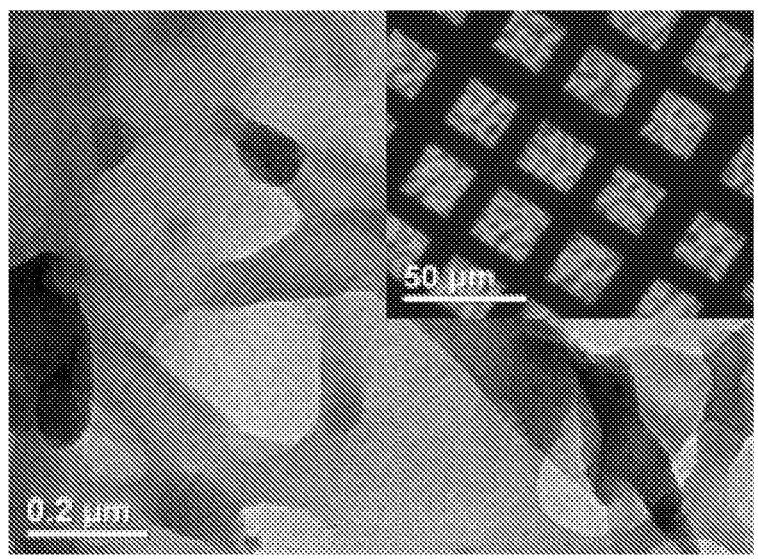
FIG. 9 shows a TEM image of crumpled 2-dimensional carbon thin film material prepared from MPD: 6 wt % and TMC: 3 wt %. Inset shows a large free-standing area on a copper grid.
Figure 10:
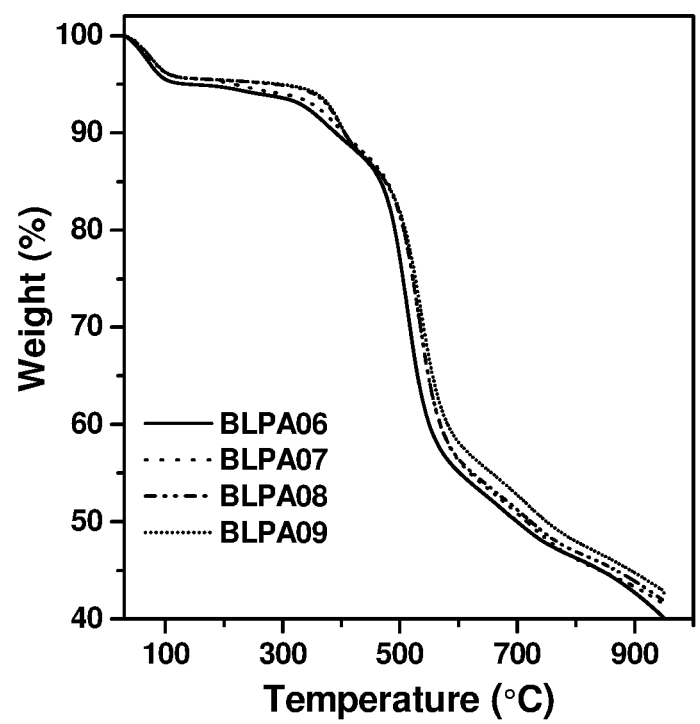
FIG. 10 shows a thermogravimetric spectra and the resulting derivative spectra, showing the degradation temperature (~535° C.) of various polyamide thin film powders shown in Table 3 (derived from different ratios of MPD to TMC) recorded under a nitrogen environment.
Figure 10:
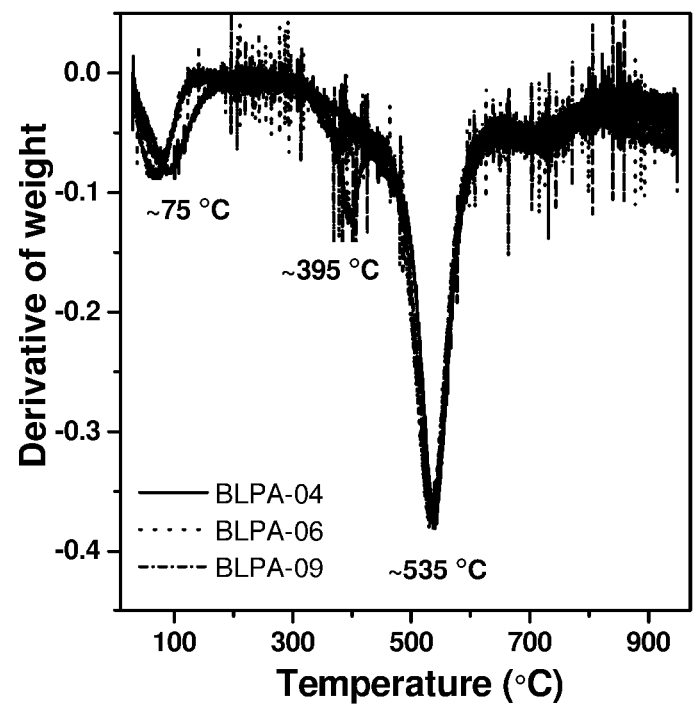

The TEM image of the crumpled 2-dimensional carbon thin film material produced at the interface (MPD: 6 wt % and TMC: 3 wt %) is shown in FIG. 9. The inset shows the large area of the crumpled 2-dimensional carbon on the copper mesh.
Thermogravimetric (TGA) Study of Polymer Thin Film Powder TGA was carried out at a heating rate of 10° C. per minute under nitrogen atmosphere between 30 to 950° C. using TGA Q500 (TA Instruments). Typical TGA curve of the polyamide thin film powder prepared at the interface is shown in FIG. 10. The derivative spectra indicates the water loss from the polymer powder at ~75° C. and a decomposition peak at ~535° C. The peak ~395° C. could be due to the decomposition of excess MPD or TMC remained within the samples.
ATR-FTIR Study of Polyamide Thin Film Powder The ATR-FTIR spectra were recorded on a PerkinElmer Spectrum 100 spectrometer equipped with a Universal ATR sampling accessory (diamond crystal). The collective scans (typically 10) were recorded for each sample in the spectral range of 4000-400 cm$^{-1}$. To improve the signal-to-noise ratios, spectra were recorded with an incident laser power of 1 mW and a resolution of 0.5 cm$^{-1}$.

Figure 11:
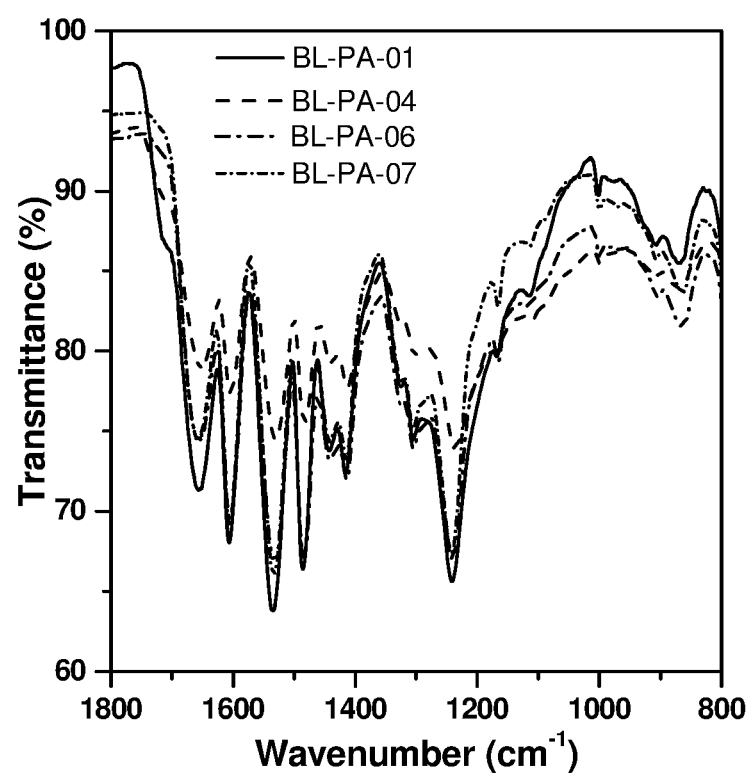
FIG. 11 is the ATR-FTIR spectra of several polyamide thin film powders and 2-dimensional carbon thin film material powders shown in Table 3 (derived from different ratios of MPD to TMC) showing the unique signature vibrational bands of polyamide. For carbonised samples, carbonisation was conducted under hydrogen atmosphere (argon:hydrogen=9:1) for 1 h at 900° C.

FTIR spectra are presented in FIG. 11. Typical absorption peaks corresponding to polyamide is clearly evident from the spectra. All spectra correspond to different thin films prepared under different interfacial reaction conditions (see Table 1) shows identical absorption peak position, confirmed the identical chemical structure of all polyamide formed at the interface.

Gas Adsorption Study of Polymer Thin Film Powder and 2-Dimensional Carbon Thin Film Material Powder Nitrogen adsorption and desorption spectra was recorded with Micromeritics using TriStar 3000 V6.07 A software. Samples were dried at 50° C. under nitrogen for at least 4 h before the measurement. Specific surface area, $S_{BET}$, was determined by BET analysis of $N_2$ adsorption isotherm at 77 K. Microporous area and volume were measured from the t-plot. Average pore diameter, $D_A$ and $D_D$, were determined by BJH analysis of $N_2$ adsorption and desorption isotherms, respectively. $V_{meso}$ and $V_{macro}$ are cumulative pore volumes in the radius ranges of 1-300 nm, respectively.

Figure 12:
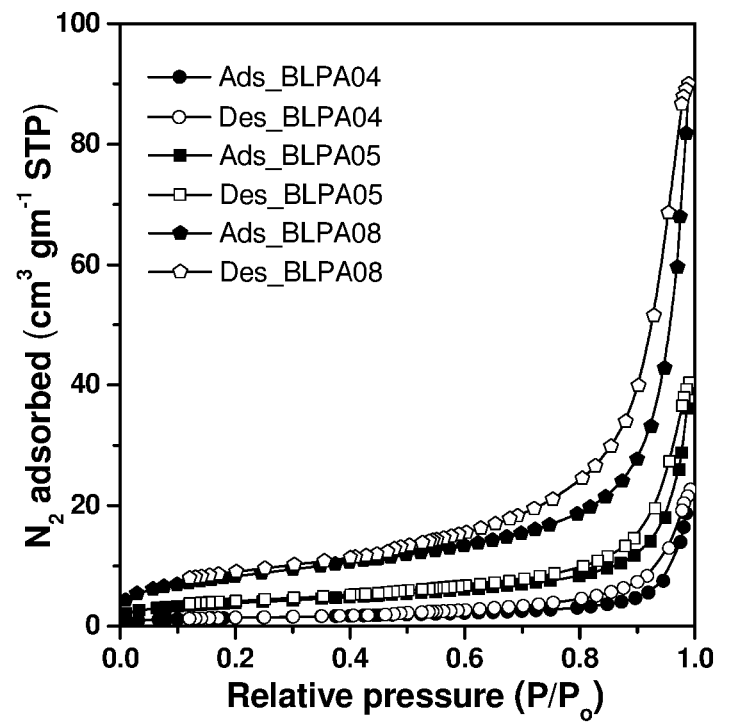
FIG. 12 is a combined spectra of nitrogen adsorption and desorption for polymer thin film powders (left) and the 2-dimensional carbon thin film material powders (right) derived from the polymer thin film powders by carbonisation under hydrogen atmosphere (argon:hydrogen=9:1) for 1 h at 900° C. shown in Table 3.
Figure 12:
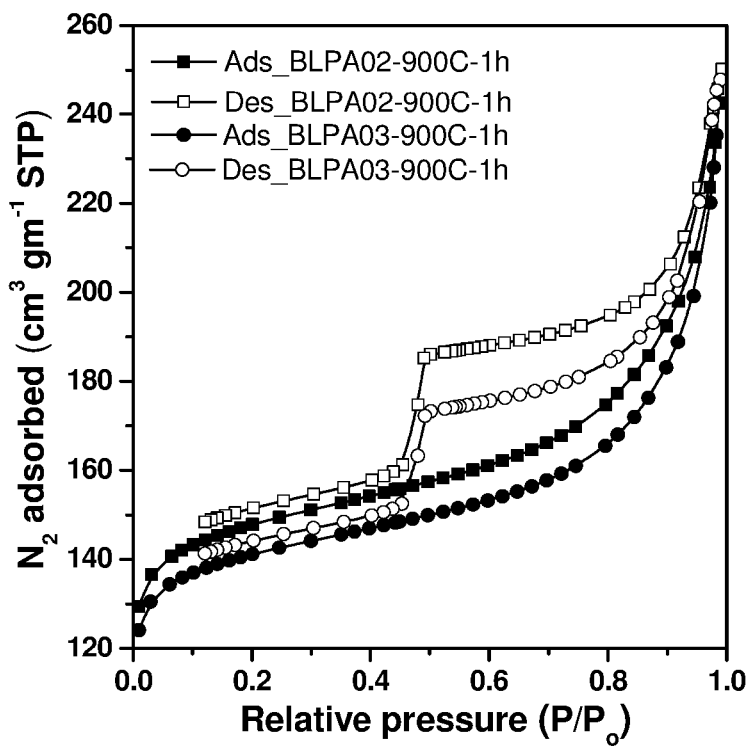

FIG. 12 shows the combined spectra of nitrogen adsorption and desorption for polymer thin film powder (left) and the 2-dimensional carbon thin film material powder (right) derived from the polymer thin film powder by carbonisation under hydrogen atmosphere (argon:hydrogen=9:1) for 1 h at 900° C.

Table 4 presents the gas adsorption properties of polyamide thin film powders formed at the liquid interface and derived 2-dimensional carbon thin film material powders carbonised at 900° C. for 1 h under argon/hydrogen atmosphere. From Table 4 it is evident that the polymer thin film powders have very small microporous volume and whereas the 2-dimensional carbon thin film material powders showed a significant microporous surface area with a BET surface area exceeding 500 m$^2$g$^{-1}$.

organic mixture. In some cases a sacrificial nanostrand layer was formed on a cross-linked polyimide ultrafiltration support membrane (see FIG. 13) via vacuum filtration of a nanostrand solution[4,5] and then used as a substrate for fabrication of nanofilms with controlled morphology through controlled release of diamine at the water-hexane interface[5]. FIG. 14 shows the schematic of the process for fabricating ultrathin and free-standing polymer nanofilms made via both nanostrand assisted interfacial polymerisation and the conventional interfacial polymerisation at the bulk liquid interface. m-Phenylenediamine (MPD) in an aqueous phase was reacted with trimesoyl chloride (TMC) in a hexane phase. The resulting freestanding polymer nanofilm was then transferred onto quartz, metal or Si@SiO$_2$ wafers (Si wafer with native ~2.3 nm oxide layer on surface) and carbonised under an argon-hydrogen environment (Ar: H$_2$=9:1) at 600-1100° C. for 1 h.

The thickness of the initial polymer nanofilm and the resultant carbonised 2D carbon nanofilm on Si@SiO$_2$ wafer was determined using atomic force microscopy (AFM). A scratch was made to expose the wafer surface and allow measurement of the height from the silicon wafer surface to the upper nanofilm surface. FIGS. 15*a* and *b* show the AFM image and the 1 D statistical analysis from the image to calculate the height difference from the silicon wafer substrate to the polyamide nanofilm surface and hence the thickness of the film. The measured thickness of the smooth polyamide nanofilm was about 8 nm. After carbonisation, an extra-large, defect-free and smooth 2D carbon nanofilm of thickness 2 nm was achieved (FIGS. 16*a* and *b*).

FIG. 17 shows a picture of a single sheet of defect-free 2D carbon nanofilm on Si@SiO$_2$ wafer (~2.3 nm oxide layer) with an area of around 45 cm$^2$, fabricated from the carbonisation of polyamide nanofilm formed at the bulk liquid interface from 0.05 wt % MPD in water and 0.05 wt % TMC in hexane (2DC$_{MPD\ 0.05-22-0.05-1\ m}$1100° C.$_{R1-H2+Ar-1\ h}$) (in the aforementioned notation, which is adopted throughout

TABLE 4 shows the gas adsorption properties of polyamide thin film powders formed at the liquid interface and derived 2-dimensional carbon thin film material powders carbonised at 900° C. for 1 h under argon/hydrogen atmosphere.

| Thin film powder and derived carbon thin film powder | Polymerization condition | | | | Micropore | | | | |
|---|---|---|---|---|---|---|---|---|---|
| | Aqueous amine | | | | | | | | |
| | MPD (wt %) | Temp (° C.) | TMC (wt %) | $S_{BET}$ (m$^2$ g$^{-1}$) | area (m$^2$ g$^{-1}$) | $D_A$ (nm) | $D_D$ (nm) | $V_{micro}$ (cm$^3$ g$^{-1}$) | $V_{meso+Macro}$ (cm$^3$ g$^{-1}$) |
| BL-PA-01-Carbon | 6.0 | 22 | 0.6 | 498.9 | 402.1 | 11.6 | 9.2 | 0.18 | 0.22 |
| BL-PA-02-Carbon | | 22 | 3.0 | 508.3 | 406.9 | 9.4 | 6.8 | 0.18 | 0.20 |
| BL-PA-03-Carbon | | 50 | | 486.0 | 393.9 | 10.5 | 7.7 | 0.18 | 0.20 |
| BL-PA-04 | | 22 | 6.0 | 5.0 | 0.7 | 29.5 | 20.7 | 0.00 | 0.03 |
| BL-PA-05 | | 50 | | 13.8 | 1.3 | 19.1 | 18.2 | 0.00 | 0.06 |
| BL-PA-06 | | 22 | 3.0 | 19.6 | 1.5 | 18.5 | 16.7 | 0.00 | 0.08 |
| BL-PA-07 | | 50 | | 24.9 | 0.8 | 17.3 | 15.5 | 0.00 | 0.10 |
| BL-PA-08 | | 22 | 0.6 | 30.0 | 0.9 | 18.5 | 16.4 | 0.00 | 0.14 |
| BL-PA-09 | | 50 | | 24.0 | 0.8 | 18.7 | 16.6 | 0.00 | 0.11 |

Example 4

Further Studies

Highly cross-linked polymer (polyamide) nanofilms were fabricated via interfacial polymerization of a diamine, and an acyl chloride at the interface of a biphasic aqueous-this example, "2DC" denotes a 2D carbon film; "$_{MPD}$" denote metaphenylene diamine; "$_{0.05}$" denotes the wt % of amine-containing reagent used in the interfacial polymerisation step; "$_{22}$" denotes the temperature of the interfacial polymerisation step; "$_{0.05}$" denotes the wt % of the carboxy-containing reagent used in the interfacial polymerisation step; "$1_m$" denotes a 1-minute duration of the interfacial polymerisation step; "1100° C." denotes the final temperature at which the carbonisation step was performed; "$_{R1}$" denotes that Ramp 1, defined herein, was used; "$_{H2+Ar}$" denotes that an atmosphere of $H_2$ and Ar was used in the carbonisation step; and "$1_h$" denotes a 1 hour soak time for the carbonisation step). Variations in the film thickness and the color contrast in the optical images was not observed, as the light interference on the thin $SiO_2$ layer was not strong enough and was not modulated by the carbon layers.[6,7] Transparency and the thinness of this carbon nanofilm on microscopic quartz substrate are compared with the polymer nanofilm and illustrated in the inset picture. FIG. 18a shows the optical microscope image of the 2D carbon nanofilm which is the part of a continuous sheet of few $cm^2$ in dimension. The arrow indicates the edge of a tear made in the polymer nanofilm before the carbonisation. It was deduced that the formation of 2D carbon nanofilm by carbonisation does not depend on the property of the support. 2D carbon nanofilms formed on different supports were found to have identical chemical structure.

Carbonisation temperature, temperature ramp, soak time, and gas composition were widely varied to understand their effect on the 2D carbon formation process. In some cases, carbonisation temperature was limited by the temperature stability of the selected support. When using copper as a support for the polymer nanofilm, no catalytic activity of copper was noticed when carbonised under conditions identical to those adopted for CVD graphene fabrication. FIG. 18b shows the SEM image of the edge of a 2D carbon nanofilm fabricated on a copper TEM grid ($2DC_{MPD\ 0.1\text{-}22\text{-}0.1\text{-}1\ m}900°\ C._{\cdot R1\text{-}H2+Ar\text{-}1\ h}$). Polyamide nanofilms were formed at the bulk liquid interface from 0.1 wt % MPD in water and 0.1 wt % TMC in hexane and transferred onto the TEM grid. It was surprising to note that the freestanding polyamide nanofilms on the square hole area (~25 $\mu m^2$) of the TEM grid was converted to the freestanding carbon nanofilm during the carbonisation process without disintegration. This indicates that the mechanical integrity of the polymer nanofilm was preserved during the carbonisation process to 2D carbon nanofilm. FIGS. 18c and d represent the optical microscope image of the polyamide nanofilm and the carbonised 2D carbon nanofilm on a copper grid. The sections were captured with partially uncovered areas on the grid to highlight the nanofilms by contrast. Insets in the figures show the SEM image of the nanofilms covering a single square hole.

It was deduced that the chemical and structural properties of the 2D carbon nanofilms are in the same range as the properties of graphene. The Raman spectra presented in FIG. 19a displays a nano-graphitic-type carbon[8] and resembles the spectra of graphene and reduced graphene oxide materials.[9-12] The existence of a mixture of graphitic peak or G peak and a disordered peak or D peak indicate the amorphous content of the 2D carbon nanofilms arising from the edge defects, dangling bonds, and related features. The observed intensity ratio ($I_D/I_G$) from FIG. 19a and FIG. 20, which is also inversely proportional to the fourth power of $E_{laser}$, is about 0.87 to 0.90 for our 2D carbon nanofilms. Such behaviour is common for polycrystalline graphene related materials and the calculated crystallite size is about 18-20 nm which is in agreement with the low temperature treated diamond-like carbon[9] and larger than the other polymer derived carbon films.[3] The Raman mapping for the 1596 $cm^{-1}$ peak and a snapshot of the Raman spectrum is shown in FIG. 19b.

Mapping was carried out on a folded region of a 2D carbon nanofilm which resembles the folded nature of the nanofilm under an optical microscope. As expected from the calculated crystallite size, the nanofilms are polycrystalline in nature and a partial graphitization was noticed in the high resolution transmission electron microscope (HRTEM) as shown in FIG. 21. An inter-planer spacing of 0.34 nm corresponds to the graphitic structure present within the carbon nanofilm carbonised under $H_2$/Ar at 1100° C. for 1 h on a nickel TEM grid. The manipulation of the surface morphology of the polyamide nanofilms was achieved by controlling the conditions for interfacial polymerization, moving from smooth to crumpled with increasing concentration of MPD and TMC at the interface. SEM images of crumpled polyamide nanofilms fabricated using nanostrand assisted interfacial polymerisation and transferred onto a silicon wafer ($PNF_{MPD\ 3\text{-}22\text{-}0.15\text{-}1\ m}$) and the corresponding carbonised 2D carbon nanofilm ($2DC_{MPD\ 3\text{-}22\text{-}0.15\text{-}1\ m}900°\ C._{\cdot R1\text{-}H2+Ar\text{-}1\ h}$) are presented in FIGS. 22a and b. The crumpled surface morphology of the polymer nanofilm was retained in the 2D carbon nanofilm after the carbonisation process (also see FIG. 23). TEM and HRTEM images of crumpled carbon nanofilm ($2DC_{MPD\ 3\text{-}22\text{-}0.15\text{-}1\ m}1100°\ C._{\cdot R1\text{-}H2+Ar\text{-}1\ h}$) are shown in FIG. 22c and again short range crystallinity was observed from the HRTEM image.

To understand the chemical nature of these carbon nanofilms, XPS study was conducted using a nanofilm powder made via interfacial polymerization carried out while shaking the biphasic liquid system, and collected as a polymer precipitate. An identical carbonisation process was followed to obtain 2D carbon nanofilm powders. XPS survey spectra and narrow scan C1s spectra of 2D carbon nanofilms ($2DC_{MPD\ 6\text{-}22\text{-}3\text{-}1\ m}600\text{-}1100°\ C._{\cdot R1\text{-}H2+Ar\text{-}1\ h}$) are shown in FIGS. 24-27 and Table 5 below.

TABLE 5

XPS results from polyamide nanofilms. Binding energies and plausible species were determined from the deconvolution of C1s, O1s and N1s core level XPS spectra. Energy position was calibrated after charge correction - C1s: 284.7 eV, O1s: 532.8 eV and N1s: 401.2 eV.

| Nano films | C1s | | | O1s | | | N1s | | |
|---|---|---|---|---|---|---|---|---|---|
| | BE (eV) | Species | Atomic (%) | BE (eV) | Species | Atomic (%) | BE (eV) | Species | Atomic (%) |
| @ 900 C. | | Carbon | 92.5 ± 0.6 | | Oxygen | 2.8 ± 0.2 | | Nitrogen | 4.7 ± 0.8 |
| | 284.6 | C—C ($sp^2$) aromatic | 58.5 | 531.0 | Carbonyl | 18.6 | 398.2 | Pyridinic | 17.9 |
| | 285.2 | C—C ($sp^3$) aliphatic | 6.0 | 532.5 | Carbonyl (ester, amide & anhydride) hydroxyl, ether | 48.8 | 400.2 | Pyrrolic | 16.2 |
| | 286.1 | Phenol, alcohol, ether | 12.3 | | | | 401.2 | Quaternary | 45.3 |
| | 287.3 | Carbonyl, quinine | 10.0 | 533.5 | Ether in ester & anhydride | 26.9 | 402.8 | Protonated pyridine/pyrrole | 20.6 |
| | 289.1 | Carboxyl, lactone, ester | 4.5 | 534.2 | Carboxyl | n/a | | | |

TABLE 5-continued

XPS results from polyamide nanofilms. Binding energies and plausible species were determined from the deconvolution of C1s, O1s and N1s core level XPS spectra. Energy position was calibrated after charge correction - C1s: 284.7 eV, O1s: 532.8 eV and N1s: 401.2 eV.

| Nano films | C1s BE (eV) Species | Atomic (%) | O1s BE (eV) Species | Atomic (%) | N1s BE (eV) Species | Atomic (%) |
|---|---|---|---|---|---|---|
| | 290.6 Carbonate, COO | 2.0 | 536.1 H$_2$O | 5.7 | | |
| | 291.6 Plasmon | 6.7 | | | | |
| @ 1100 C. | Carbon | 96.4 ± 0.3 | Oxygen | 2.0 ± 0.2 | Nitrogen | 1.6 ± 0.1 |
| | 284.6 C—C (sp$^2$) aromatic | 62.9 | 531.0 Carbonyl | 14.7 | 398.2 Pyridinic | 6.4 |
| | 285.2 C—C (sp$^3$) aliphatic | n/a | 532.5 Carbonyl (ester, amide & | | 400.2 Pyrrolic | 5.5 |
| | 286.1 Phenol, alcohol, ether | 13.5 | anhydride) hydroxyl, ether | 53.0 | 401.2 Quaternary | 52.9 |
| | 287.3 Carbonyl, quinine | 7.7 | 533.5 Ether in ester & anhydride | 23.7 | 402.8 Protonated | |
| | 289.1 Carboxyl, lactone, ester | 4.7 | 534.2 Carboxyl | n/a | pyridine/pyrrole | 35.2 |
| | 290.6 Carbonate, COO | 1.7 | 536.1 H$_2$O | 8.5 | | |
| | 291.6 Plasmon | 9.6 | | | | |

The binding energies of carbon atoms differ depending on how they are linked with other atoms. Deconvolution of the C1 s spectra gives at seven individual component groups that represent graphitic carbon (284.6 eV), and carbon present in phenol, alcohol or ether (286.1±0.3 eV), carbonyl or quinine groups (287.3±0.3 eV), carboxyl, lactone, or ester groups (289.1 eV) and carbonate groups (290.6 eV). The detailed distribution of these functional groups in GO and carbonised samples is listed in Table 5.

The O1s and N1s narrow scan XPS spectrum were deconvoluted for different energy corresponding to different species as shown in Table 5.

The carbon content, in terms of the total atomic composition calculated from XPS survey spectra, is increased and nitrogen and oxygen content was decreased after carbonisation at high temperature. The carbon content in the starting polymer will determine the overall carbon yield (Table 6 below). As shown in FIG. 24b, the deconvolution of narrow scan C1s spectra reveals the existence of different carbon species (Table 5)[1,13,14] The detailed analysis of C1s, N1s and O1s narrow scan is presented in Table 5 and a possible chemical structure of the carbon nanofilm is inferred from this data as shown in FIG. 28, with possible nitrogen and oxygen species bonded to the carbon backbone. Due to the existence of the remaining polar oxygen and nitrogen species, the surface of the carbon nanofilm remains relatively hydrophilic when carbonised at lower temperature (FIG. 29).

polymer nanofilms; this also renders them electrically non-conducting. A transmittance of ~90% was observed for the 2D carbon nanofilm fabricated from 0.02% MPD and 0.02% TMC reacted for 1 min and carbonised under H$_2$/Ar environment at 1100° C. for 1 h, resulting in a 3 nm thickness (2DC$_{MPD\ 0.02-22-0.02-1\ m}$1100° C.$_{\cdot R1-H2+Ar-1\ h}$). Decreased transmittance was observed with increased thickness and roughness of the carbon nanofilms (FIGS. 31 and 32) with increased conductivity. A trade-off relationship of transmittance with the sheet resistance is displayed in FIG. 30c, which clearly demonstrates the 2D carbon nanofilms are a potential candidate for transparent and conducting electrode materials. In some cases the combination of transparency and sheet resistance is much lower than the reduced graphene oxide and very close to the CVD graphene. At the same time the sheet sizes of the 2D carbon nanofilms are much larger than any other 2D materials including those of the graphene related materials.

The measured sheet resistance using two-probe gold contact, where the maximum probe spacing of gold electrode was 46 mm, showed an equivalent values to those measured with the conventional four-probe method (FIG. 30b). The measured sheet resistance of ~800Ω/ was unchanged up to a probe spacing of 20 mm below which it increased rapidly as the contact resistance in series with the carbon nanofilm becomes dominant. The linear I-V characteristics presented in the inset of FIG. 30b confirm the Ohmic contact between the gold electrode and the carbon nanofilm across a wide range of applied voltage of up to ±30

TABLE 6

Mass percentage calculation from the probable chemical structure of the nanofilms.

| Nanofilm and the nature of cross-linking (see reference xx) | Chemical formula | Unit weight (g Mol$^{-1}$) | Atomic (%) C† (%) | O† (%) | N† (%) | Weight (%) C (%) | O (%) | N (%) | H (%) |
|---|---|---|---|---|---|---|---|---|---|
| MPD + TMC Fully cross-linked (Y = 0) | C$_{18}$H$_{12}$O$_3$N$_3$ | 318 | 75.0 | 12.5 | 12.5 | 67.9 | 15.1 | 13.2 | 3.8 |
| Fully linear (X = 0) | C$_{15}$H$_{10}$O$_4$N$_2$ | 282 | 71.4 | 19.1 | 9.5 | 63.8 | 22.7 | 9.9 | 3.5 |
| PIP + TMC Fully cross-linked (Y = 0) | C$_{15}$H$_{15}$O$_3$N$_3$ | 285 | 71.4 | 14.3 | 14.3 | 63.2 | 16.8 | 14.7 | 5.3 |
| Fully linear (X = 0) | C$_{13}$H$_{12}$O$_4$N$_2$ | 260 | 68.4 | 21.0 | 10.5 | 60.0 | 24.6 | 10.8 | 4.6 |
| AMP + TMC Fully cross-linked (Y = 0) | C$_{18}$H$_{21}$O$_3$N$_3$ | 327 | 75.0 | 12.5 | 12.5 | 66.1 | 14.7 | 12.8 | 6.4 |
| Fully linear (X = 0) | C$_{15}$H$_{16}$O$_4$N$_2$ | 288 | 71.4 | 19.1 | 9.5 | 62.5 | 22.2 | 9.7 | 5.6 |

†Hydrogen content within the nanofilms was not taken into consideration for the calculation of atomic percentage to compare with XPS and EDX results.

The UV-vis transmittance spectra of polymer nanofilms transferred onto quartz substrates and the resultant 2D carbon nanofilms are shown in FIG. 30a. Polymer nanofilms showed higher transmittance compared to the carbon nanofilms because of the lower free-electron density in the V. This sheet resistance value is identical with the reported value for a 3-nm-thick transferred CVD graphene film.[2]

Table 7 below provides a comparison of the properties of graphene, reduced graphene oxide and the 2D carbon nanofilms of the invention.

TABLE 7

Comparison for the sheet resistance and transparency of 2D carbon nanofilms at 550 nm with graphene and reduced graphene oxide films

| Process | T (%) | Sheet resistance (Ω/square) | Reference |
|---|---|---|---|
| *Graphene (simulated)* | | | |
| Theoretical calculated values were taken from the reference | 72-98 | 5.2-62.4 | Nat. Nanotechnol. 5, 574, 2010 |
| *Mechanical exfoliation of graphene* | | | |
| Micromechanical cleavage | 90 | 5000 | Nano Lett. 8, 1704, 2008 |
| *CVD graphene film* | | | |
| CVD graphene film on Ni films | 76-84 | 278-665 | Nature 457, 706, 2009 |
| CVD graphene film on polycrystalline Ni films | 90 | 700 | Nano Lett. 9, 30, 2009 |
| Large-area graphene grown on Cu foils by CVD and transfer | 90-97 | 300-2100 | Nano Lett. 9, 4359, 2009 |
| CVD graphene film on Ni films and transfer | 72-91 | 210-1350 | Appl. Phys. Lett. 95, 063302, 2009 |
| Layer by layer stacking of large area CVD graphene | 90-97 | 40-270 | Nat. Nanotechnol. 5, 574, 2010 |
| *Solution processed graphene* | | | |
| Surfactant-stabilized, oxide-free graphene dispersions | 34-92 | 6150-43500000 | Small 6, 458, 2009 |
| Liquid-liquid assembly of graphene platelets | 70 | 100 | Nano Lett. 9, 167, 2009 |
| LB film of exfoliated graphene | 82-93 | 7200-150000* | Nat. Nanotech. 3, 538, 2008 |
| Solution-processed graphene transparent electrodes | 55-92.5 | 200-6860 | ACS Nano, 4, 43, 2010 |
| *Graphene oxide (GO) and reduced GO (rGO)* | | | |
| Vacuum filtration and reduced with hydrazine and annealed at 200° C. under nitrogen | 63-98.8 | 27275-494763000 | Nat. Nanotech. 3, 270, 2008 |
| Spin coated reduced graphene oxide films and treated at 1100° C. | 2-97 | 55-906890 | ACS Nano 2, 463, 2008 |
| Dip-coated GO film and thermal annealed at 1100° C. under Ar/$H_2$ | 63 | 1800 | Nano Lett. 8, 323, 2008 |
| Spin assisted self-assembly of reduced graphene oxide | 87-95 | 11300-31700 | Appl. Phys. Lett. 95, 103104, 2009 |
| LB assembly of graphite oxide single layer followed by reduction | 95 | 19000000 | J. Am. Chem. Soc. 131, 1043, 2009 |
| LB film of ultralarge graphene | 54-96 | 275-350000 | ACS Nano, 5, 6039, 2011 |
| GO film reduced with HI at 100° C. | 71-87 | 840-20500 | ACS Nano 4, 5245, 2010 |
| GO film via in situ reduction with Na—$NH_3$ solution | 80 | 350 | Nat. Commun. 4, 1539, 2013 |
| GO films reduced for 1 h at 100° C. in 55% HI | 85 | 1600 | Carbon 48, 4466, 2010 |
| Layer-by-layer assembly of oppositely charged reduced graphene oxides and annealed under hydrogen atmosphere | 75-94 | 2500-6900000 | J. Mater. Chem. 21, 3438, 2011 |
| Solution processed rGO for large-area fabrication via rod coating | 64-92 | 1540-18850 | Adv. Mater. 24, 2874, 2012 |
| Spray coating from GO/hydrazine solution on preheated support | 70-90 | 600-8230 | Carbon, 48, 1945, 2010 |
| Spray coating of chemically modified graphene suspension | 96 | 20000000 | Nat. Nanotechnol. 3, 101, 2008 |
| *Graphene from solid carbon source* | | | |
| Growth of graphene from PMMA, sucrose and fluorene | 97 | 1200 | Nature 468, 550, 2010 |
| *Carbon nanosheet derived from polymers* | | | |
| Pyrolysis of spin-coated PIM-1 polymer at 1200° C. | 50-88.5 | 1500-12000 | Nanoscale 6, 678, 2014 |
| Spin-coating of polyacrylonitrile followed by carbonization | 33-99 | 100-320000000 | Appl. Phys. Lett. 102, 043304, 2013 |
| Spin-coating of pitch followed by carbonization | 52-89 | 1500-14500 | Solar Energy Materials & Solar Cells 115, 1, 2013 |
| Heat-treatment of spin-coated polyacrylonitrile | 77-92 | 4600-13400 | Carbon 55, 299, 2013 |
| Spin coated polymer including photoresist | 91-95 | 46000-123000 | Appl. Mater. Interface 1, 927, 2009 |
| *Carbon nanotube based film* | | | |
| SWCNT spray coating | 52-98 | 24-614 | J. Am. Chem. Soc. 129, 7758, 2007 |
| *ITO films* | | | |
| ITO simulated | 50-89 | 3.7-295 | Nano Lett. 8, 689, 2008 |
| *2D carbon nanofilm (2DC) approx. 2.5-5 nm thick* | | | |
| Polymer nanofilms were fabricated using nanostrand layer at the interface | | | This invention |
| MPD 0.5-22-0.05-1 m @ 900° C.-R1-Ar-1 h | 73.6 | 5000 ± 529 | |
| MPD 0.5-22-0.05-1 h @ 900° C.-R1-Ar-1 h | 51.5 | 2550 ± 354 | |
| MPD 0.1-22-0.02-1 m @ 900° C.-R1-Ar-1 h | 80.3 | 4750 ± 592 | |
| Polymer nanofilms were fabricated at the bulk liquid-liquid interface | | | |

TABLE 7-continued

Comparison for the sheet resistance and transparency of 2D carbon nanofilms at 550 nm with graphene and reduced graphene oxide films

| Process | T (%) | Sheet resistance ($\Omega$/square) | Reference |
|---|---|---|---|
| MPD 6-22-3-1 m @ 900° C.-R1-Ar-1 h | 62.3 | 1573 ± 206 | |
| MPD 6-22-0.3-1 m @ 900° C.-R1-Ar-1 h | 74.0 | 2212 ± 19 | |
| MPD 3-22-0.3-1 m @ 900° C.-R1-Ar-1 h | 78.0 | 1628 ± 78 | |
| MPD 3-22-0.15-1 m @ 900° C.-R1-Ar-1 h | 76.3 | 2720 ± 29 | |
| MPD 1-22-0.05-1 m @ 900° C.-R1-Ar-1 h | 85.6 | 5193 ± 139 | |
| MPD 0.1-22-0.1-1 m @ 900° C.-R1-Ar-1 h | 90.1 | 8976 ± 426 | |
| MPD 0.1-22-0.05-1 m @ 900° C.-R1-Ar-1 h | 90.7 | 14481 ± 1294 | |
| MPD 0.05-22-0.05-1 m @ 900° C.-R1-Ar-1 h | 93.2 | 20923 ± 4302 | |
| MPD 6-22-3-1 m @ 900° C.-R1-H2+Ar-1 h | 53.2 | 1231 ± 94 | |
| MPD 6-22-0.3-1 m @ 900° C.-R1-H2+Ar-1 h | 71.5 | 2397 ± 158 | |
| MPD 3-22-0.3-1 m @ 900° C.-R1-H2+Ar-1 h | 69.0 | 2069 ± 41 | |
| MPD 3-22-0.15-1 m @ 900° C.-R1-H2+Ar-1 h | 73.8 | 3181 ± 23 | |
| MPD 1-22-0.05-1 m @ 900° C.-R1-H2+Ar-1 h | 84.7 | 4498 ± 344 | |
| MPD 0.1-22-0.1-1 m @ 900° C.-R1-H2+Ar-1 h | 88.3 | 9035 ± 1221 | |
| MPD 0.1-22-0.05-1 m @ 900° C.-R1-H2+Ar-1 h | 89.6 | 9370 ± 887 | |
| MPD 0.05-22-0.05-1 m @ 900° C.-R1-H2+Ar-1 h | 90.8 | 14475 ± 1923 | |
| MPD 0.1-22-0.1-1 m @ 1100° C.-R1-H2+Ar-1 h | 84.5 | 2013 ± 137 | |
| MPD 0.1-22-0.005-1 m @ 1100° C.-R1-H2+Ar-1 h | 88.2 | 3204 ± 60 | |
| MPD 0.05-22-0.05-1 m @ 1100° C.-R1-H2+Ar-1 h | 84.8 | 2231 ± 65 | |
| MPD 0.02-22-0.02-1 m @ 1100° C.-R1-H2+Ar-1 h | 90.2 | 4368 ± 385 | |
| MPD 0.1-22-0.1-1 m @ 1100° C.-R1-H2+Ar-5 h | 86.0 | 2102 ± 41 | |
| MPD 0.1-22-0.005-1 m @ 1100° C.-R1-H2+Ar-5 h | 89.6 | 3532 ± 98 | |
| MPD 0.05-22-0.05-1 m @ 1100° C.-R1-H2+Ar-5 h | 87.5 | 2226 ± 71 | |
| MPD 0.02-22-0.02-1 m @ 1100° C.-R1-H2+Ar-5 h | 91.3 | 4725 ± 730 | |
| PPD 0.1-22-0.1-1 m @ 1100° C.-R1-H2+Ar-1 h | 90.1 | 3524 ± 959 | |
| PIP 0.1-22-0.1-1 m @ 1100° C.-R1-H2+Ar-1 h | 87.4 | 2683 ± 187 | |

The microporous structure was analysed using $N_2$ adsorption measurement at 77K. Brunauer-Emmett-Teller (BET) surface area, microporous area and volume were calculated from the $N_2$ adsorption isotherm. Pore size distribution was analysed using 2D-NLDFT method with pores from 0.35 to 25 nm considering 2D model of finite slit pores having a diameter-to-width aspect ratio of 4. Micropore volume was calculated from the t-plot calculation. Polymer nanofilms powder was made at the bulk interface and carbonised under different gas and temperature conditions. The calculated BET surface area was up to 609 $m^2g^{-1}$ with microporous area of up to 502 $m^2g^{-1}$ and micropore volume of up to 0.2 $cm^3g^{-1}$ and total pore volume measured at 0.99 $P/P_o$ was 0.5 $cm^3 g^{-1}$. Calculated pore size was always about 0.52 nm for all nanofilms however their pore volume changes widely depending on the thickness and crumpleness of the 2D carbon nanofilms. The adsorption isotherm and pore size distribution calculated from 2D-NLDFT model for different carbon nanofilms prepared from MPD-TMC and PIP-TMC are presented in FIG. 34.

While specific embodiments of the invention have been described herein for the purpose of reference and illustration, various modifications will be apparent to a person skilled in the art without departing from the scope of the invention as defined by the appended claims.

REFERENCES

1. Dikin, D. A.; Stankovich, S.; Zimney, E. J.; Piner, R. D.; Dommett, G. H. B.; Evmenenko, G.; Nguyen, S. T.; Ruoff, R. S. Preparation and Characterization of Graphene Oxide Paper. Nature 2007, 448, 457-460.
2. Reina, A.; Jia, X. T.; Ho, J.; Nezich, D.; Son, H. B.; Bulovic, V.; Dresselhaus, M. S.; Kong, J. Large Area, Few-Layer Graphene Films on Arbitrary Substrates by Chemical Vapor Deposition. Nano Lett. 2009, 9, 30-35.
3. Hoikwan Lee, Ramakrishnan Rajagopalan, Joshua Robinson, and Carlo G. Pantano. Processing and Characterization of Ultrathin Carbon Coatings on Glass. Appl. Mater. Interface 1, 927-933, 2009.
4. S. Karan, Q. Wang, S. Samitsu, Y. Fujii, I. Ichinose, J. Membr. Sci. 448, 270-291 (2013).
5. Santanu Karan, Zhiwei Jiang, Andrew G. Livingston. Sub-10 nm polyamide nanofilms with ultrafast solvent transport for molecular separation. Science, 348, 1347-1351, 2015
6. Abergel, D. S. L.; Russell, A.; Fal'ko, V. I. Visibility of graphene flakes on a dielectric substrate. Appl. Phys. Lett. 2007, 91 (6), 063125-3.
7. Blake, P.; Hill, E. W.; Neto, A. H. C.; Novoselov, K. S.; Jiang, D.; Yang, R.; Booth, T. J.; Geim, A. K. Making graphene visible. Appl. Phys. Lett. 2007, 91 (6), 063124-3.
8. Paul K. Chu, Liuhe Li, Characterization of amorphous and nanocrystalline carbon films. Mater. Chem. Phys. 96, 2006, 253-277.
9. L. G. Cançado, K. Takai, T. Enoki, M. Endo, Y. A. Kim, H. Mizusaki, A. Jorio, L. N. Coelho, R. Magalhães-Paniago, and M. A. Pimenta. General equation for the determination of the crystallite size La of nanographite by Raman spectroscopy. 88, 163106, 2006.
10. A. C. Ferrari and J. Robertson. Interpretation of Raman spectra of disordered and amorphous carbon. Phys. Rev. B 61, 14 095-14 106, 2000.
11. M. M. Lucchese, F. Stavale, E. H. Martins Ferreira, C. Vilani, M. V. O. Moutinho, Rodrigo B. Capaz, C. A. Achete, A. Jorio Quantifying ion-induced defects and Raman relaxation length in graphene. Carbon 48, 2010, 1592-1597.
12. Siegfried Eigler, Christoph Dotzer, Andreas Hirsch. Visualization of defect densities in reduced graphene oxide. Carbon 50, 2012, 3666-3673.

13. H. Estrade-Szwarckopf. XPS photoemission in carbonaceous materials: A defect peak beside the graphitic asymmetric peak. Carbon 42, 1713-1721, 2004.
14. Yu-Chun Chiang, Chen-Yueh Lee, Hung-Chih Lee. Surface chemistry of polyacrylonitrile- and rayon-based activated carbon fibers after post-heat treatment. Mater. Chem. Phys. 101 (2007) 199-210

The invention claimed is:

1. A continuous 2-dimensional carbon thin film wherein the thin film has a thickness of less than 20 nm and an area divided by thickness ratio (A/T) of greater than $10^{10}$ nm, and wherein the thin film has an elemental composition of:
85 to 95% carbon, and
2 to 13% oxygen;
or;
88 to 98% carbon,
1 to 6% oxygen, and
0.5 to 6% nitrogen.

2. The continuous 2-dimensional carbon thin film of claim 1, wherein the thin film has a thickness of less than 10 nm.

3. The continuous 2-dimensional carbon thin film of claim 1, wherein the thin film has a thickness of less than 6 nm.

4. The continuous 2-dimensional carbon thin film of claim 1, wherein at least a portion of the thin film has a structure corresponding to graphene, graphene oxide or reduced graphene oxide.

5. The continuous 2-dimensional carbon thin film of claim 1, wherein the thin film comprises 50-70 atomic % of $sp^2$ carbon atoms.

6. The continuous 2-dimensional carbon thin film of claim 1, wherein the thin film has a light transmittance at a wavelength of 550 nm of ≥75% at a film thickness of 2-5 nm.

7. The continuous 2-dimensional carbon thin film of claim 1, wherein, the continuous 2-dimensional carbon thin film has a sheet resistance of ≤10 kΩ/square.

8. The continuous 2-dimensional carbon thin film of claim 1, wherein the continuous 2-dimensional carbon thin film has an area greater than 0.001 $cm^2$.

9. A process for the preparation of the continuous 2-dimensional carbon thin film of claim 1, the process comprising the steps of:
a) providing an organic polymeric thin film formed by an interfacial polymerisation process, said organic polymeric thin film having a thickness of less than 100 nm; and
b) subjecting the organic polymeric thin film of step a) to a carbonisation process.

10. The process of claim 9, wherein in step a), the organic polymeric thin film is formed by interfacial polymerisation on a supporting substrate.

11. The process of claim 9, wherein prior to step b), the organic polymeric thin film is separated from the supporting substrate by contacting the supported organic polymeric thin film with a solvent in which the supporting substrate is soluble and the organic polymeric thin film is insoluble.

12. The process of claim 9, wherein in step a), the organic polymeric thin film is prepared by interfacial polymerisation at the interface of two immiscible liquids.

13. The process of claim 9, wherein prior to step b), the organic polymeric thin film is placed on a carbonisation support, and wherein the carbonisation support is selected from silicon, copper, carbon fiber mat, carbon nanotube mat, alumina, or quartz.

14. The process of claim 9, wherein step b) comprises heating the organic polymeric thin film of step a) to a temperature greater than 300° C. in the absence of oxygen.

15. The process of claim 9, wherein step b) comprises heating the organic polymeric thin film of step a) to a temperature greater than 900° C. in the absence of oxygen.

16. The process of claim 9, wherein step b) comprises heating the organic polymeric thin film of step a) to a temperature greater than 1500° C. in the absence of oxygen.

17. The process of claim 9, wherein step b) comprises heating the organic polymeric thin film of step a) under vacuum.

18. The process of claim 9, wherein step b) comprises heating the organic polymeric thin film of step a) in an atmosphere comprising greater than 5 vol % hydrogen.

19. The process of claim 9, wherein the process further comprises contacting the product of carbonisation step b) with a reducing agent, and wherein the reducing agent is selected from hydrazine, chlorine, fluorine, bromine, iodine, hydrogen chloride, hydrogen bromide or hydrogen iodide.

20. The process of claim 9, wherein the organic polymeric thin film comprises one or more polymers selected from polyamides, polyurea, polypyrrolidines, polyesters, polyurethanes, polyketones, polysiloxanes, poly(amide imide), poly(ether amide) and poly(urea amide).

21. The process of claim 9, wherein the organic polymeric thin film is a polyamide.

* * * * *